US009489194B2

(12) United States Patent
Kletzky et al.

(10) Patent No.: US 9,489,194 B2
(45) Date of Patent: Nov. 8, 2016

(54) RAPIDLY CONFIGURABLE PROGRAM

(75) Inventors: Glenn Kletzky, Aurora, CO (US); Brian Nelson, Aurora, CO (US); Earl Wing, Aurora, CO (US)

(73) Assignee: Mobile Epiphany, LLC, Aurora, CO (US)

( * ) Notice: Subject to any disclaimer, the term of this patent is extended or adjusted under 35 U.S.C. 154(b) by 0 days.

(21) Appl. No.: 13/544,846

(22) Filed: Jul. 9, 2012

(65) Prior Publication Data

US 2013/0298104 A1 Nov. 7, 2013

Related U.S. Application Data

(60) Provisional application No. 61/506,080, filed on Jul. 9, 2011.

(51) Int. Cl.
*G06F 9/45* (2006.01)
*G06F 9/44* (2006.01)
*G06F 9/445* (2006.01)
*G06F 21/31* (2013.01)

(52) U.S. Cl.
CPC ............. *G06F 8/70* (2013.01); *G06F 9/44505* (2013.01); *G06F 21/31* (2013.01)

(58) Field of Classification Search
CPC ........................................................ G06F 8/70
USPC ......................................................... 717/102
See application file for complete search history.

(56) References Cited

U.S. PATENT DOCUMENTS

| 7,464,072 | B1 * | 12/2008 | Subramaniam ... | G06F 17/30392 |
| 8,738,414 | B1 * | 5/2014 | Nagar ............... | G06Q 10/101 705/7.12 |
| 2003/0167422 | A1 * | 9/2003 | Morrison ........... | G06F 11/3688 714/38.14 |
| 2004/0162744 | A1 * | 8/2004 | Thier ................. | G06Q 10/10 705/7.11 |
| 2004/0181442 | A1 * | 9/2004 | Hensel ............... | G06Q 10/10 707/791 |
| 2005/0144226 | A1 * | 6/2005 | Purewal ............. | G06F 8/70 709/203 |
| 2006/0208885 | A1 * | 9/2006 | Lin .................... | G06Q 10/087 340/572.1 |
| 2012/0144501 | A1 * | 6/2012 | Vangpat ............. | H04L 63/108 726/28 |
| 2012/0330964 | A1 * | 12/2012 | Baude ............... | G06F 17/30336 707/741 |

* cited by examiner

*Primary Examiner* — Li B Zhen
*Assistant Examiner* — Lenin Paulino
(74) *Attorney, Agent, or Firm* — Sheridan Ross P.C.

(57) ABSTRACT

The present application describes a rapid application configuration program. The application configuration program allows for an enterprise to configure a standard framework into numerous applications without having to develop the software application anew. Herein, the application configuration program can be based on a data paradigm that encompasses most, if not all, of the different enterprise applications that may be developed by an enterprise. The data paradigm helps configure applications based on a hierarchical nodal structure that allows data or information to be input by a user for various enterprise tasks.

20 Claims, 49 Drawing Sheets

RAPIDLY CONFIGURABLE PROGRAM

CROSS REFERENCE TO RELATED APPLICATION

The present application claims the benefits of and priority to, under 35 U.S.C. §119(e), U.S. Provisional Patent Application 61/506,080, filed on Jul. 9, 2011, which is incorporated herein by reference in its entirety for all that it teaches and for all purposes.

BACKGROUND

Enterprises are consistently trying to develop new applications to make tasks within the enterprise simpler. The applications are typically developed over a period of time using a great number of resources. To speed up the process of application design, application design software has been developed to enable enterprises or contractors to develop applications for enterprises more quickly and more efficiently. However, application design software still requires a great amount of resources and takes a long time to create an application. Thus, for an enterprise to capture institutional knowledge in an application or develop a program or other aide to do doing organizational tasks, the enterprise must spend time and money which may not be available.

SUMMARY

It is with respect to the above issues and other problems that the embodiments presented herein were contemplated. Embodiments presented herein disclose a rapid application configuration program. The application configuration program allows for an enterprise to configure a standard framework into numerous applications without having to develop the software application anew. Herein, the application configuration program can be based on a data paradigm that encompasses most, if not all, of the different enterprise applications that may be developed by an enterprise. The data paradigm helps configure applications based on a hierarchical nodal structure that allows data or information to be input by a user for various enterprise tasks.

The hierarchical paradigm has a structure that includes a top level enterprise node. Under the enterprise, the paradigm includes assets, which can have sub-assets or processes. Likewise, the processes may have sub-processes or steps. The steps may include a series of actions or questions that may include progression logic that leads to other steps or to the output or input of data. Thus, the process steps can return information or result in other questions that in turn may produce data. At the end of the process, the collected or generated information may be stored and/or reacted to by other systems or personnel within the enterprise.

The hierarchical paradigm is then fed encompassed in an application framework that allows a user to execute the application. The framework provides for a standard application interface for all different tasks within the enterprise. Further, a personnel database may be created such that the personnel assets of an enterprise may be described in the similar paradigm. The personnel may be mated or associated with the enterprise application such that users can have predetermined application configurations associated with them.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The term "mobile device" or "mobile computer" as used herein refers to any hardware device and/or software operable to engage in a computing session. For example, a mobile device can be an IP-enabled computer, a tablet computer, a cellular phone, a personal digital assistant, a laptop computer system, etc. In embodiments, the mobile computer is a computer system as described in conjunction with FIGS. 31 and 32.

The term "network" as used herein refers to a system used by a communication platform to provide communications between mobile computers. The network can consist of one or more session managers, feature servers, mobile computers, etc. that allow communications, whether voice or data, between two users. A network can be any network or communication system as described in conjunction with FIGS. 31 and 32. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 3202.11 g, 3202.11n, Bluetooth, or other formats or protocols.

The term "database," "archive," or "data structure" as used herein refers to any system, hardware, software, memory, storage device, firmware, component, etc., that stores data. The data model can be any type of database or storage framework described in conjunction with FIGS. 31 and 32, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "identifier (ID)" and variations thereof, as used herein, refers to An identifier as described herein can be an numeric, alphanumeric, symbolic, globally unique identifier, or other identifier as understood in the art.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label. Furthermore, ellipses within the figures represent that the component, data structure, etc. can include more or fewer elements than those shown in the figure.

DETAILED DESCRIPTION

Figure 1:
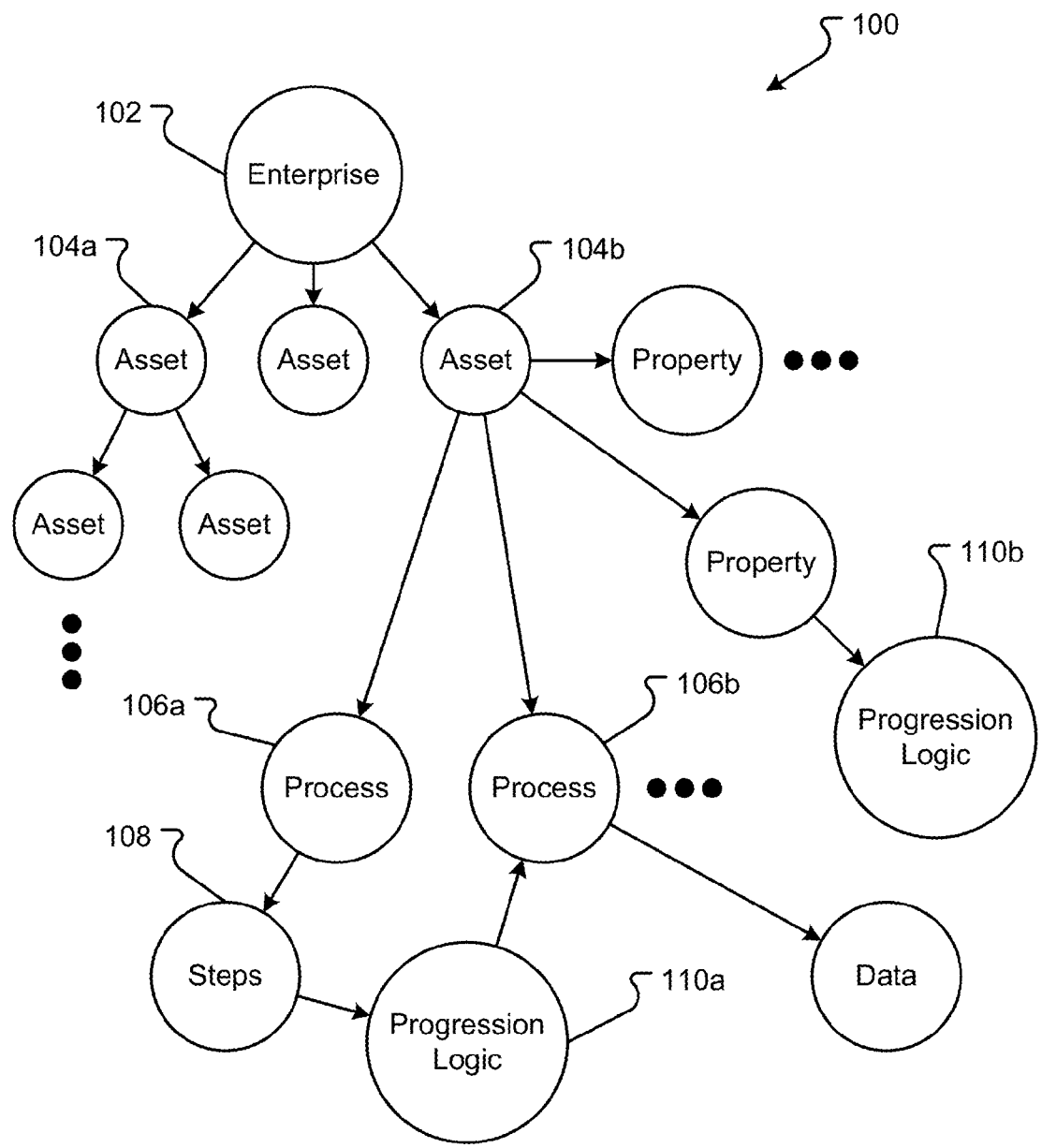
FIG. 1 is a hierarchical diagram of an embodiment of a data store.

An embodiment of the data paradigm 100 is shown in FIG. 1. The data paradigm shows a nodal tree structure where an enterprise is the top node 102, or top tier. The enterprise 102 may then have one or more children nodes 104a, 104b, which may represent assets for the enterprise. These assets 104 can include subsidiary enterprises, buildings, intellectual property, or other types of material, capital equipment, buildings, etc. There may be assets that are children nodes to the other assets, such that there may be several tiers or levels within the asset nodes. Assets 104 may have further children, which may represent processes associated with the asset. Processes 106 can be formed from a set of one or more steps that may include questions or tasks that may be performed with or on the asset. The steps may also lead to progression logic, which is a result of the process and can lead to data generation or further processes. All the different nodes of the hierarchical structure can have properties or attributes that identify, describe, and/or configure the different nodes. In establishing the data paradigm, an enterprise can describe, in quantitative terms, the enterprise and its processes. Each node may be configured such that data may be entered for the different nodes by personnel or computers used by the enterprise. The data may further be manipulated or acted upon such that enterprise process(es) is configured in the application.

The embodiments presented herein represent a software system that has one or more user interfaces for creating rapidly adjustable and configurable applications. FIGS. 2 through 29 include various user interface embodiments that describe the configuration of the data paradigm and the utilization of the data paradigm in the configured application. The data paradigm may be configured, in this exemplary embodiment, for an enterprise entitled "patent demo." As such, "patent demo," represents the enterprise or top level node 102 of the data paradigm.

Figure 2:
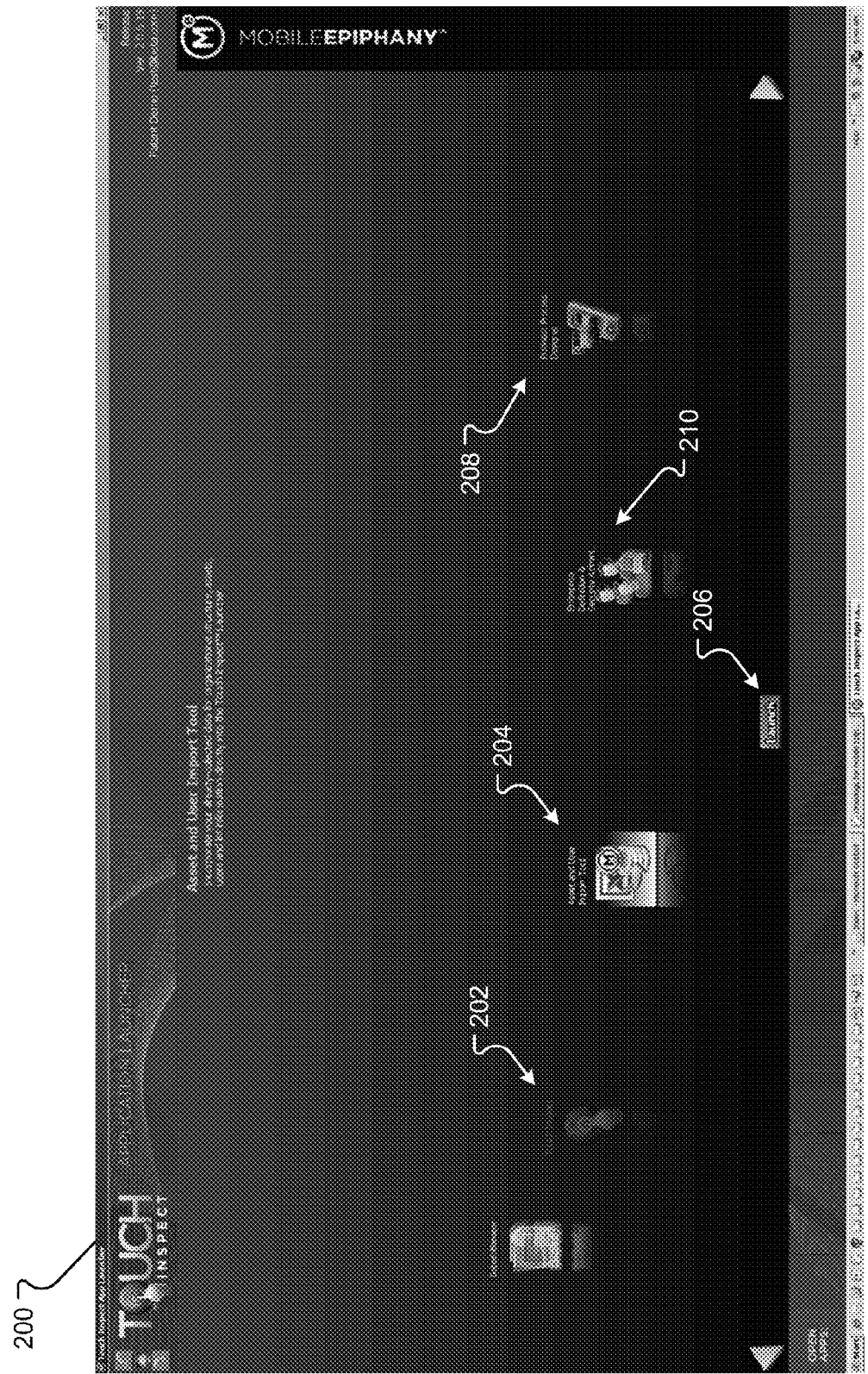
FIG. 2 includes a first view of an embodiment of a touch inspect user interface.

An example of a first user interface to access the software system 200 is shown in FIG. 2. Herein the software system 200 has one or more selectable user interface devices, 102 and 104. The user interface devices 102/104 can represent different types of selectable icons or other devices presented on a user interface for allowing the user to interact with the software system 200. Herein, the user interface devices 102/104 represent icons that allow the user to select certain components of the software system 200. A third user interface device, which is a selectable push-button 106, allows the user to launch the different programs within the software system 200. Upon selecting icon 208, the application configuration tool is launched. Herein, the configuration tool is described as a "business process designer".

Figure 3:
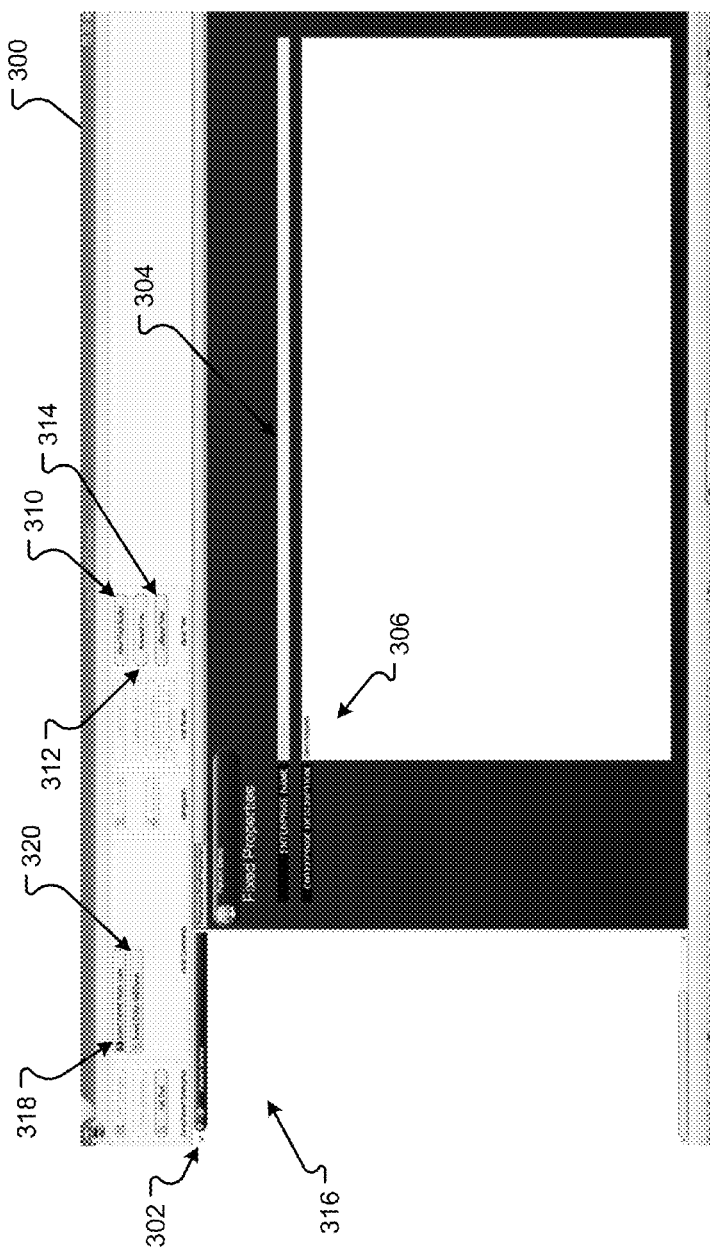
FIG. 3 includes a another view of an embodiment of a touch inspect user interface.

An initial user interface 300 is created upon the selection of the business process designer user interface device, i.e., icon 208. The user interface 300 is shown in FIG. 3. Here, the user is able to configure the structure of the data paradigm. As such, the user can begin by creating an enterprise node. The enterprise node 302 represents the enterprise "patent demo." The user is able to enter an enterprise name in field 304 and enter an enterprise description in field 306. These two fields 304/306 represent the properties of the enterprise node 302. The user interface 300 further includes other selectable user interface devices, such as selectable buttons 310, 312, and 314, which control the view of the nodes shown in field 316. After the information for the enterprise node 302 is entered into the properties section, or fields 304 and 306, the user may create other assets or other types of connections with the enterprise node 302 by selecting one of the user interface devices, 318 and/or 320. When selecting the "insert parent asset type" user interface device 318, the user is presented with another user interface display 400 shown in FIG. 4.

Figure 4:
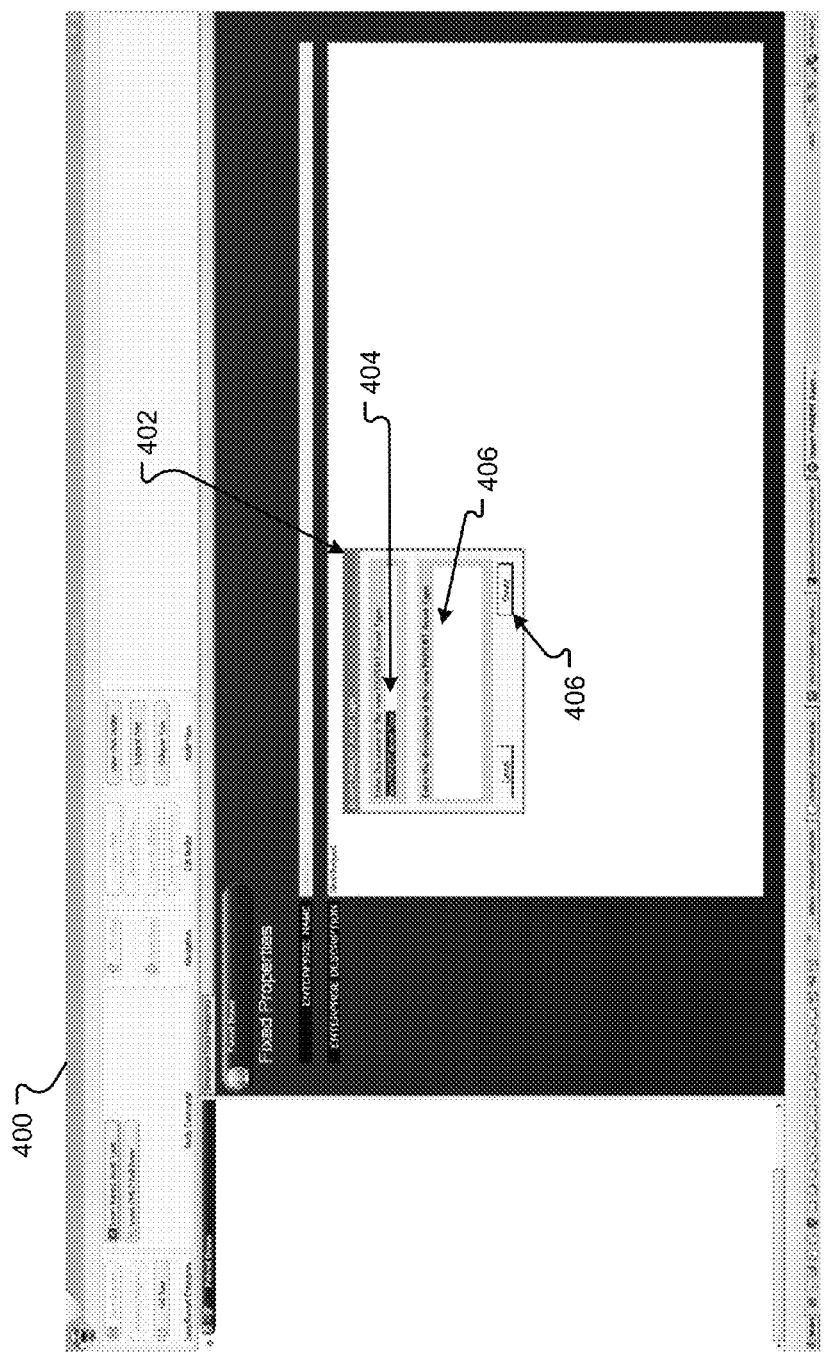
FIG. 4 includes a another view of an embodiment of a touch inspect user interface.

An entry box 402 for creating a new parent asset is shown in FIG. 4. Here the user interface display 402 includes a field 404 for naming the parent asset or designating the parent asset type. Another field 406 is presented to provide a description of the asset type. Upon entering the information, the user can select the user interface device 406 to create the parent asset type, and the user interface 500 will change as shown in FIG. 5.

Figure 5:
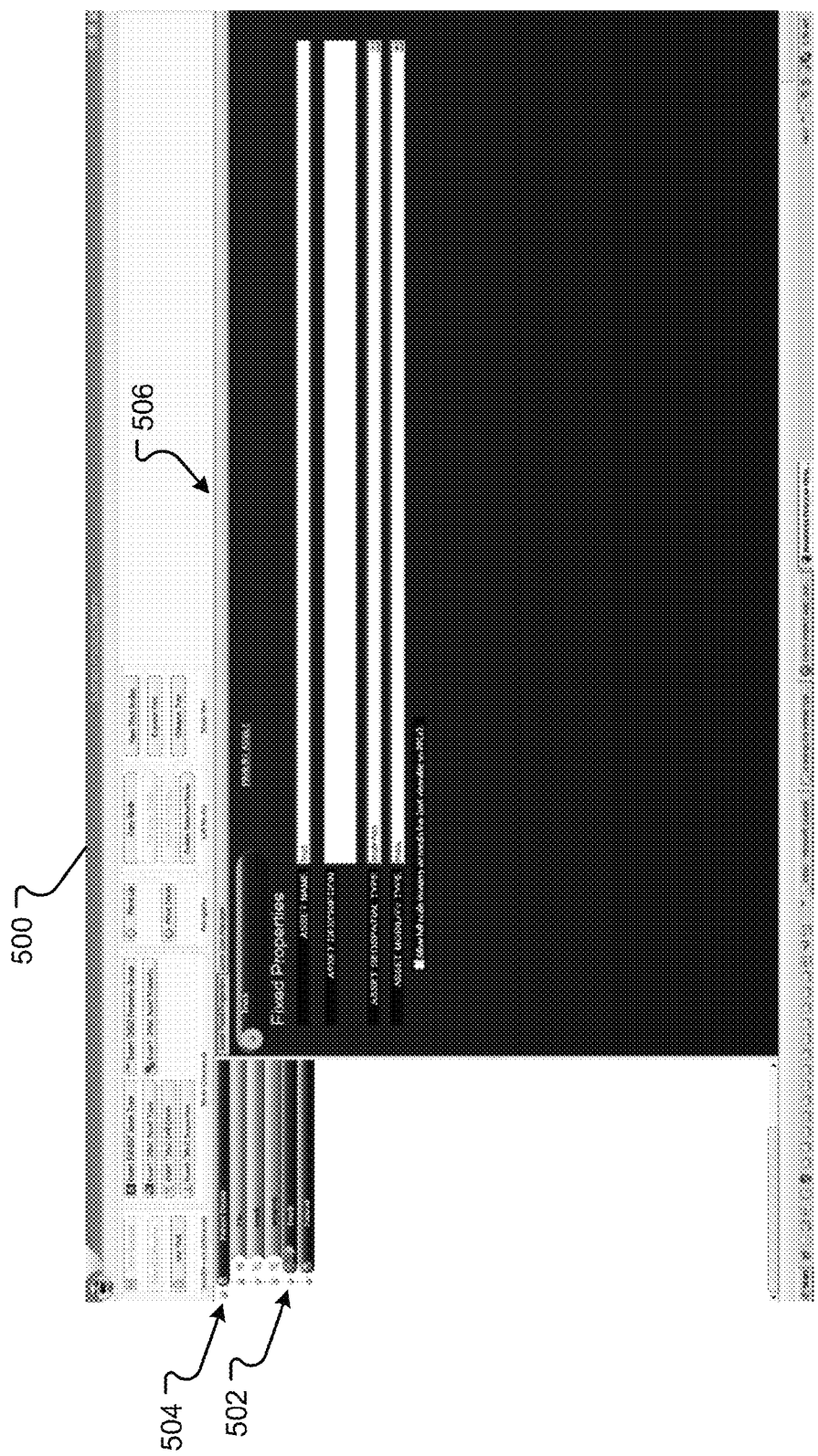
FIG. 5 includes a another view of an embodiment of a touch inspect user interface.

As shown in FIG. 5, a new asset 502 may be created under the enterprise node named "patent demo". The new node, which represents the asset 502 named "Truck", can be shown as a node underneath the enterprise node 504. Thus, the truck asset 502 is a child node of the enterprise node 504. Various properties for the node can be entered into screen display 506.

Figure 6:
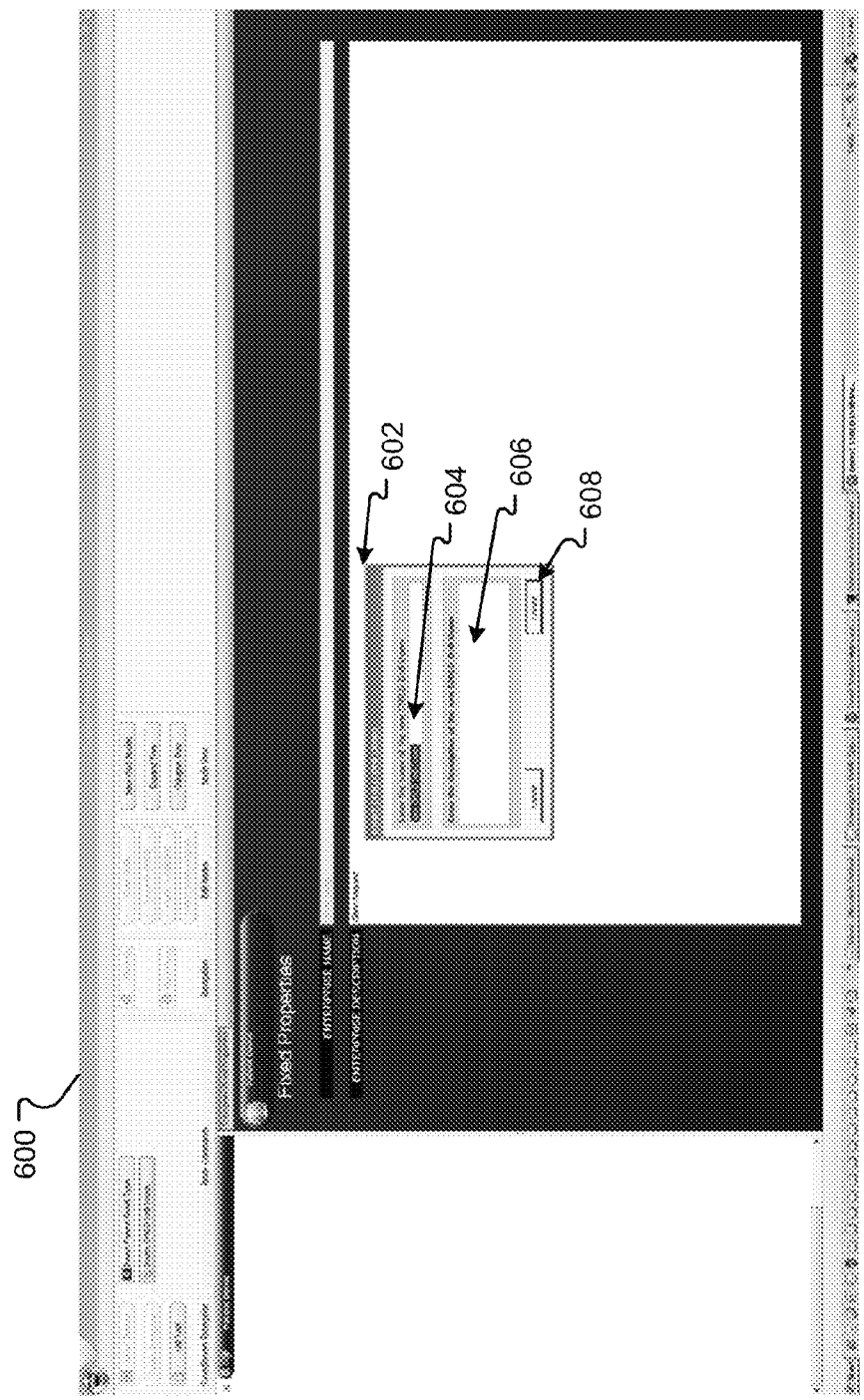
FIG. 6 includes a another view of an embodiment of a touch inspect user interface.

Returning to FIG. 3, if the user selects user interface device 320, a drill down operation will begin where the user may select different asset categories before actually creating an asset node. Upon selecting the user interface device 320, another user interface screen 600 is provided, as shown in FIG. 6. The user interface window 602 can be presented to the user upon selecting the user interface device 320. The user interface window 602 allows the user to create a drill down for a child node. The user can enter a name for the drill down or category for the child node, in field 604. Further, the user can enter a description, in field 606, and then create the child node, by selecting user interface device 608. Upon selecting user interface device 608 to create the child node, the user interface display 700 can be provided as shown in FIG. 7.

Figure 7:
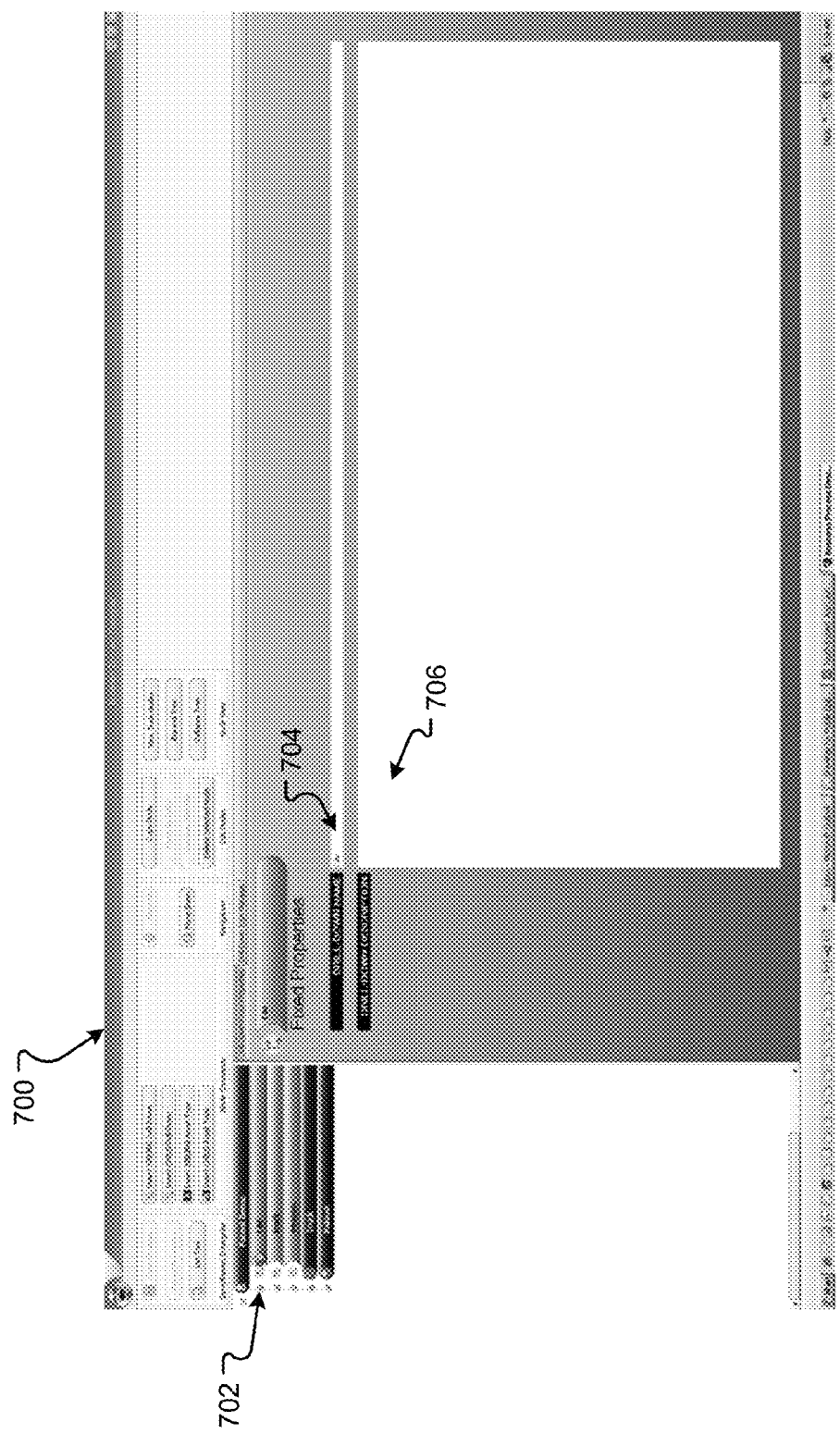
FIG. 7 includes a another view of an embodiment of a touch inspect user interface.

In FIG. 7, user interface display 700 shows the creation of the child node 702, labeled "car". Here, the child node display 700 can include a name field 704 and a description, possibly entered previously, in field 706. The drill down process allows the user to create subcategories or categories of assets which may then have further child nodes or may include properties, attributes, or processes. Thus, the user can create assets, as shown in the user interface display 800 in FIG. 8, which shows two children nodes of the asset node 702.

Figure 8:
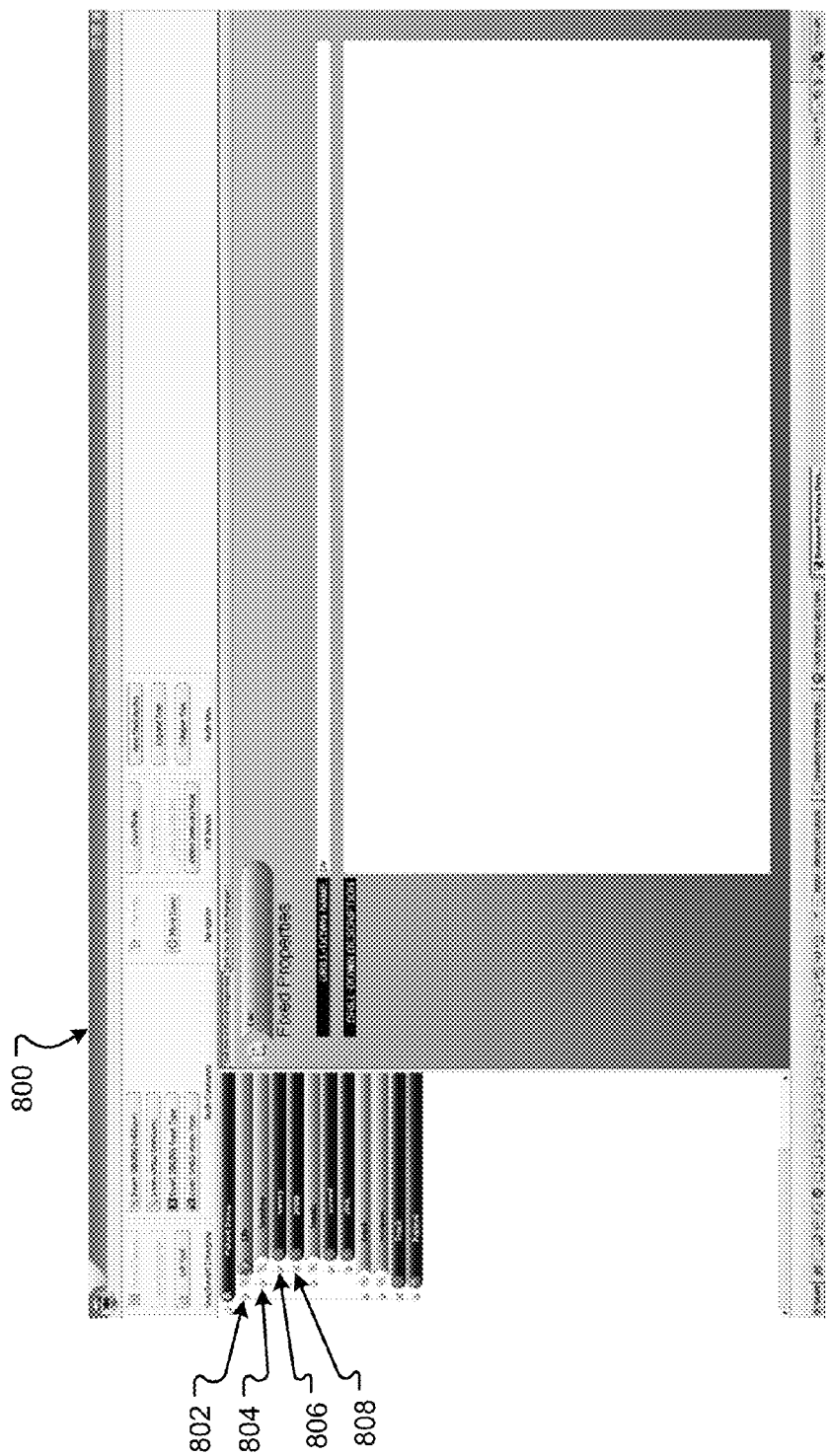
FIG. 8 includes a another view of an embodiment of a touch inspect user interface.
Figure 9:
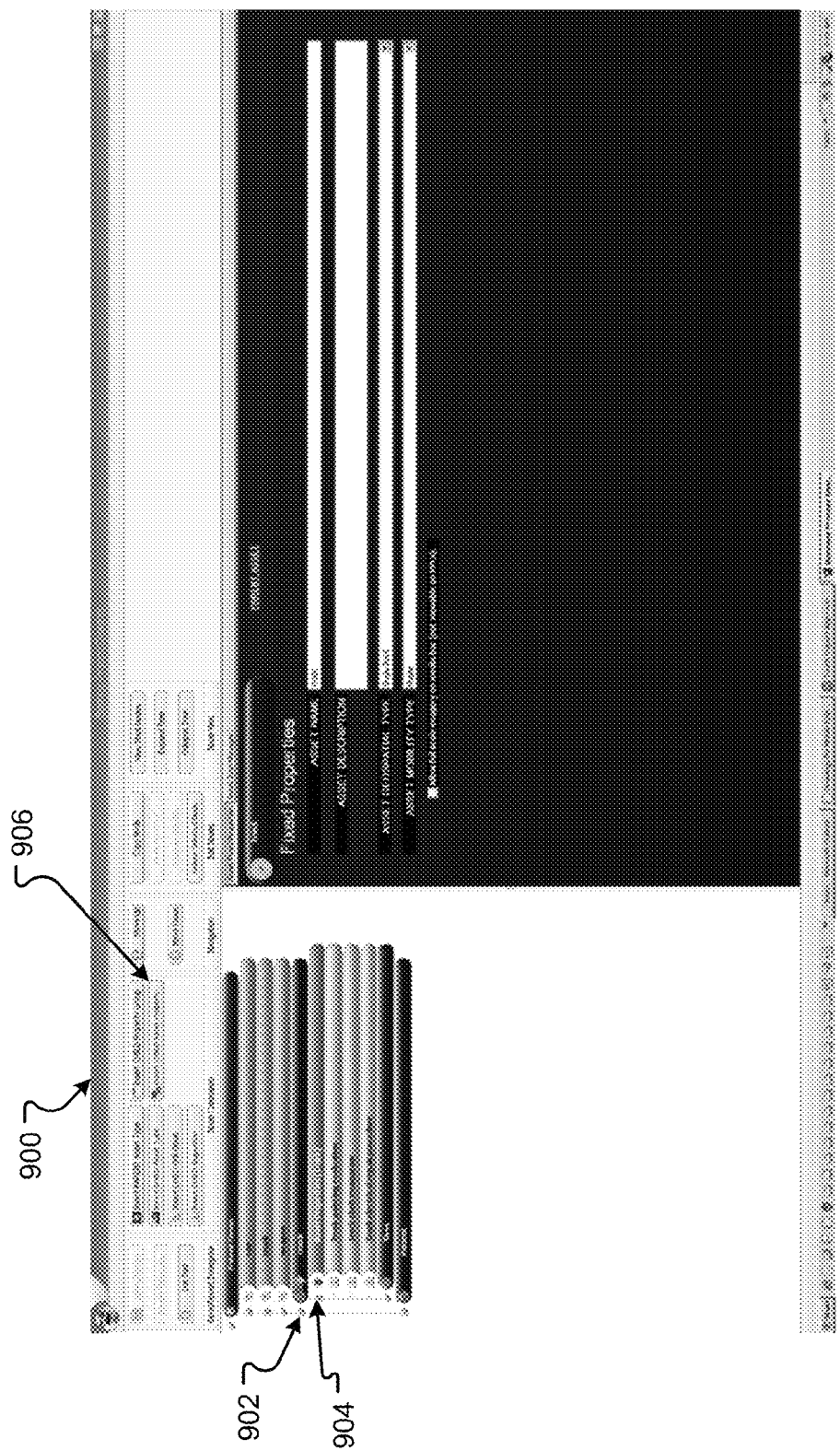
FIG. 9 includes a another view of an embodiment of a touch inspect user interface.
Figure 10:
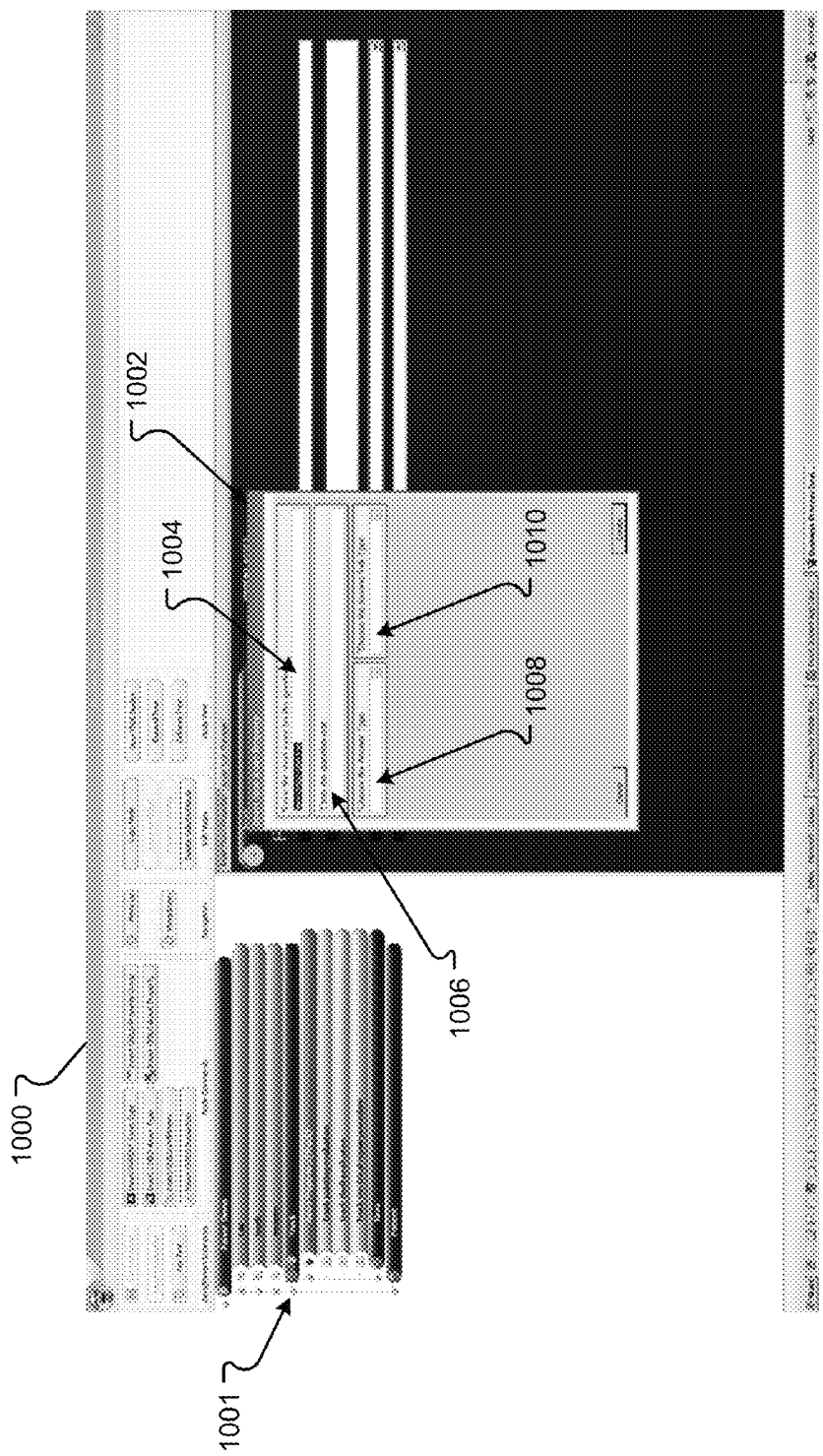
FIG. 10 includes a another view of an embodiment of a touch inspect user interface.

In user interface 800 shown in FIG. 8, the child node 802 includes at least one further child nodes 804, which represents a "Toyota" category of assets, which is a child node of the "car" category of assets. The "Toyota" node 804 further includes child asset nodes "Camry" 806 and "Prius" 808. Thus, the user is able to configure the types of assets or to create a data structure that represents the organization of the enterprise to which the user is associated.

An asset can include asset properties. As shown in user interface 900 of FIG. 9, the truck asset 902 includes asset properties 904, which are a child node of the truck node 902. To enter the asset properties of the node 902, the user may select the node or may select the user interface device 906. User interface 1000, shown in FIG. 10, can then be presented by the software system to the user. Further, a pop-up window user interface 1002 can provide the ability for the user to enter asset properties for the node 1001. The properties can include information or various devices to solicit information, for example, the name of a question 1004, the text of a question 1006, an answer type 1008, and an answer subtype 1010. These different property attributes are only exemplary as other asset properties may be provided within a user interface similar to user interface 1002.

Figure 11:
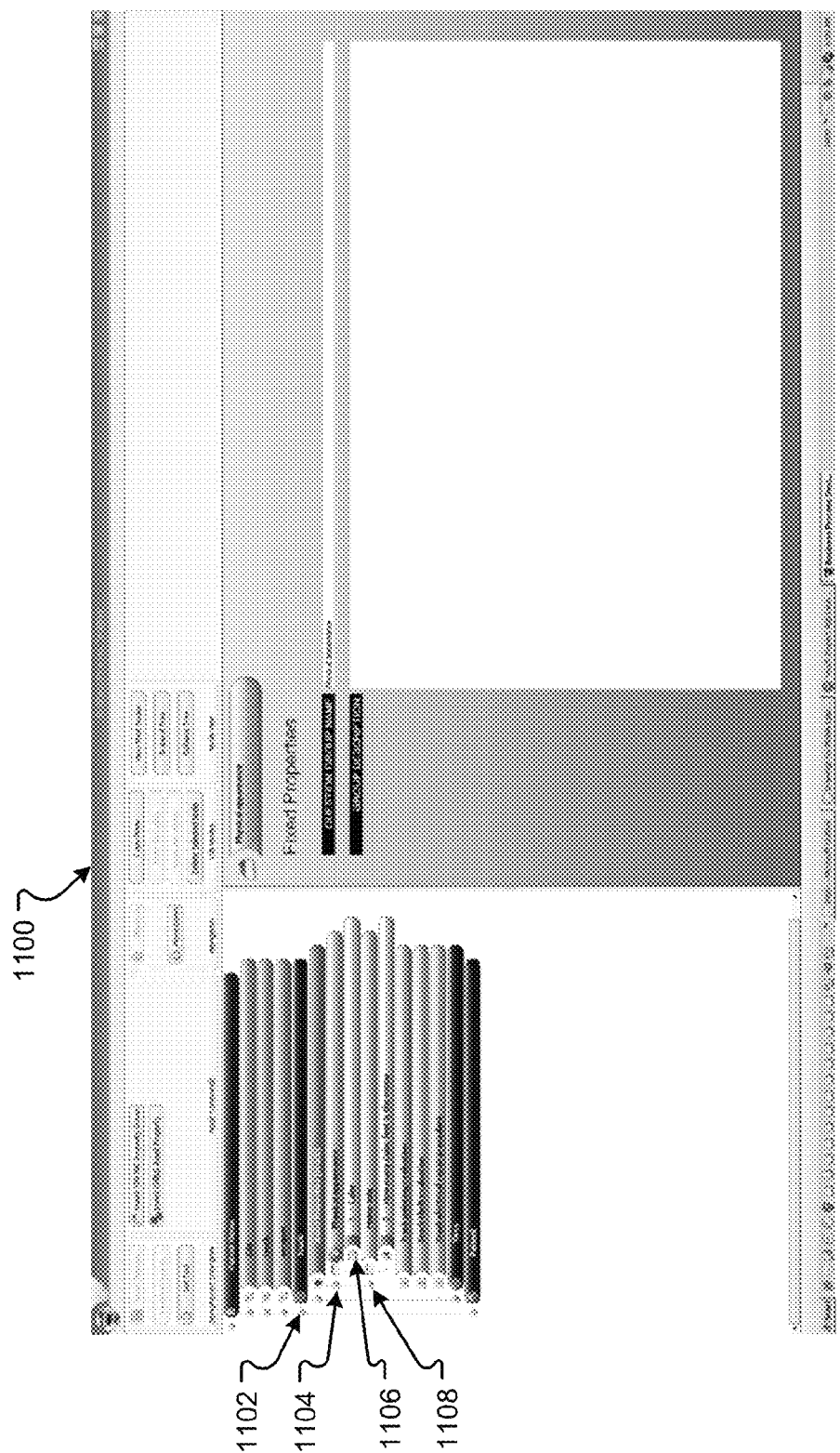
FIG. 11 includes a another view of an embodiment of a touch inspect user interface.

A user interface 1100, shown in FIG. 11, shows the "truck node" 1102 having asset properties. Under the asset property node, a first node 1104 is associated with the "physical appearance" of the truck, and node 1108 is associated with model information. Under the physical appearance node 1104, a further child node 1106 is associated with color. Upon selecting the color node 1106, user interface 1200 is presented as shown in FIG. 12A.

Figure 12A:
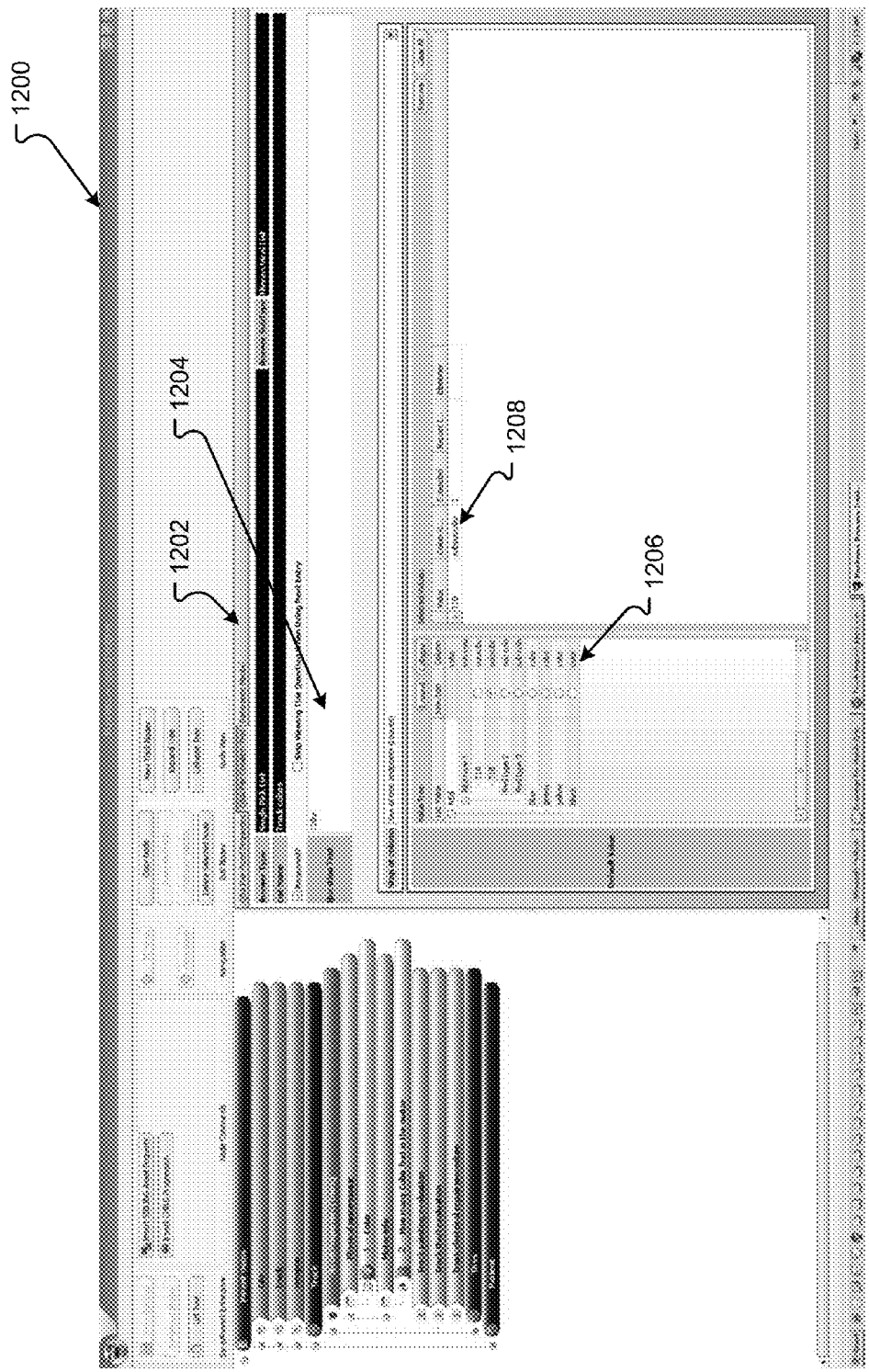
FIGS. 12A and 12B includes other view of embodiments of a touch inspect user interface.
Figure 12B:
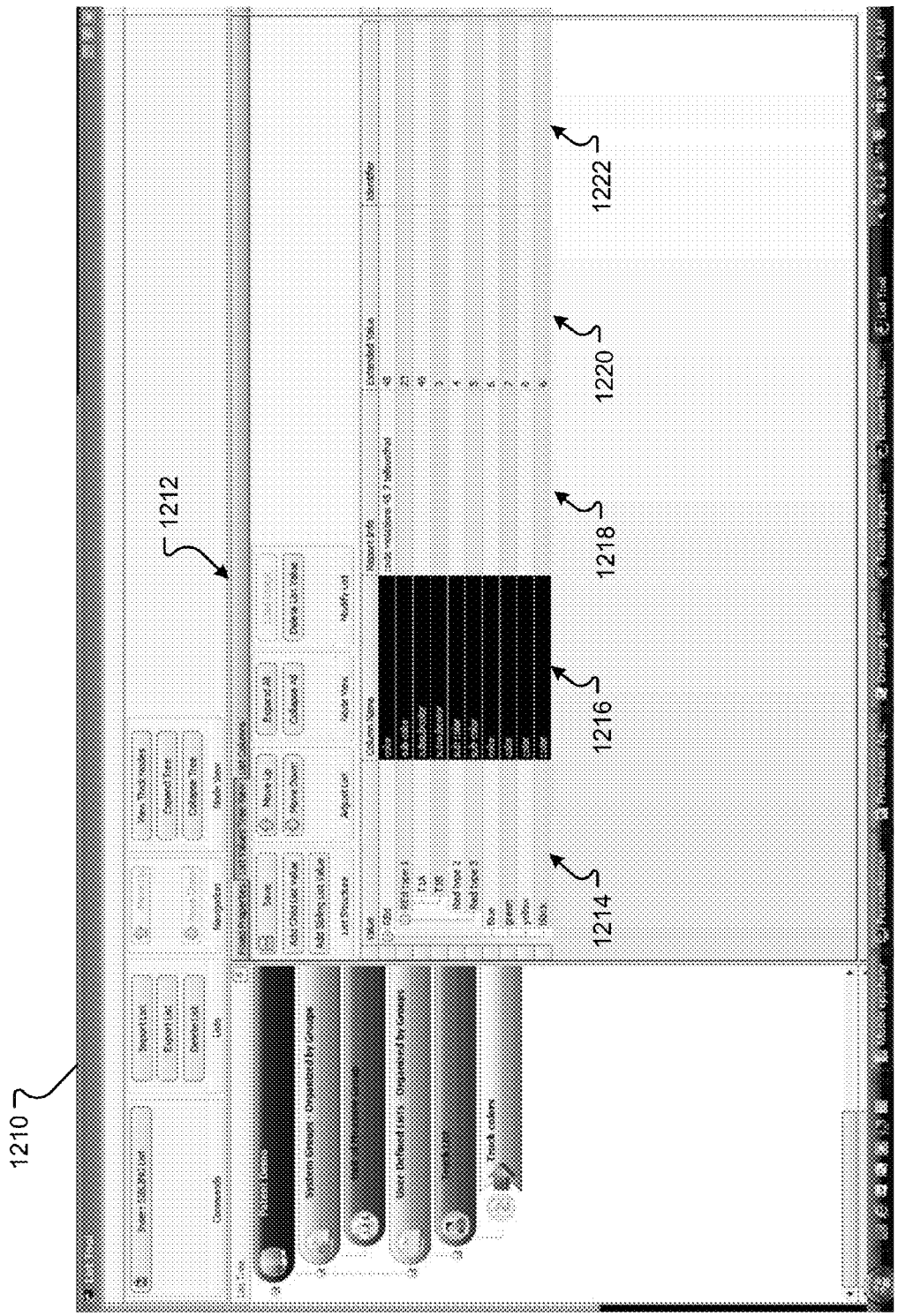

The user interface display 1200, in FIG. 12A, shows a new display 1202 that allows the user to enter asset property information. For example, the user may enter a name for the asset property in field 1204. Further, the user may define the property in field 1206. The information provided in field 1206 may be as described in a data description database created with a data definition tool included with software system. Properties or attributes of assets can have a predetermined definition based on a standard framework as shown in user interface 1210 in FIG. 12B. Here, a list tool shows the definition of the color property. The framework for the property is defined by a value category 1214, a name category 1216, a report information category 1218, an extend value category, and/or an identifier category 1222. By providing values for possible attributes in these categories, a user can define the possible attributes for the node. For example, all the possible colors for the truck asset can be defined by these categories.

Returning to FIG. 12A, the selected value for the asset property can be shown in field 1208. In this example, the asset property is color, as defined in FIG. 12B. The property can be selected from the data descriptions, shown in field 1206. Thus, the color described in field 1208 is a type of "red". The color of the truck can be a child node of the physical appearance node of the truck asset node.

Figure 13:
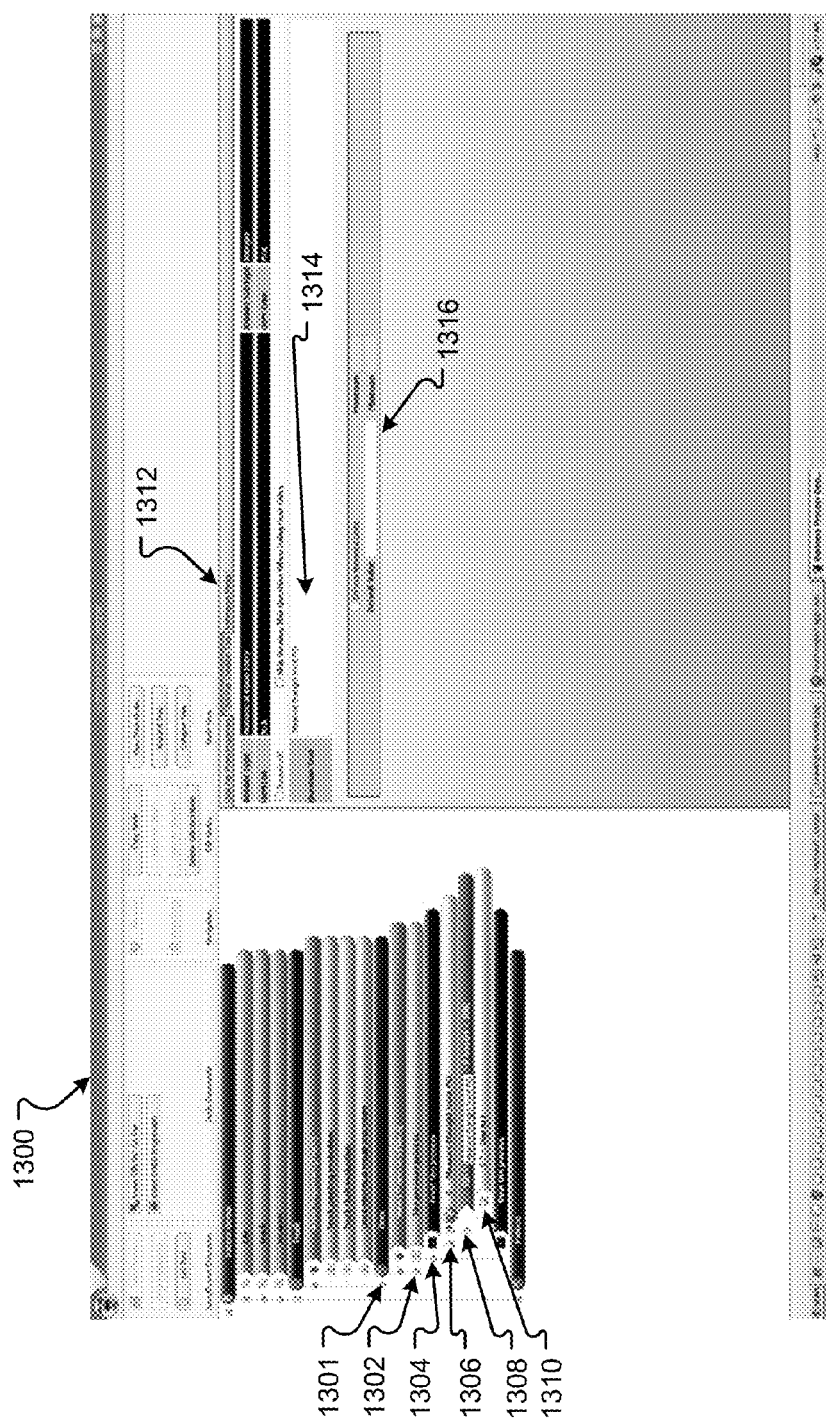
FIG. 13 includes a another view of an embodiment of a touch inspect user interface.

Assets may also include processes as described in conjunction with FIG. 13. Here, user interface 1300 shows that the asset node "tires" 1301 includes a child node 1302 associated with a process for checking the tire pressure. The tire pressure process can measure the pressure of one or more tires on the truck asset. The tire pressure process may further have a child process node, "front tire" process 1304. The front tire process 1304 may include information about how to measure the pressure of the front tires of the truck. The front tire pressure measuring process is represented by node 1306. Information about the process can be shown in field 1312. For example, the name of the process or the description of the process can be shown in field 1314. Further, data values which may restrict what can be entered by the user is shown in field 1316. Further, the user can associate reference media with any of the nodes shown herein, including the process.

Figure 14:
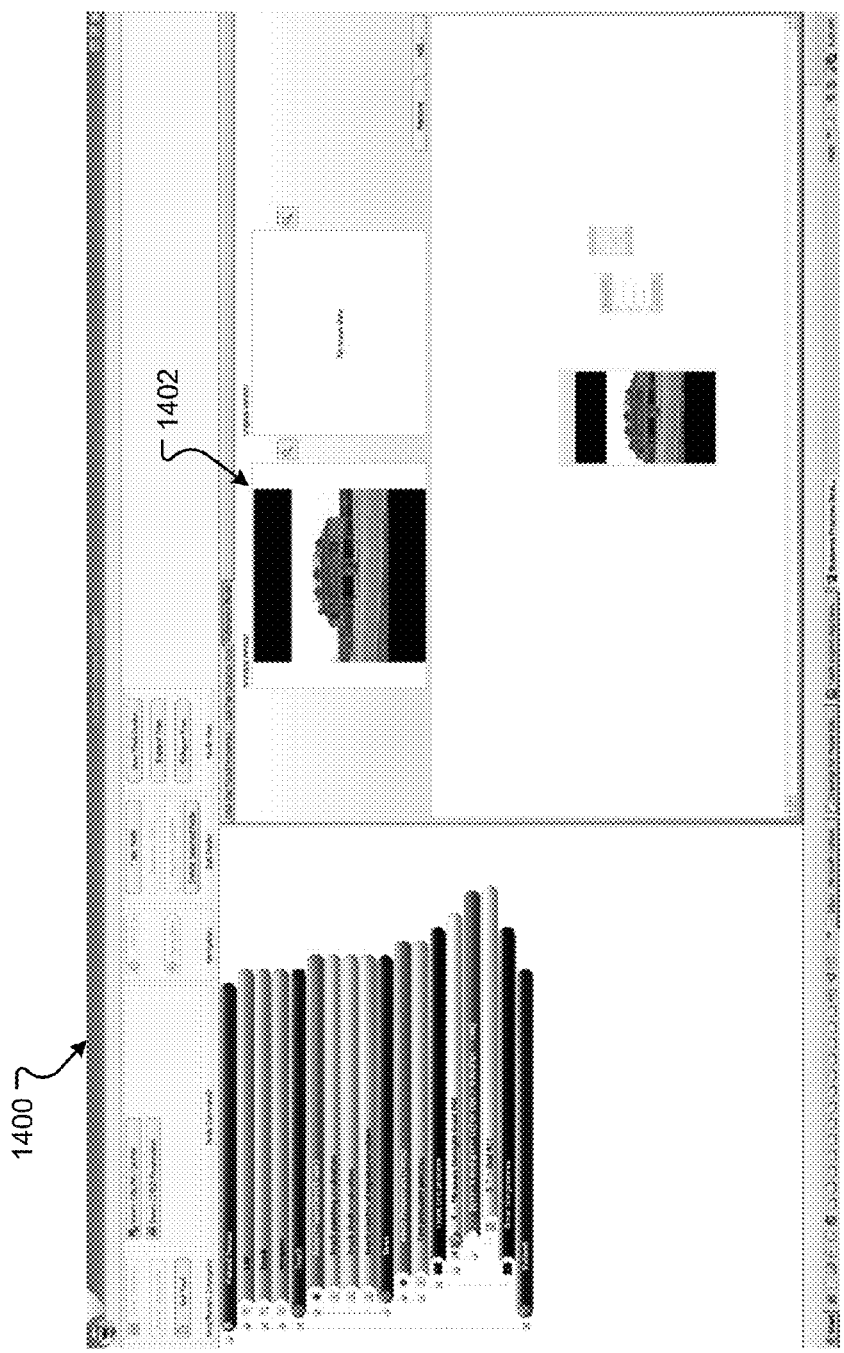
FIG. 14 includes a another view of an embodiment of a touch inspect user interface.

For example, in FIG. 14, user interface 1400 shows that reference media 1402 is associated with the process of front tire pressure. The reference media can include pictures, audio, video, or other information that might allow the user to better conduct the process. For example, a video of someone putting a gauge on a stem of a tire may be shown in reference media 1402. In other embodiments, the stem for the tire may be shown in a picture such that the user can more easily find the stem of the tire. Thus, the information in the reference media helps the user of the configured application to conduct the process.

Figure 15:
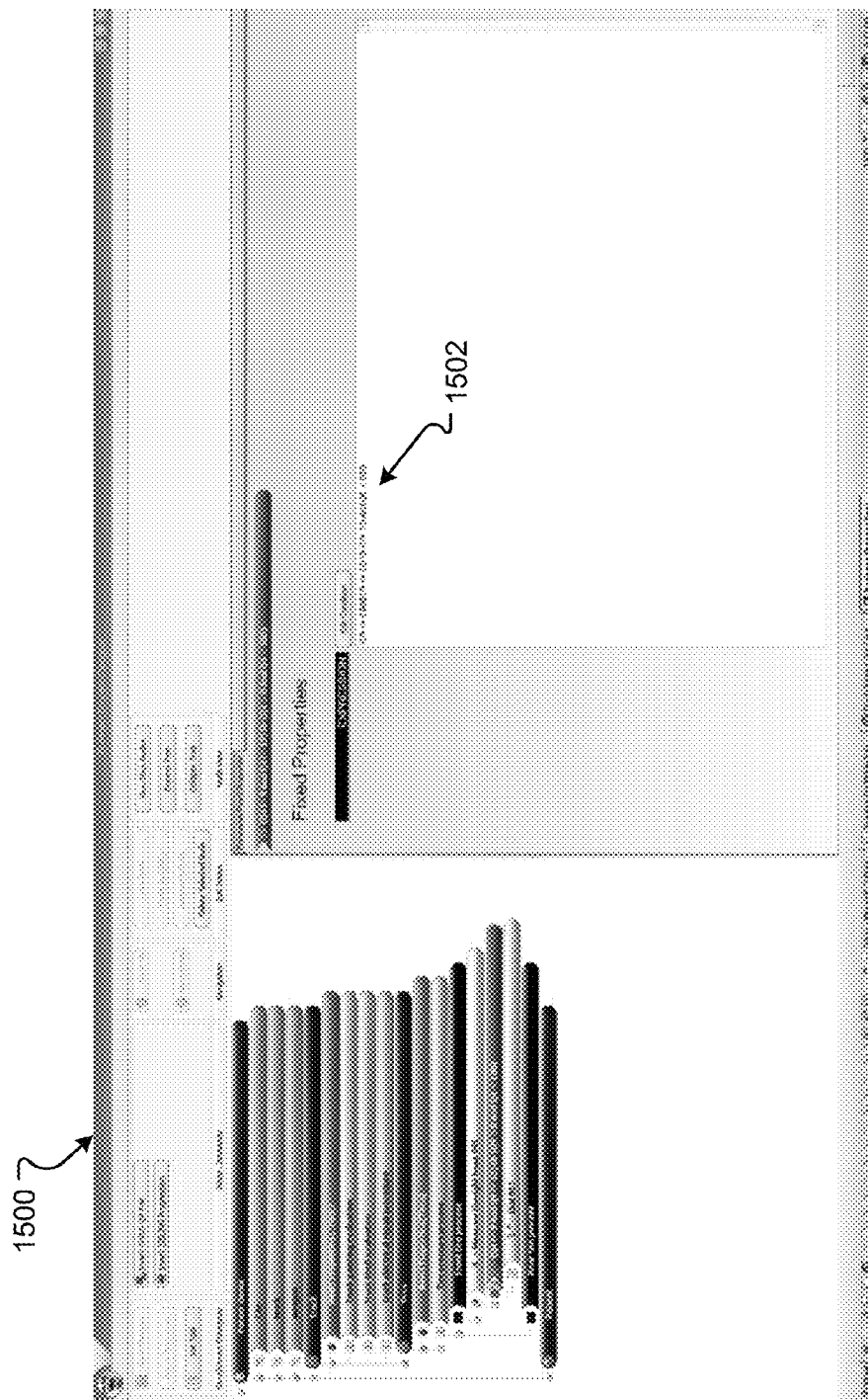
FIG. 15 includes a another view of an embodiment of a touch inspect user interface.
Figure 16:
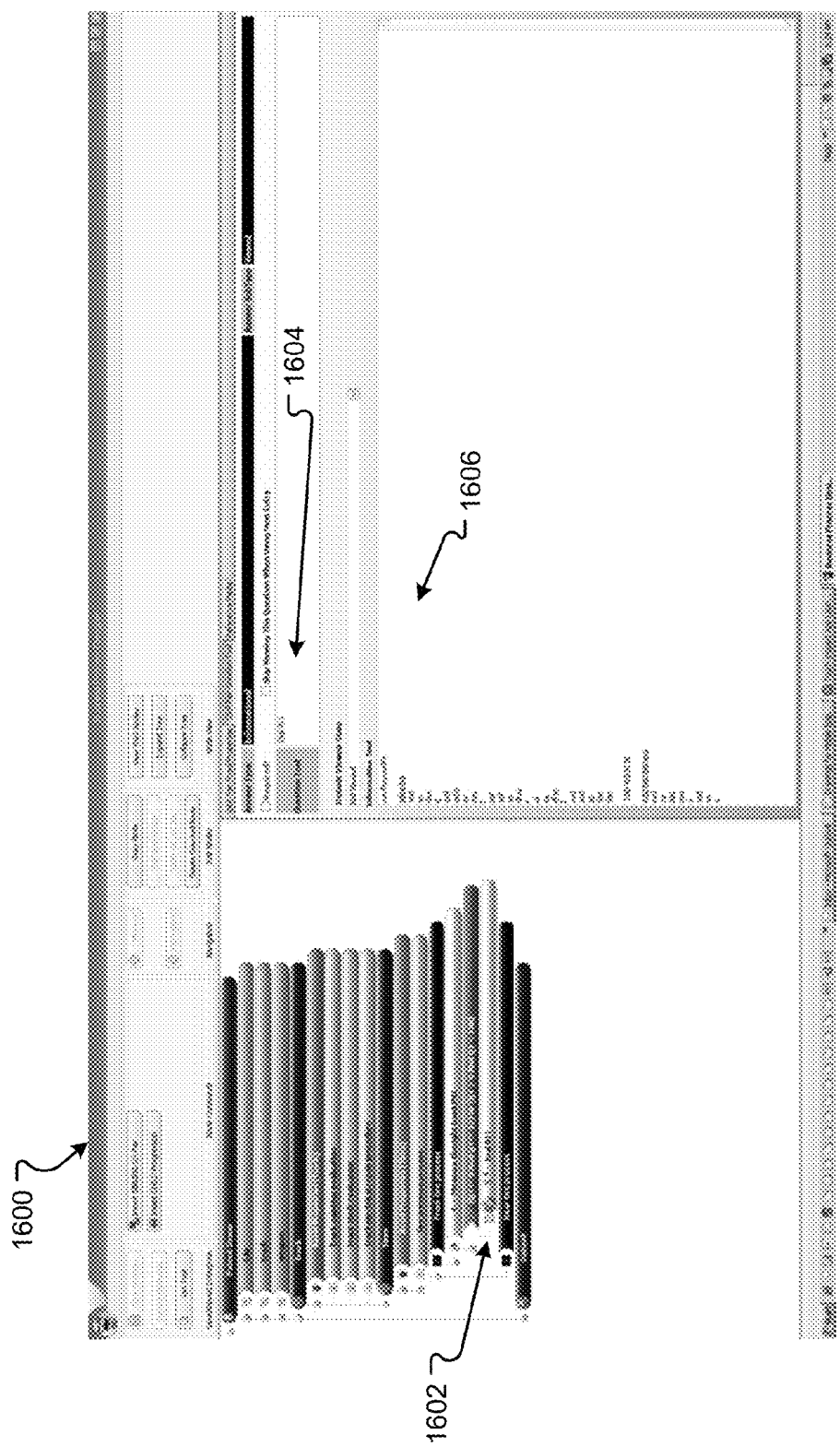
FIG. 16 includes a another view of an embodiment of a touch inspect user interface.

Returning to FIG. 13, the process may have a further sub-process, questions, evaluation, or progression logic related to the process. The evaluation is shown as child node 1308. Upon selecting child node 1308, user interface 1500, as shown in FIG. 15, is presented. Here, the user can enter, in field 1502, different types of expressions or properties for the evaluation of entered information. Thus, the user is able to enter any mathematical or Boolean logic condition to test the outcome of the process. It should be noted that the embodiments presented herein allow nested or alternative Boolean logic expressions by including these Boolean expressions in parentheses, which can be nested to represent various logical expression. The Boolean logic is as shown in field 1502. Thus the user may create complex Boolean logic tests within the field 1502.

Again returning to FIG. 13, the evaluation process node 1308 can have further child nodes, which may include further processes as shown in child node 1310. Upon selecting the child node or creating the child node, the user is presented with user interface 1600 shown in FIG. 16. Here, the user is able to describe the process associated with node 1602. The node can include a title entered in field 1604 and then a process, which may be described in field 1606. This information allows the user to receive tasks associated with processes or sub-process to define and manage their workflow. The documentation of the processes helps preserve institutional knowledge.

Figure 17:
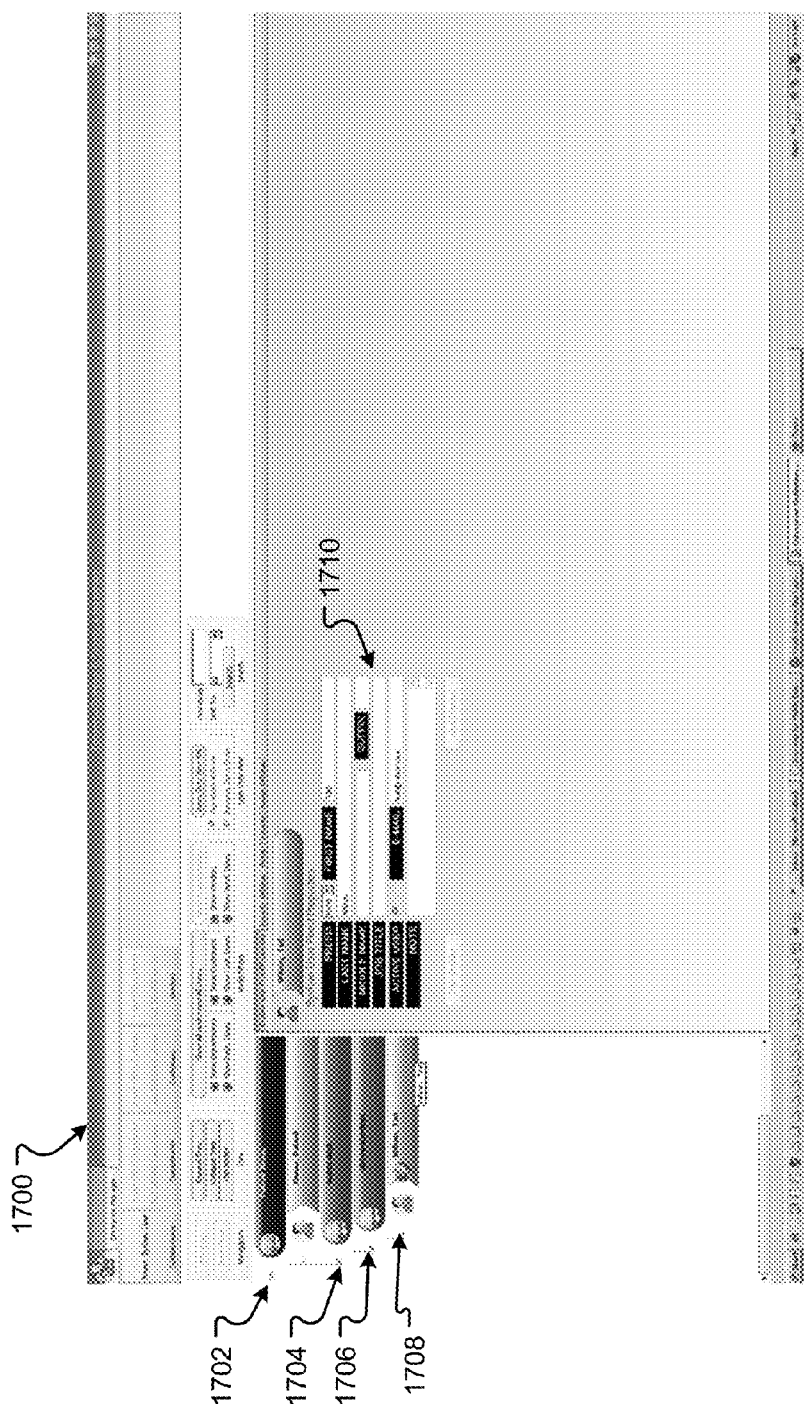
FIG. 17 includes a another view of an embodiment of a touch inspect user interface.

An embodiment of user interface 1700 for organizing personnel into the data paradigm is shown in FIG. 17. The personnel of an enterprise can be organized similarly to the assets, as personnel may be considered to be assets of the enterprise. Thus, an enterprise node 1702 can have child node 1704 that can be either an asset or category of assets. The children assets can have further children nodes 1706, which represent a category of employees. The category of employees may then also have a child node 1708 that represents a person employed by the company. The person can have properties like any other asset, as shown in field 1710.

Figure 18:
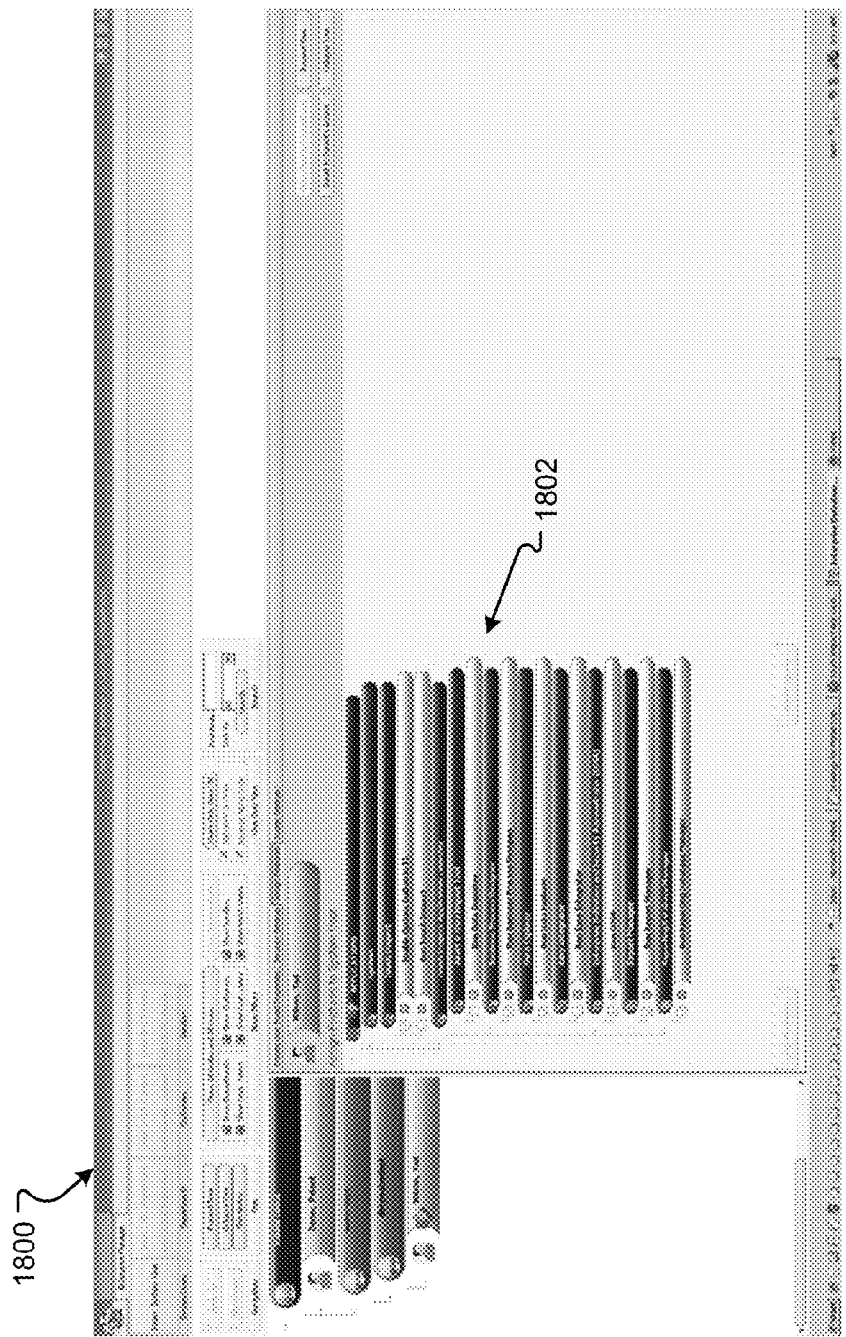
FIG. 18 includes a another view of an embodiment of a touch inspect user interface.
Figure 19:
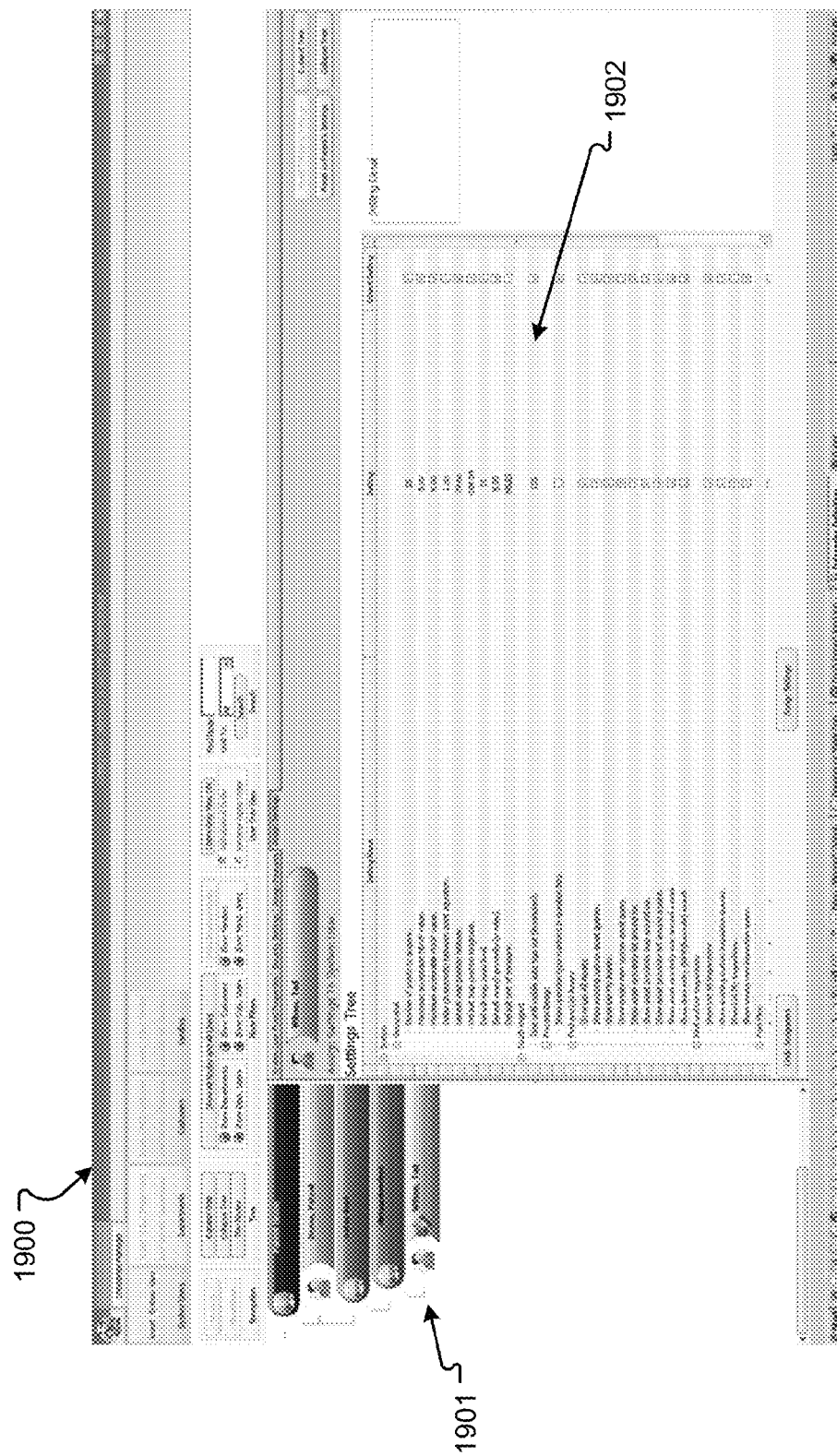
FIG. 19 includes a another view of an embodiment of a touch inspect user interface.

Another user interface 1800, shown in FIG. 18, represents the assignment of the person asset to different processes or assets already discussed and defined in FIGS. 1-16. Unlike other assets, persons can be assigned to different processes or assets and be responsible for executing or managing those processes. Thus, user interface 1800 shows, in field 1802, the different applications that the user may run in doing their job. The assignment of processes to an employee gives the employee the ability to access and enter data for the selected applications, but the user may not be able to access other applications not assigned herein.

The personnel asset, represented by the child node 1901, may also have properties which can be settings for how the user is defined. This information is shown in user interface 1900 in FIG. 9. For example, there are several settings for the user in field 1902 that show how the user is defined and how the user's interaction with different applications may be conducted. Further assets may be assigned to different personnel such that the personnel can use the assets or be in charge of them. In embodiments, a group of employees may have assets assigned to them such that those assets are considered to be used amongst the group employees. For example, the user interface 2000, shown in FIG. 20, has field 2002 that shows different assets assigned to the personnel category "water dept". Thus, the employees in that personnel category may inherit the assignment of these assets and may be able to use or manage those assets.

It should be noted that the assignment of personnel assets may be conducted in an enterprise definition and security administration tool which can be selected by selecting icon 210 shown in FIG. 2. These enterprise assets can assign personnel, contractors, vendors, or other types of groups that work with the enterprise as assets and define those assets. Thus, the employment and contractual obligations of the enterprise can be mapped in the enterprise definition security and administration tool.

Figure 21:
FIG. 21 includes a another view of an embodiment of a touch inspect user interface.

Once the application data paradigm is configured as described above, the "Touch Inspect" application can be selected by selecting icon 202 in FIG. 2. The Touch Inspect application is the configured application that executes after configuring the enterprise assets, properties, processes, steps, progression logic, and the enterprise's personnel. An embodiment of the configured application is shown in FIG. 21. Upon selecting the icon 202, the user interface 2100 is presented to the user. User interface 2100 can have several user selectable devices, such as, add parent asset button 2102, find and list assets button 2104, find and list inspections button 2106, my incomplete inspections button 2108, and/or synchronize data now button 2110.

Figure 22:
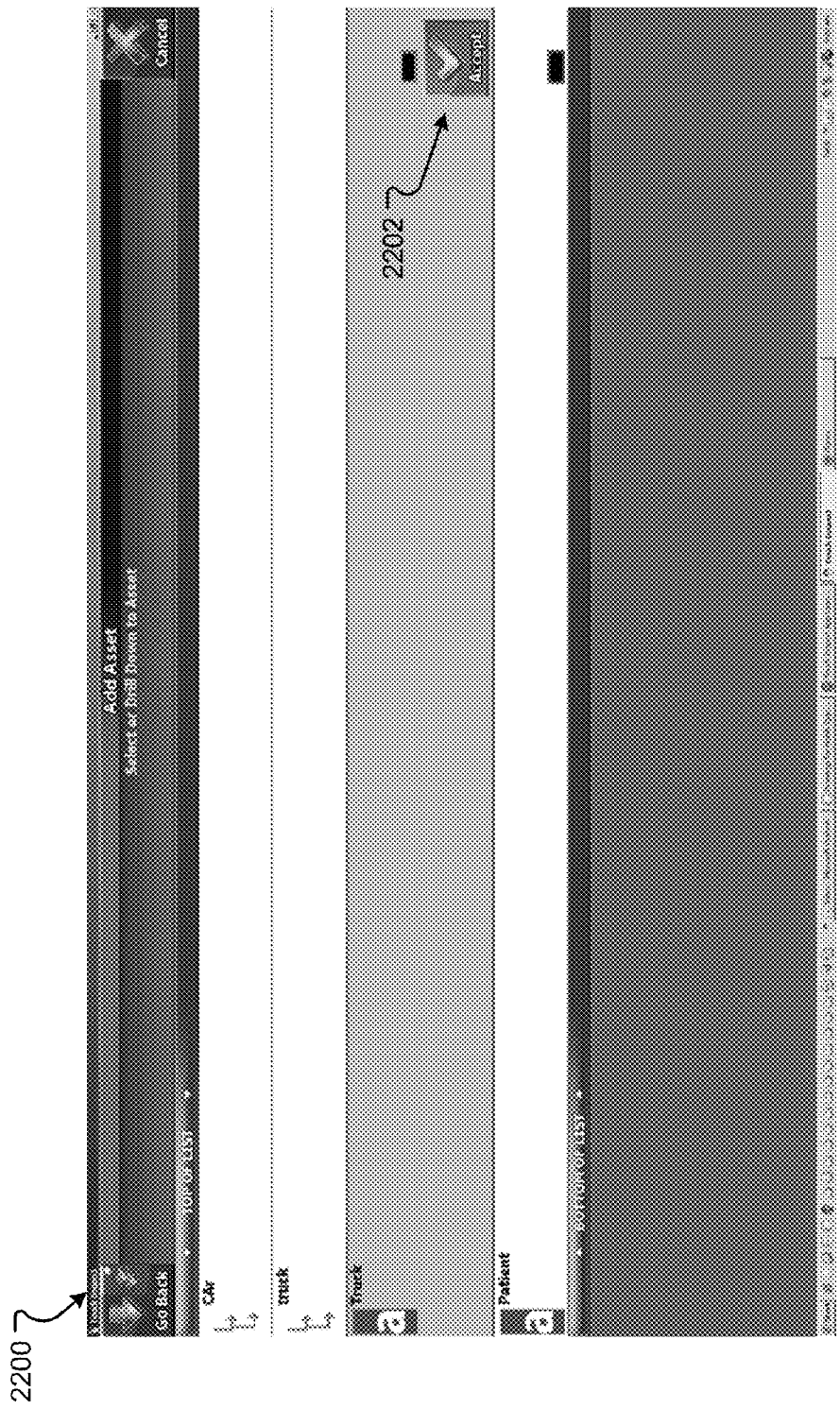
FIG. 22 includes a another view of an embodiment of a touch inspect user interface.

Upon selecting the button 2102, the user is presented with user interface 2200 shown in FIG. 22. The user may add an asset in one of the asset categories defined previously with the business process designer. Herein, the user may select an asset or a node to drill down to an asset. The asset "truck" is selected showing that the user may accept this selection with the accept button 2202. Upon selecting the accept button 2202, the user is presented with user interface 2300 shown in FIG. 23.

Figure 23:
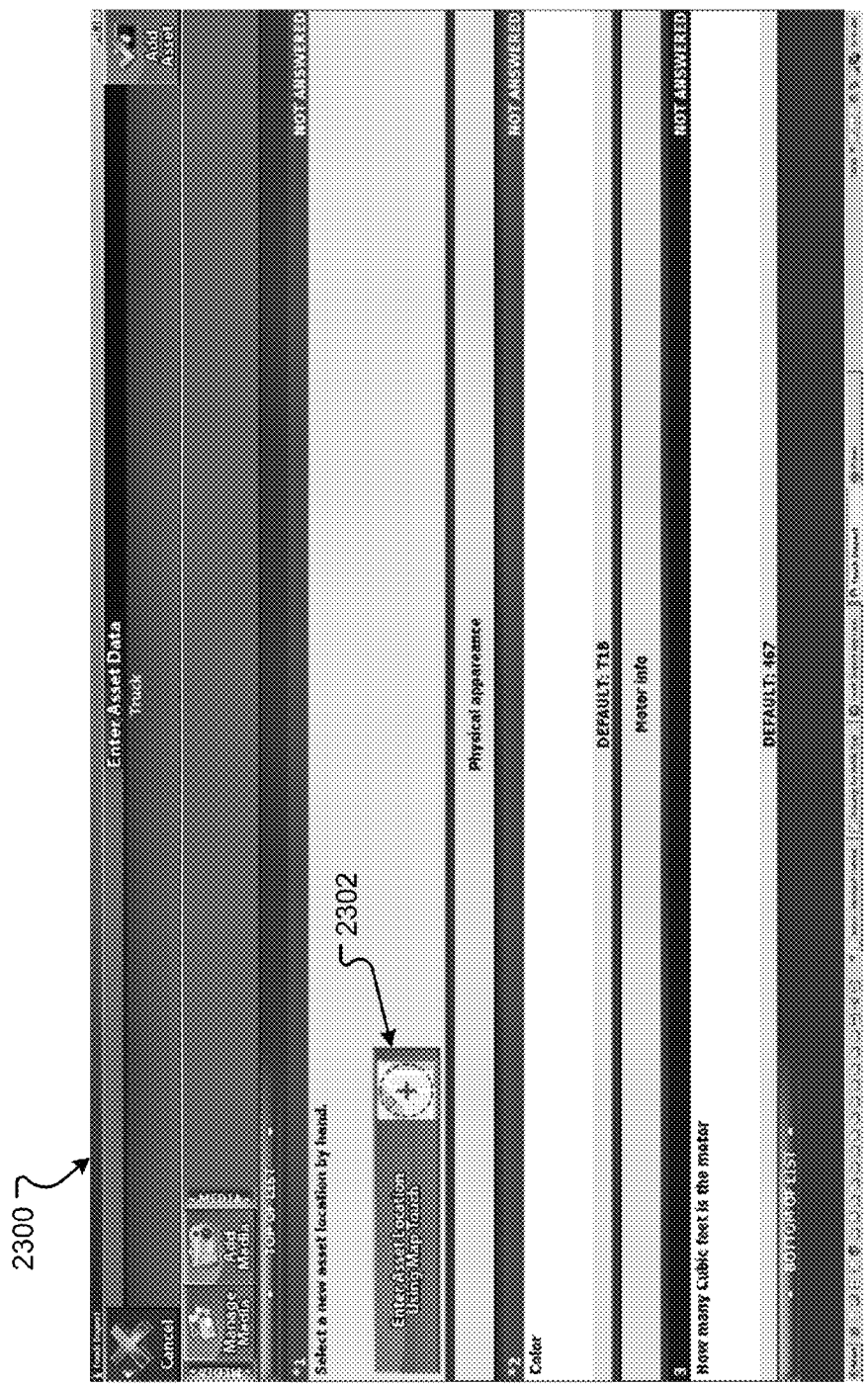
FIG. 23 includes a another view of an embodiment of a touch inspect user interface.
Figure 24:
FIG. 24 includes a another view of an embodiment of a touch inspect user interface.
Figure 25:
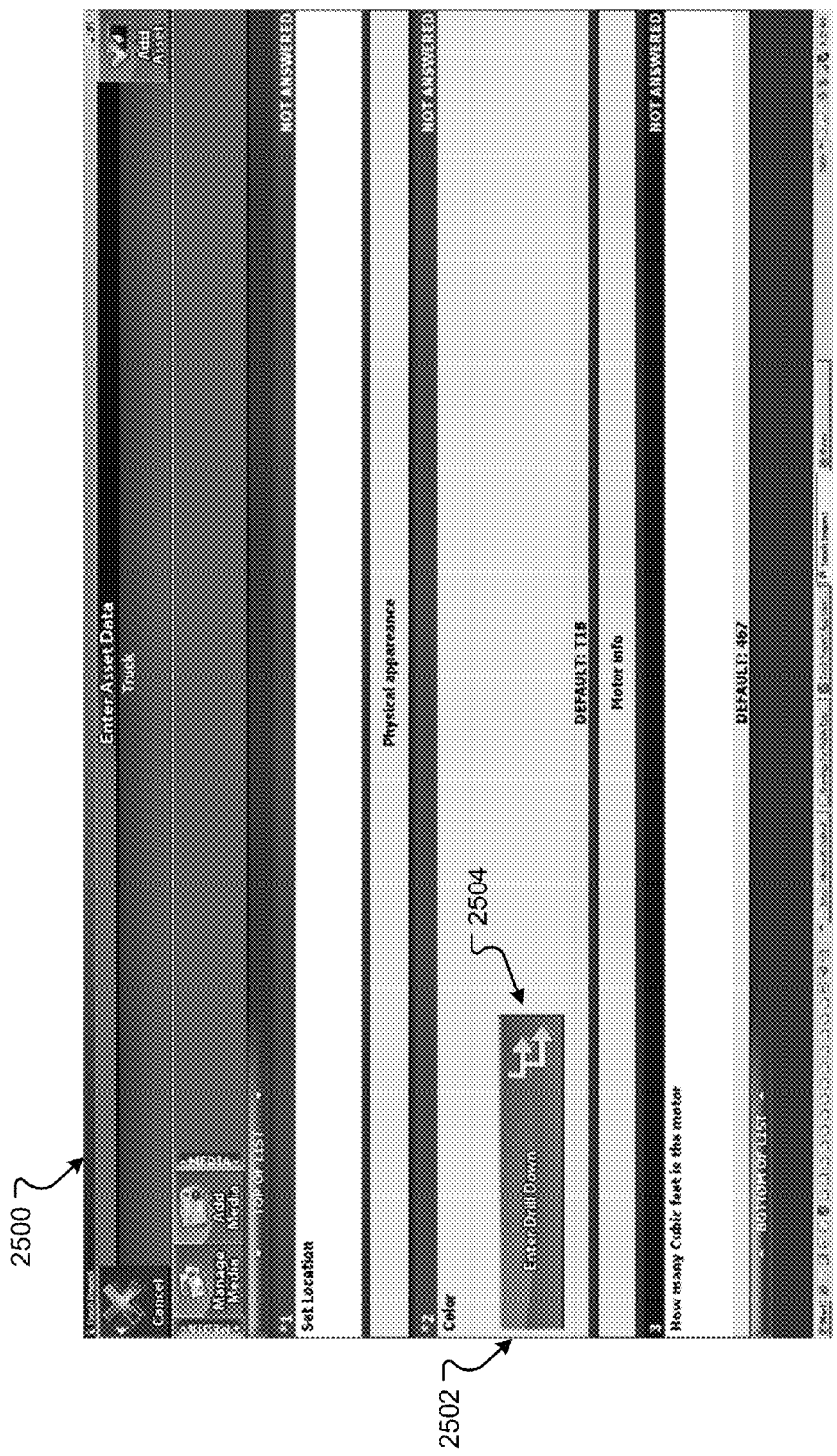
FIG. 25 includes a another view of an embodiment of a touch inspect user interface.
Figure 26:
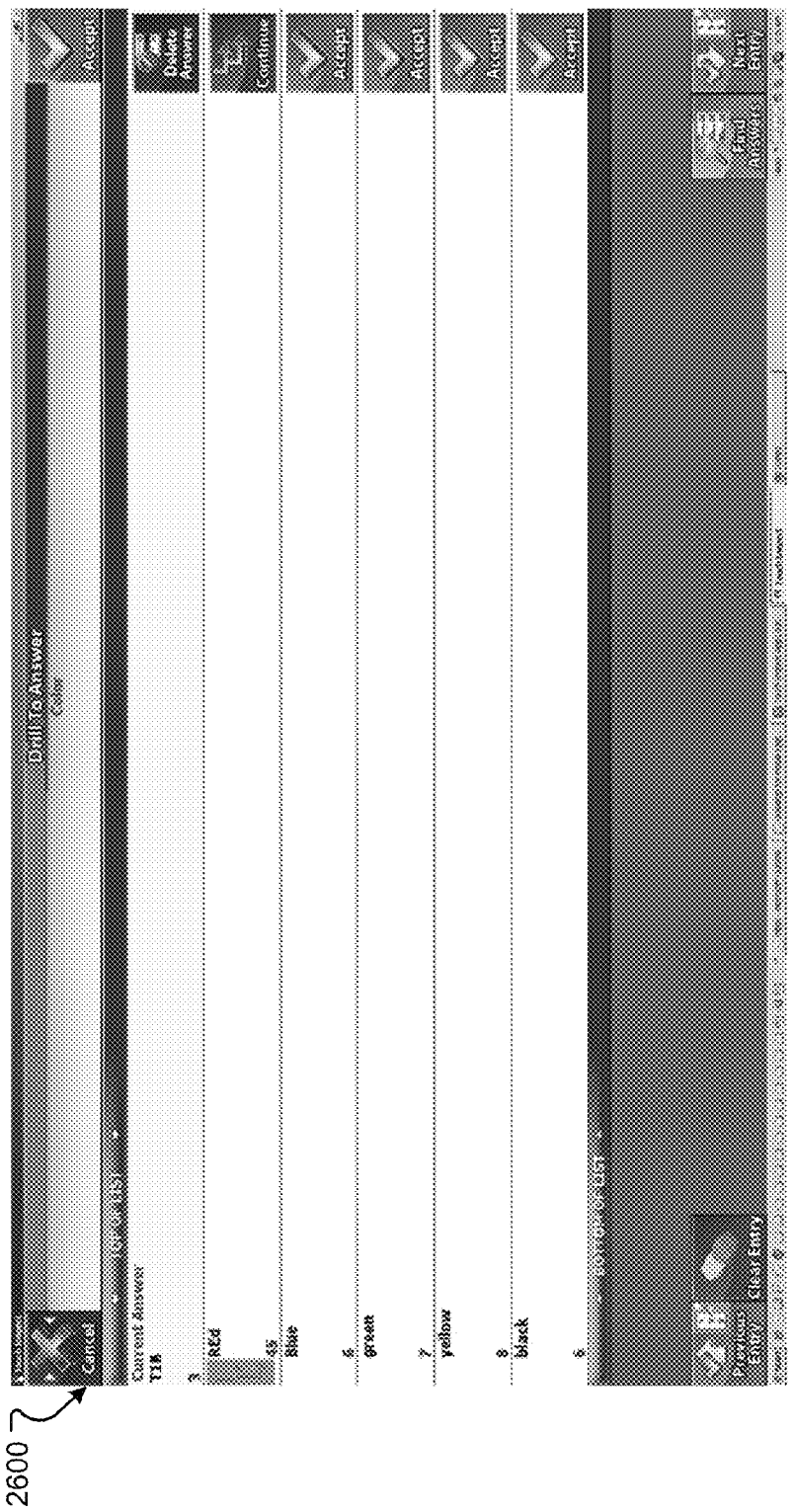
FIG. 26 includes a another view of an embodiment of a touch inspect user interface.
Figure 27:
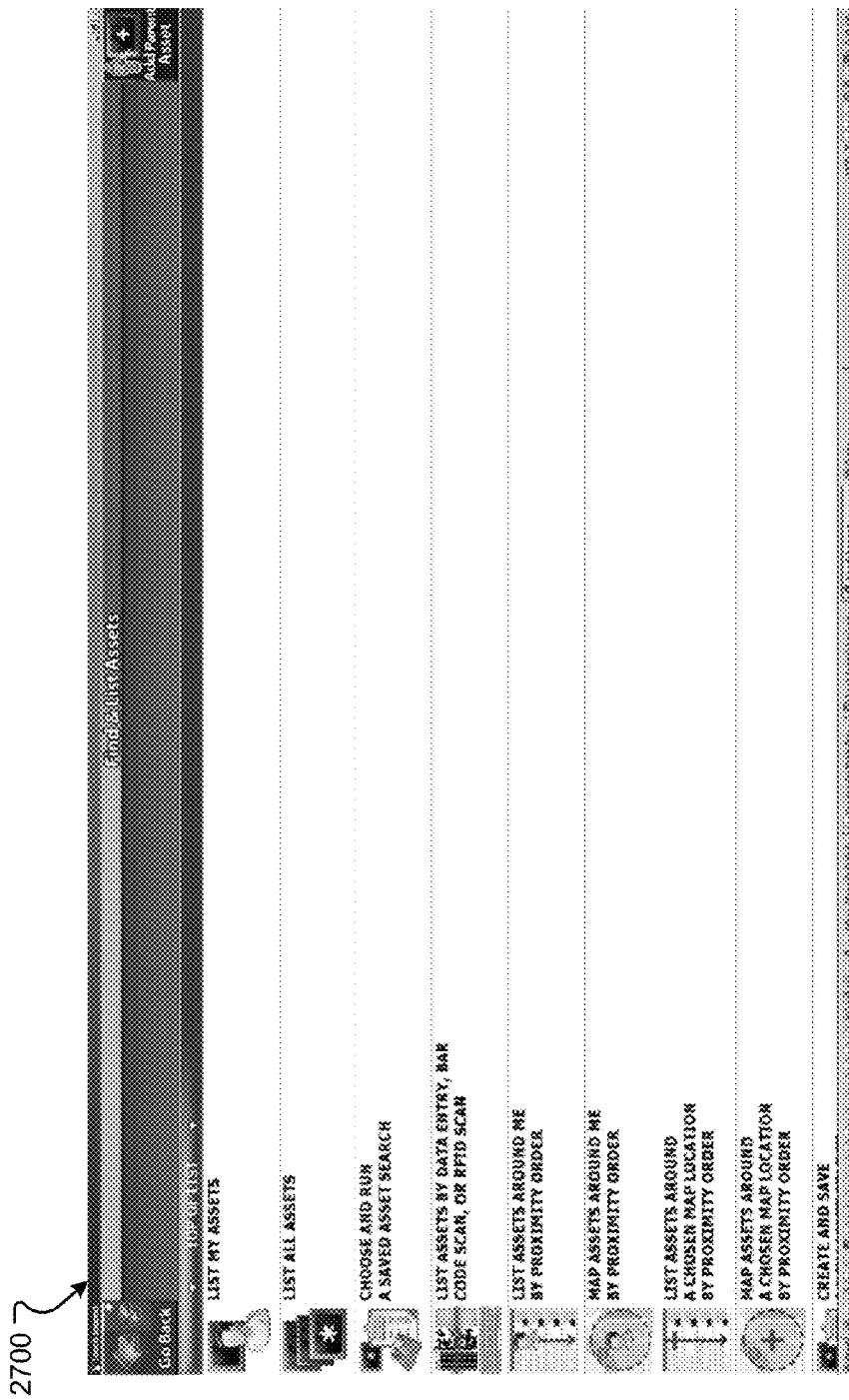
FIG. 27 includes a another view of an embodiment of a touch inspect user interface.
Figure 28:
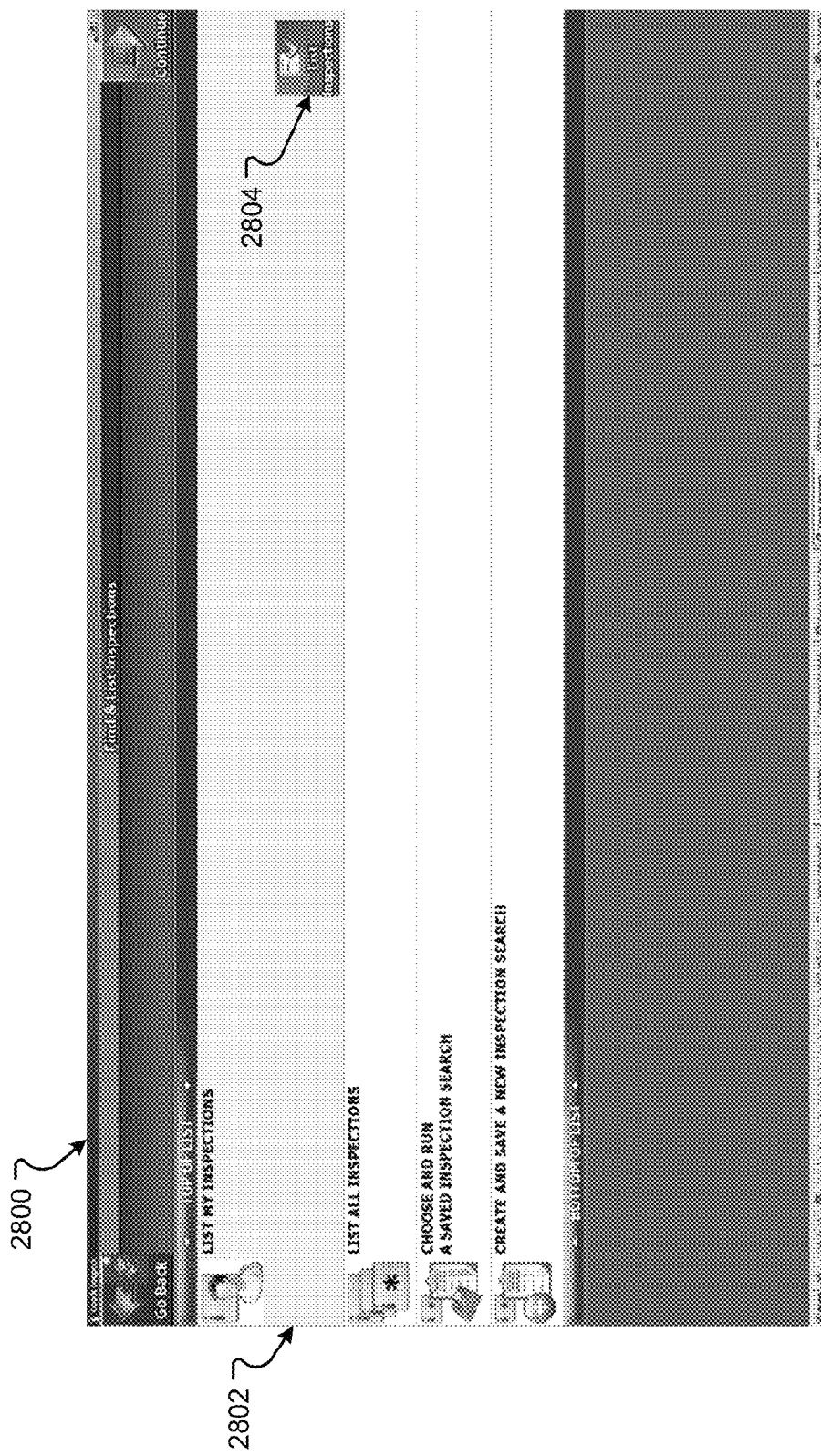
FIG. 28 includes a another view of an embodiment of a touch inspect user interface.

In FIG. 23, the user may start assigning properties to the specific asset as defined in FIGS. 1-16 for the business process designer. For example, in selecting field 1, the user is presented with a location selection tool to determine the location of an asset using a map. Upon selecting the button 2302, the user may be presented with a location to accept. This location may be as shown in user interface 2400 in FIG. 24. In embodiments, the map shown in FIG. 24 comprises one or more map tiles. Large maps can be composed of two or tiles. The tiles may be stored in the same way as the objects in the database, as described in conjunction with FIG. 38. Thus, an index of map tiles describes the map tiles and the tiles are stored in a map table. When a user is in a determined location, the required map tile can be determined from the index. The user may return to select a new property for the asset, such as the color of the asset, as shown in user interface 2500 in FIG. 25. The color is represented in field 2502. Upon selecting a color property, the user may be presented with a button 2504 to enter a drill down to choose a color. As shown previously, the colors were defined in a drop down list as assigned by the user in the business process designer. Upon selecting the button, 2504, the user is presented with a list shown in user interface 2600 of FIG. 26. The user may select a color from the list in user interface 2600 to assign the color property.

Returning to FIG. 21, upon selecting the button 2104 showing FIG. 21, the user may be presented with means for doing a search for assets as entered in the previous screens. Upon selecting button 2104, the user is presented with user interface 2700 shown in FIG. 27. These different selectable searches provide the user with the ability to find assets previously defined. Upon selecting the find and list assets button 2106, the user is presented with user interface 2800 shown in FIG. 28. Here, the user may list inspections, by selecting button 2804 in field 2802, which can be done on the assets defined previously. Upon selecting the field 2802, the system provides user interface device 2804 to list inspections. Upon selecting user interface device 2804, the user is presented with screen 2900 shown in FIG. 29.

In user interface 2900, one or more inspections can be shown. The inspections may be previously completed. For example, a previous inspection on the tire pressure of a truck is shown in field 2902. The previous inspection or process 2902 was executed by measuring the tire pressure associated with a tire. The timestamp of when the process was conducted is shown in field 2902. This process can be as previously described in conjunction with FIG. 16. Upon selecting the tire pressure process, the information about the results of the process can be shown as in FIG. 30.

Figure 30:
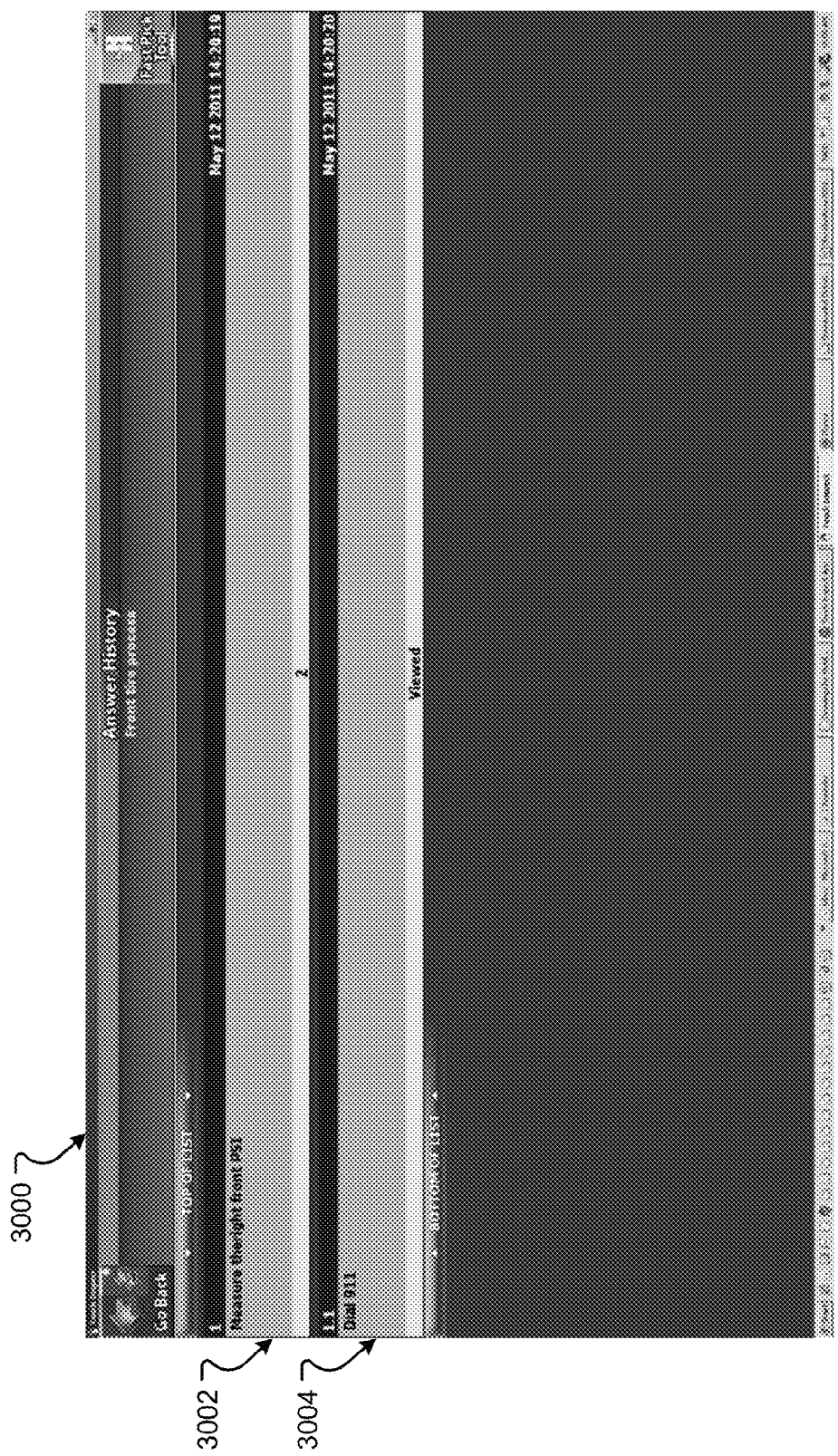
FIG. 30 includes a another view of an embodiment of a touch inspect user interface.

Upon selecting the user interface field 2902, user interface 3000 is presented to the user, as shown in FIG. 30. The user interface 3000 shows the two steps of the tire pressure process and when those two steps were conducted (represented by the timestamps). Thus, the first step is shown in field 3002, and the second step is shown in field 3004. Thus, every inspection that is conducted by the rapidly configurable application can be stored and time stamped to allow for subsequent viewing of the data entered from the process.

Returning again to FIG. 21, the user selects user interface device 2108 to view a list of incomplete inspections or inspections that have yet to be finished. Further, by selecting the "synchronize data now" button 2110, the user can synchronize data between a master data base and a handheld unit used by the user. The data synchronization is conducted only for data to which the user has an interest. Thus, as the user is assigned to certain processes (described in conjunction with FIG. 20), only data dealing with those processes or assets that are assigned to the employee or the employee's associated groups are provided to the employee. Thus, the user does not have complete copy of all information about the enterprise, but only that which is most important to them. This segregation of data helps lower the data transmission needs for the system while maintaining data integrity with mobile devices using the rapidly configurable application shown in 2100.

Figure 33:
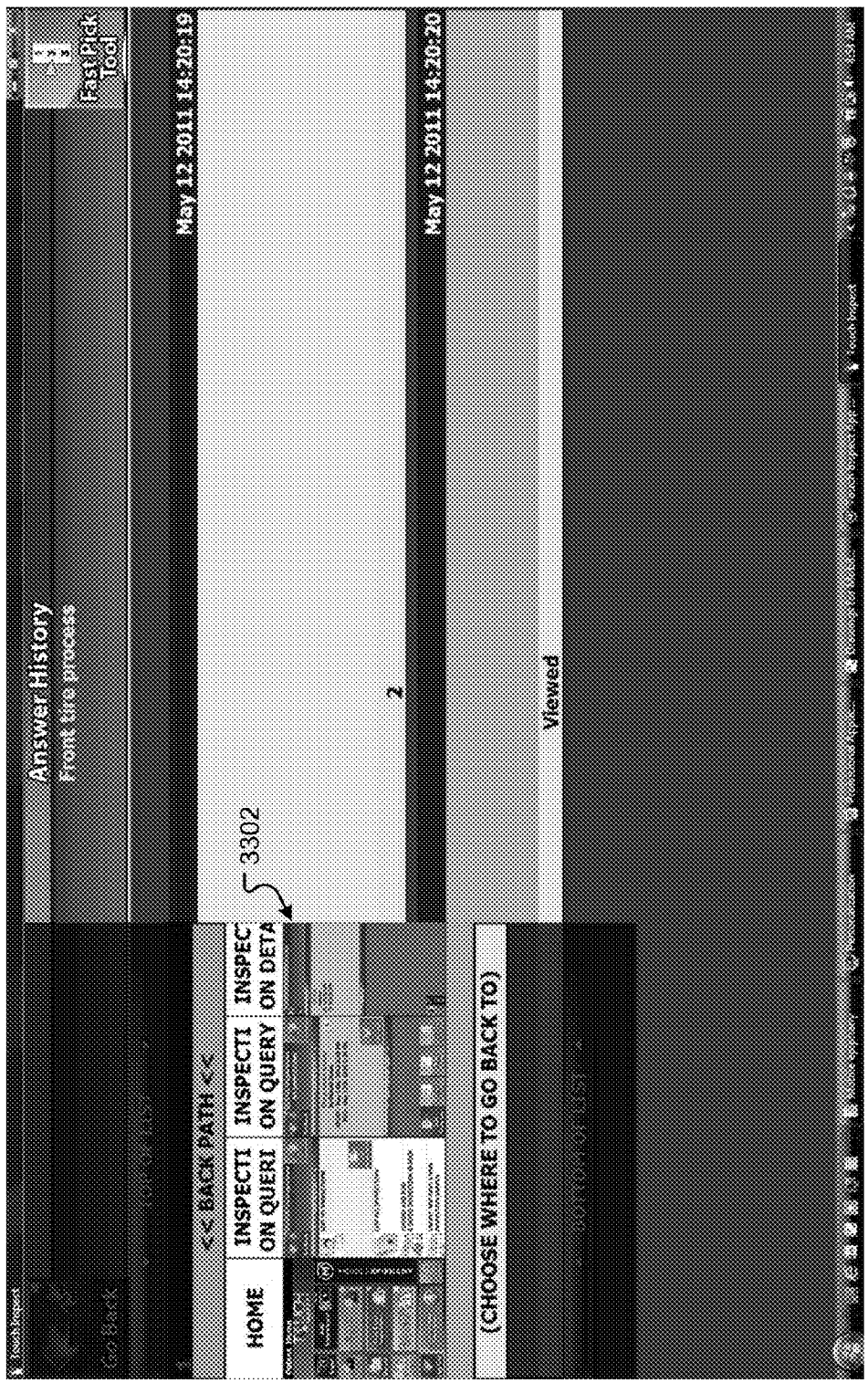
FIG. 33 is a view of an embodiment of a visual back path.

Navigating in the rapidly configurable application can be difficult. To help with the navigation, the system provides a "visual back path", as shown in FIG. 33. The visual back path is shown in user interface section 3302. The visual back path comprises visual images of user interfaces previously navigated. Thus, the visual back path can include the screens navigated through to reach the present user interface or any parallel paths navigated previously. To return to any of the previous screens, the user can simply select the representation of the previous screen and be provided with that previous user interface.

Figure 31:
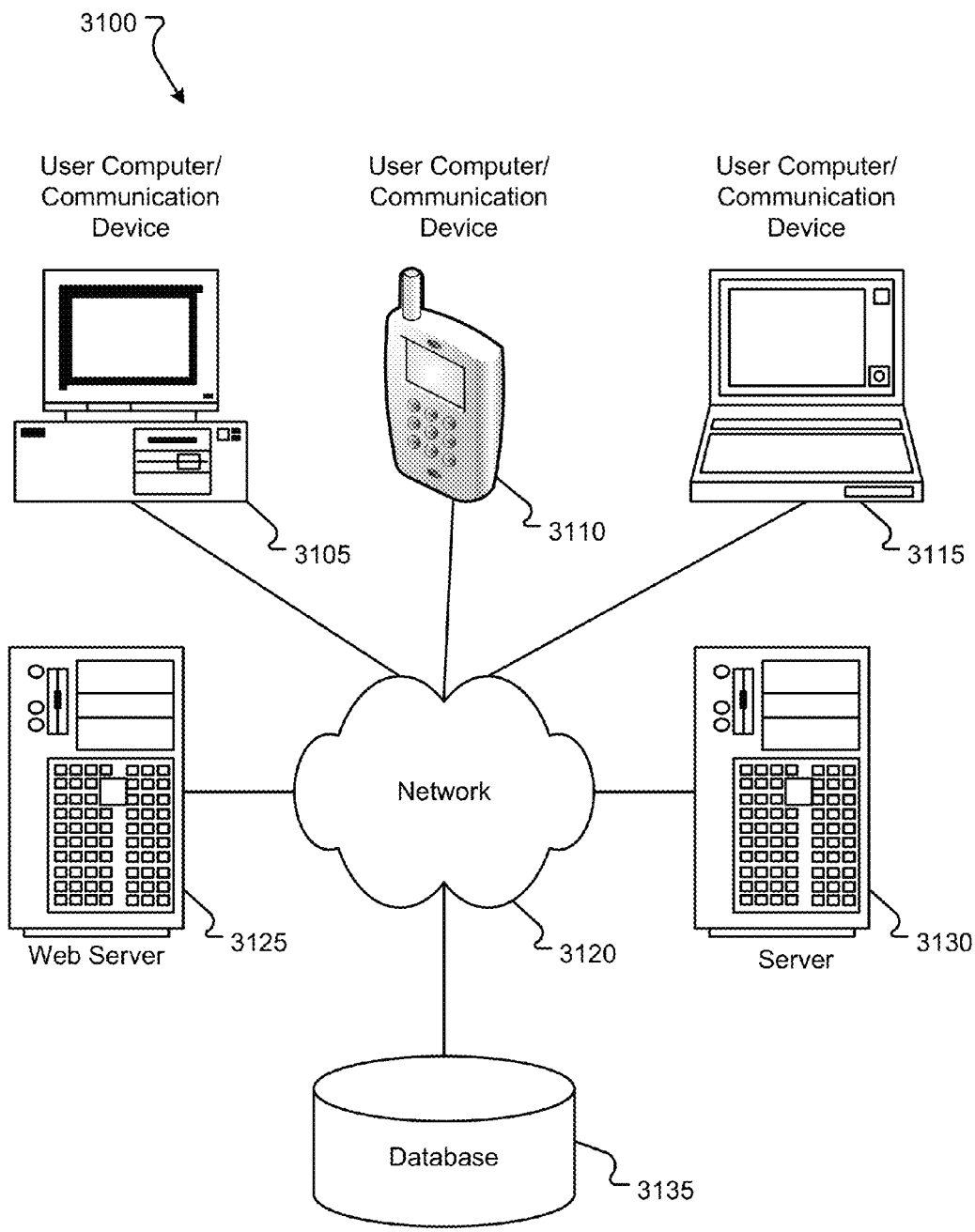
FIG. 31 is a block diagram of an embodiment of a computer environment where the touch inspect system may function.

FIG. 31 illustrates a block diagram of a computing environment 3100 wherein the systems, devices, servers, software modules, etc. may execute. As such, the system or components described in conjunction with FIG. 31 may be commodity hardware. The computing environment 3100 includes one or more user computers 3105, 3110, and 3115. The user computers 3105, 3110, and 3115 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 3105, 3110, and/or 3115 may also have any of a variety of applications, including for example, database client and/or server applications, and web browser applications. Alternatively, the user computers 3105, 3110, and 3115 may be any other electronic device, such as a thin-client computer, Internet-enabled mobile telephone, and/or personal digital assistant, capable of communicating via a network (e.g., the network 3120 described below) and/or displaying and navigating web pages or other types of electronic documents. Although the exemplary computing environment 3100 is shown with three user computers, any number of user computers may be supported.

Computing environment 3100 further includes a network 3120. The network 3120 can be any type of network familiar to those skilled in the art that can support data communications using any of a variety of commercially-available protocols, including without limitation SIP, TCP/IP, SNA, IPX, AppleTalk, and the like. Merely by way of example, the network 3120 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 3125, 3130. One server may be a web server 3125, which may be used to process requests for web pages or other electronic documents from user computers 3105, 3110, and 3120. The web server can be running an operating system including any of those discussed above, as well as any commercially-available server operating systems. The web server 3125 can also run a variety of server applications, including SIP servers, HTTP servers, FTP servers, CGI servers, database servers, Java servers, and the like. In some instances, the web server 3125 may publish operations available operations as one or more web services.

The computing environment 3100 may also include one or more file and or/application servers 3130, which can, in addition to an operating system, include one or more applications accessible by a client running on one or more of the user computers 3105, 3110, 3115. The server(s) 3130 may be one or more general purpose computers capable of executing programs or scripts in response to the user computers 3105, 3110 and 3115. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 3130 may also include database servers, including without limitation those commercially available from Oracle, Microsoft, Sybase™, IBM™ and the like, which can process requests from database clients running on a user computer 3105.

The web pages created by the web application server 3130 may be forwarded to a user computer 3105 via a web server 3125. Similarly, the web server 3125 may be able to receive web page requests, web services invocations, and/or input data from a user computer 3105 and can forward the web page requests and/or input data to the web application server 3130. In further embodiments, the server 3130 may function as a file server. Although for ease of description, FIG. 31 illustrates a separate web server 3125 and file/application server 3130, those skilled in the art will recognize that the functions described with respect to servers 3125, 3130 may be performed by a single server and/or a plurality of specialized servers, depending on implementation-specific needs and parameters. The computer systems 3105, 3110, and 3115, file server 3125 and/or application server 3130 may function as the active host 102 and/or the standby host 1031.

The computing environment 3100 may also include a database 3135. The database 3135 may reside in a variety of locations. By way of example, database 3135 may reside on a storage medium local to (and/or resident in) one or more of the computers 3105, 3110, 3115, 3125, 3130. Alternatively, it may be remote from any or all of the computers 3105, 3110, 3115, 3125, 3130, and in communication (e.g., via the network 3120) with one or more of these. In a particular set of embodiments, the database 3135 may reside in a storage-area network ("SAN") familiar to those skilled in the art. Similarly, any necessary files for performing the functions attributed to the computers 3105, 3110, 3115, 3125, 3130 may be stored locally on the respective computer and/or remotely, as appropriate. In one set of embodiments, the database 3135 may be a relational database, such as Oracle 10i™ or Microsoft SQL Server 2008, which is adapted to store, update, and retrieve data in response to SQL-formatted commands.

Figure 32:
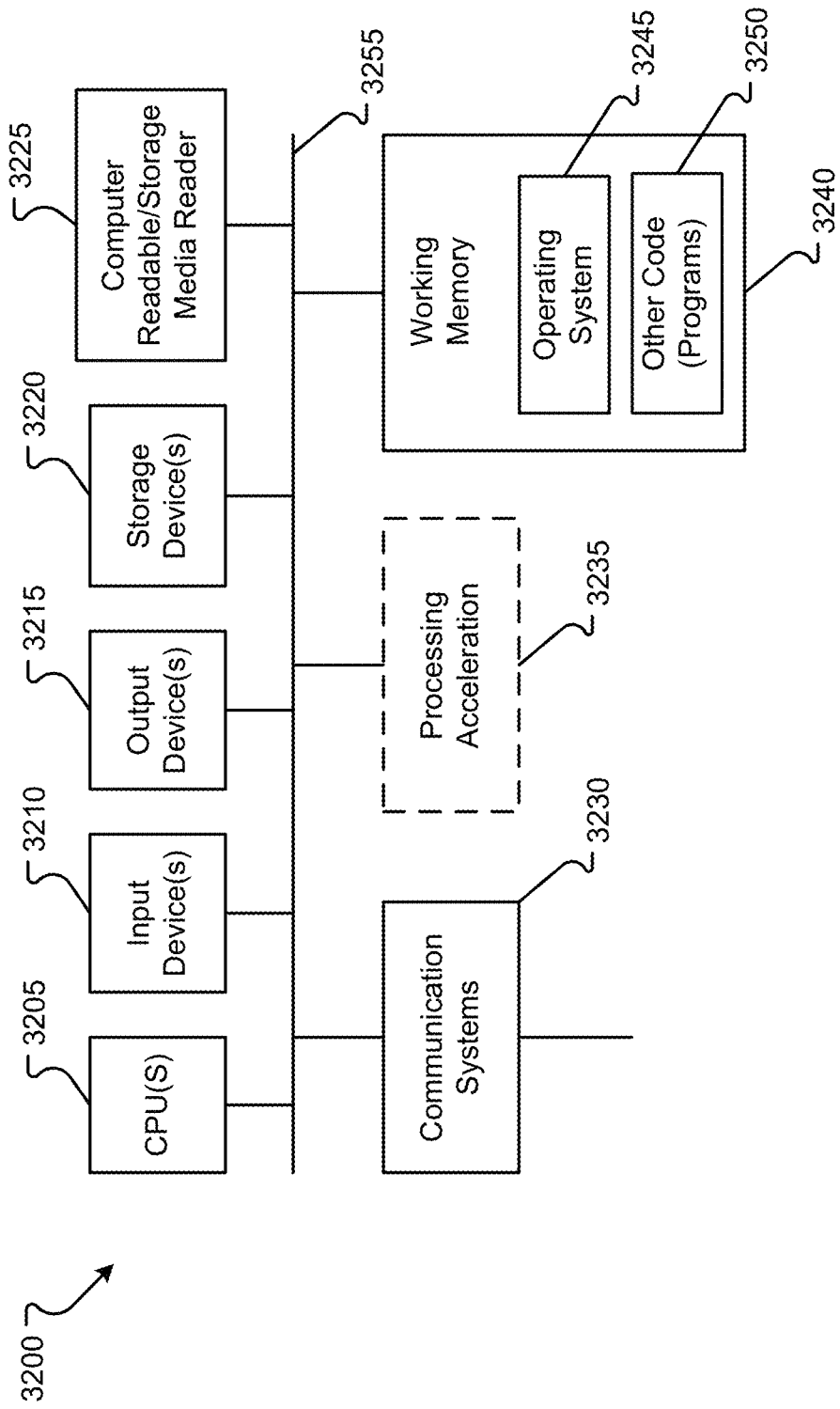
FIG. 32 is a block diagram of an embodiment of a computing device where the touch inspect system may function.

FIG. 32 illustrates one embodiment of a computer system 3200 upon which the systems, devices, servers, software modules, etc. described herein may be deployed or executed. The computer system 3200 is shown comprising hardware elements that may be electrically coupled via a bus 3232. The hardware elements may include one or more central processing units (CPUs) 3205; one or more input devices 3210 (e.g., a mouse, a keyboard, etc.); and one or more output devices 3215 (e.g., a display device, a printer, etc.). The computer system 3200 may also include one or more storage devices 3220. By way of example, storage device(s) 3220 may be disk drives, optical storage devices, solid-state storage devices such as a random access memory ("RAM") and/or a read-only memory ("ROM"), which can be programmable, flash-updateable and/or the like.

The computer system 3200 may additionally include a computer-readable storage media reader 3225; a communications system 3230 (e.g., a modem, a network card (wireless or wired), an infra-red mobile device, etc.); and working memory 3240, which may include RAM and ROM devices as described above. In some embodiments, the computer system 3200 may also include a processing acceleration unit 3235, which can include a DSP, a special-purpose processor, and/or the like.

The computer-readable storage media reader 3225 can further be connected to a computer-readable storage medium, together (and, optionally, in combination with storage device(s) 3220) comprehensively representing remote, local, fixed, and/or removable storage devices plus storage media for temporarily and/or more permanently containing computer-readable information. The communications system 3230 may permit data to be exchanged with the network 420 and/or any other computer described above with respect to the computer system 3200. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 3200 may also comprise software elements, shown as being currently located within a working memory 3240, including an operating system 3245 and/or other code 3250. It should be appreciated that alternate embodiments of a computer system 3200 may have numerous variations from that described above. For example, customized hardware might also be used and/or particular elements might be implemented in hardware, software (including portable software, such as applets), or both. Further, connection to other computing devices such as network input/output devices may be employed.

Figure 34:
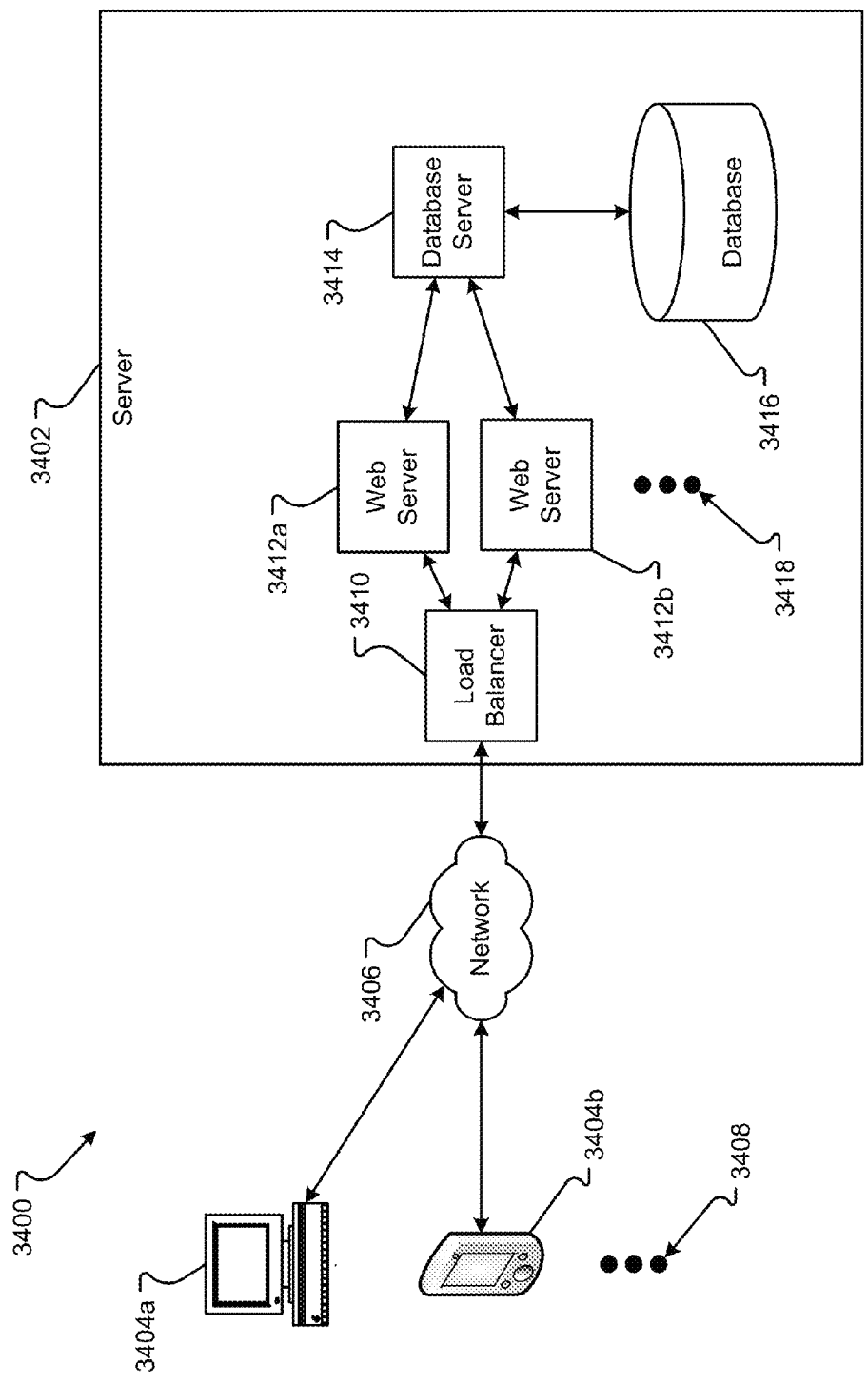
FIG. 34 is a block diagram of an embodiment of a server(s) that may execute components of or functions associated with the touch inspect system.

A system 3400 operable to execute the user interfaces and methods described above is shown in FIG. 34. Here, a server 3402 is in communication with one or more user devices 3404 through a network 3406. The user devices 3404 can include any computing device operable to interact with the server and the user. These user devices 3404 can include desktop computers, laptop computers, mobile devices, personal digital assistants, mobile telephones, etc. While two devices are shown in FIG. 34, there may be more or fewer devices in the system 3400, as represent by ellipses 3408.

The network 3406 can be any system, connection, or means for communicating between computing devices. Thus, the network 3406 can include a local area network, wide area network, cellular network, wireless network, etc. Networks are further defined herein and understood by those skilled in the art. Thus, networks will not be described further.

The server 3402 can include any hardware and/or software for executing the actions described herein. The server 3402 can include one or more components that may represent separate computer systems or electrical components or may software executed on a computer system. These components include a load balancer 3410, one or more web servers 3412a, 3412b, a database server 3414, and/or a database 3416. The load balancer 3410 is operable to receive a communication from the user device 3404 and can determine to which web server 3412 to send the communication. Thus, the load balancer 3410 can manage, based on the usage metrics of the web servers 3412, which web server 3412 will receive incoming communications. Once a communication session is assigned to a web server 3412, the load balancer 3410 may not receive further communications. However, the load balancer 3410 may be able to redistribute load amongst the web servers 3412 if one or more web servers 3412 become overloaded.

The one or more web servers 3412 are operable to provide web services to the user devices 3404. The web services may be as described hereinafter in FIG. 35. In embodiments, the web server 3412 receives data or requests for data and communicates with the database server 3414 to store or retrieve the data. As such, the web server 3412 functions as the intermediary to put the data in the database 3416 into a usable form for the user devices 3404. While there are two web servers 3412 shown in FIG. 34, there may be more or fewer web servers 3412, as represented by ellipses 3418.

The database server 3414 is any hardware and/or software operable to communicate with the database 3416 and to manage the data within the database 3416. Database servers, for example, SQL server, are well known in the art and will not be explained further herein. The database 3416 can be any storage mechanism, whether hardware and/or software, for storing and retrieving data. The database can be as described further herein.

Figure 35:
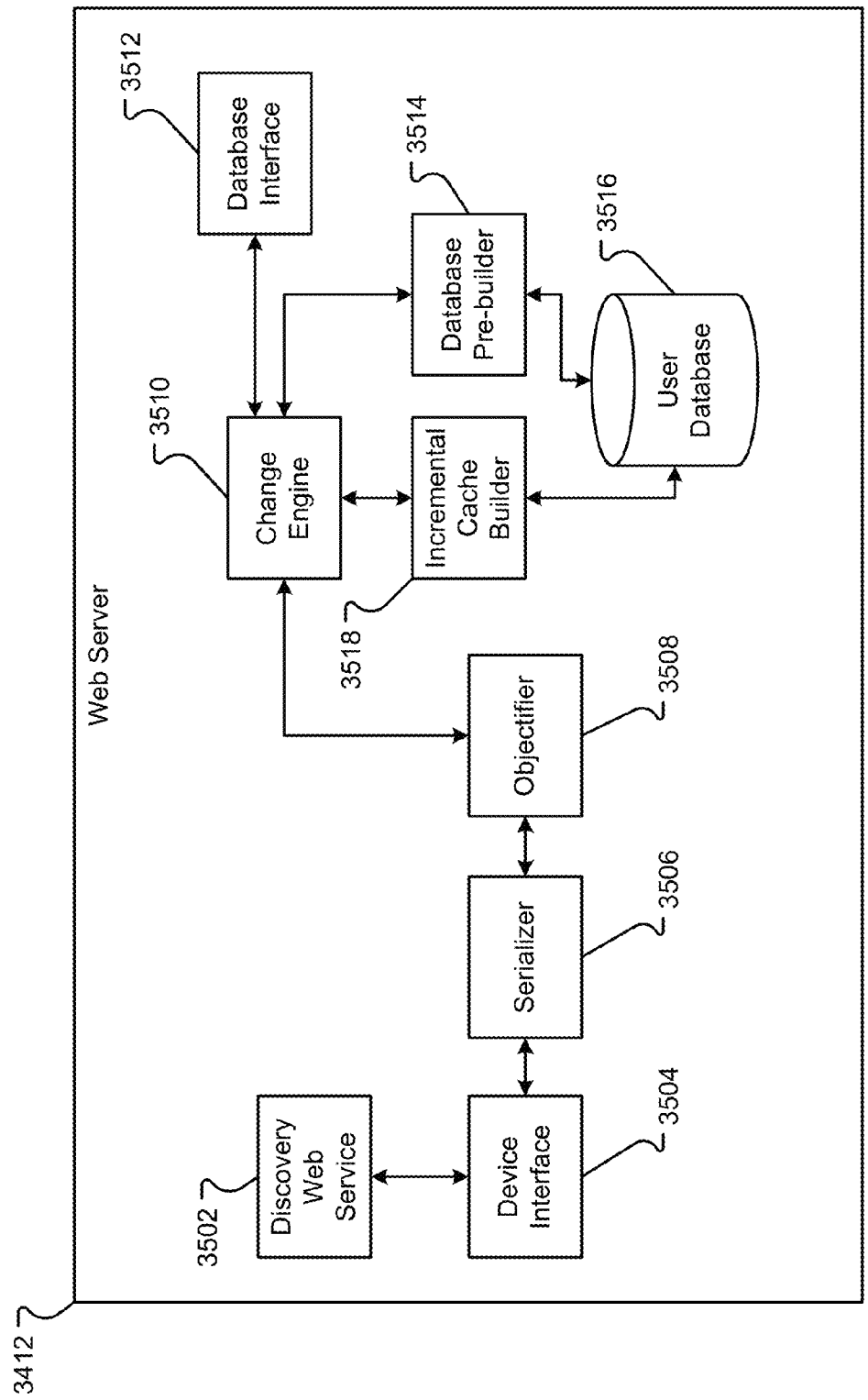
FIG. 35 is a block diagram of an embodiment of a web server(s) that may execute components of or functions associated with the touch inspect system.

An embodiment of a web server 3412 is shown in FIG. 35. The components of the web server 3412 can include hardware and/or software components. In embodiments, the web server 3412 includes a discovery web service 3502. The discovery web service 3502 is operable to receive a first request from a user device 3404. The first request is mapped to a predetermined web server 3412. Thus, each user device 3404 is associated with a predetermined one or more web servers 3412 associated with the enterprise or organization of the user and/or user device. The discovery web service 3502 extracts information from the request, e.g., the user's name, a user device identifier (e.g., a cell phone number, an Internet Protocol (IP) address, etc.), or some other identifying information. This information is compared to a stored table or other data to match the user device to an assigned web server 3412. If the user device 3404 is assigned to the web server 3412, the request is passed to the device interface 3504. However, if the user device 3404 is mapped to another web server 3412, the discovery web service 3502 can redirect the request and the user device 3404 by replying to the request with a redirect message that includes the uniform resource locator (URL) for the other web server 3412. In this way, the system 3400 is expandable, as new web servers 3412 can be easily added as new enterprises use the system 3400.

The web server 3412 can also include a device interface 3504. The device interface 3504 is any hardware/software operable to send or receive communications between the web server 3412 and the one or more user devices 3404. In embodiments, the device interface 3504 can be software for creating or receiving web messages in one or more formats or protocols, such as hypertext transfer protocol (HTTP), session initiation protocol (SIP), etc. These messages can be received by the device interface 3504, parsed, and read for the other components of the web server 3412. The information needed by the other components can then be sent to those components. Further, the device interface 3504 can receive information from the other components and package the information into a message for a user device 3404.

A serializer 3506 is a component that serializes or de-serializes objects that form data transfer messages in the system. In embodiments, data for the application described herein is transmitted in an encrypted message that is composed of serialized objects. Each object in the message represents a discrete change to the database. The serializer 3506 places the objects in a serial format where each object data follows another object data, without overlap. The objects can form a single string of objects that may be serialized based on the date stamps of the changes, the order in which the objects were received by the serializer 3506, or by other information. Further, the serializer 3506 can de-serialize a message received from a user device 3404. Thus, the serializer 3506 packs and unpacks the messages. In embodiments, each object within the message is also encrypted, thus, providing an additional level of security for the information in the message.

An objectifier 3508 can create objects from information received from the database 3416. Thus, the objectifier 3508 creates an object for each discrete change made to the user's data. The object can include the change data, change metadata, and any other information needed to form the object. Thereinafter, the objectifier 3508 may encrypt the object and send it to the serializer 3506. Further, the objectifier 3508 can receive de-serialized objects from the serializer 3506. The data within the received objects may be extracted and provided to the change engine 3510 for inclusion in the database 3416.

A change engine 3510 is operable to manage changes to the database 3416. The change engine 3510 can receive database changes from the objectifier 3508 and send those changes to the database interface 3512. The database interface 3512 is operable to communication with the database server 3414 to have data stored in the database 3416 or to retrieve data from the database 3418. Thus, the database interface 3512 automatically creates or receives the appropriate messages for and from the database server 3414 to affect changes to the database 3416.

The change engine 3510 can also manage changes for each user device 3404. Thus, the change engine 3510 determine what updates are needed for a user device 3404. Thus, when a user device 3404 pulls changes, the change engine 3510 can determine, from the timestamp in the request from the user device 3404, which changes need to be included in the changes sent to the user device 3404. In further embodiments, if the user device 3404 has never received the database, the change engine 3510 can communicate with the database pre-builder 3514 to receive the initial database.

Figure 20:
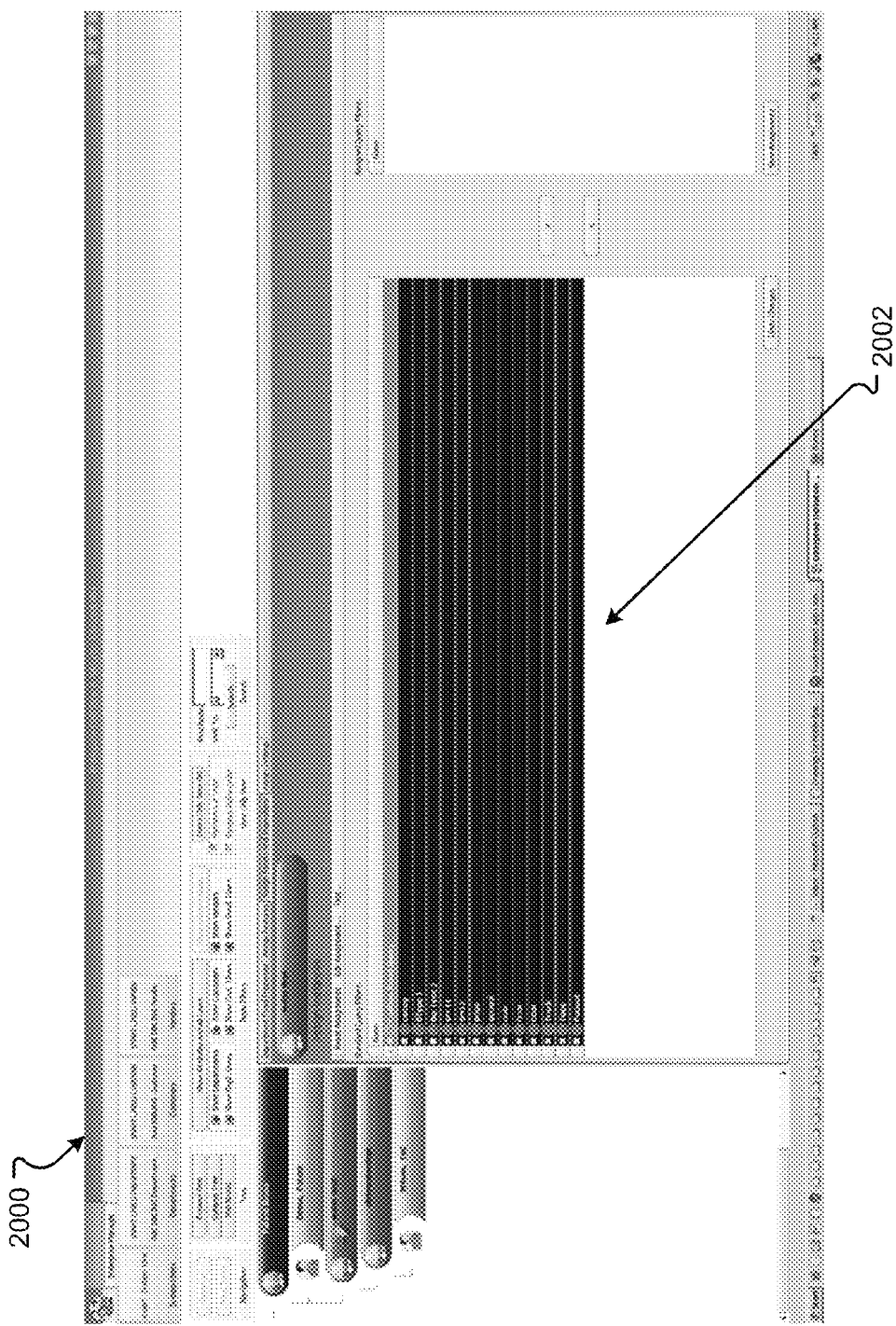
FIG. 20 includes a another view of an embodiment of a touch inspect user interface.

The database pre-builder 3514 is operable to create a user database 3516 for each category of user. For example, as shown in FIG. 20, the user Tad Wilson is associated with the employee category "water dept." As such, Tad Wilson requires a database that includes the assets and processes associated with the group "water dept." The database pre-builder 3514 can pre-generate (i.e., generate the user database 3516 before communication from the user) the user database 3516 to include the data associated with the group to which the user is associated. Thus, each employee group has a separate and distinct database. Generating smaller database subsets helps to limit the amount of traffic required to communicate database changes.

After the initial database is sent to the user, the change engine 3510 is operable to send periodic changes to the user device 3404. In embodiments, the change engine 3510 may search the user database 3516 for changes. Each change made to the database 3416 from other users may be pulled by the change engine 3510 and stored in the user database 3516. Thus, any changes having a timestamp after the user's last change request (which may be stored in a log by the change engine 3510) can be determined and extracted from the user database 3516. In other embodiments, the user database 3516 can represent pointers into the database 3416. Thus, the change engine 3510 can search the database 3416 for changes by navigating the pointers or by doing a search of the database 3416. In still other embodiments, the incremental changes to the user database 3516 can be logged or stored by a regenerate cache builder 3518.

The incremental cache builder 3518 may be able to log when the user device 3404 was last updated. Using this timestamp, the incremental cache builder 3518 can log changes to the user database 3516 or to changes in the database 3416 that are associated with data that the user device 3404 requires. The incremental cache builder 3518 then compiles a log of changes to that data. When the user device 3404 request updates, the incremental cache builder 3518 can provide the change engine 3510 with the log of changes. Thus, the incremental cache builder 3518 enables the change engine 3510 to provide updates in a more efficient manner without needing to conduct a great number of searches on the user database 3516 or the database 3416.

Figure 36:
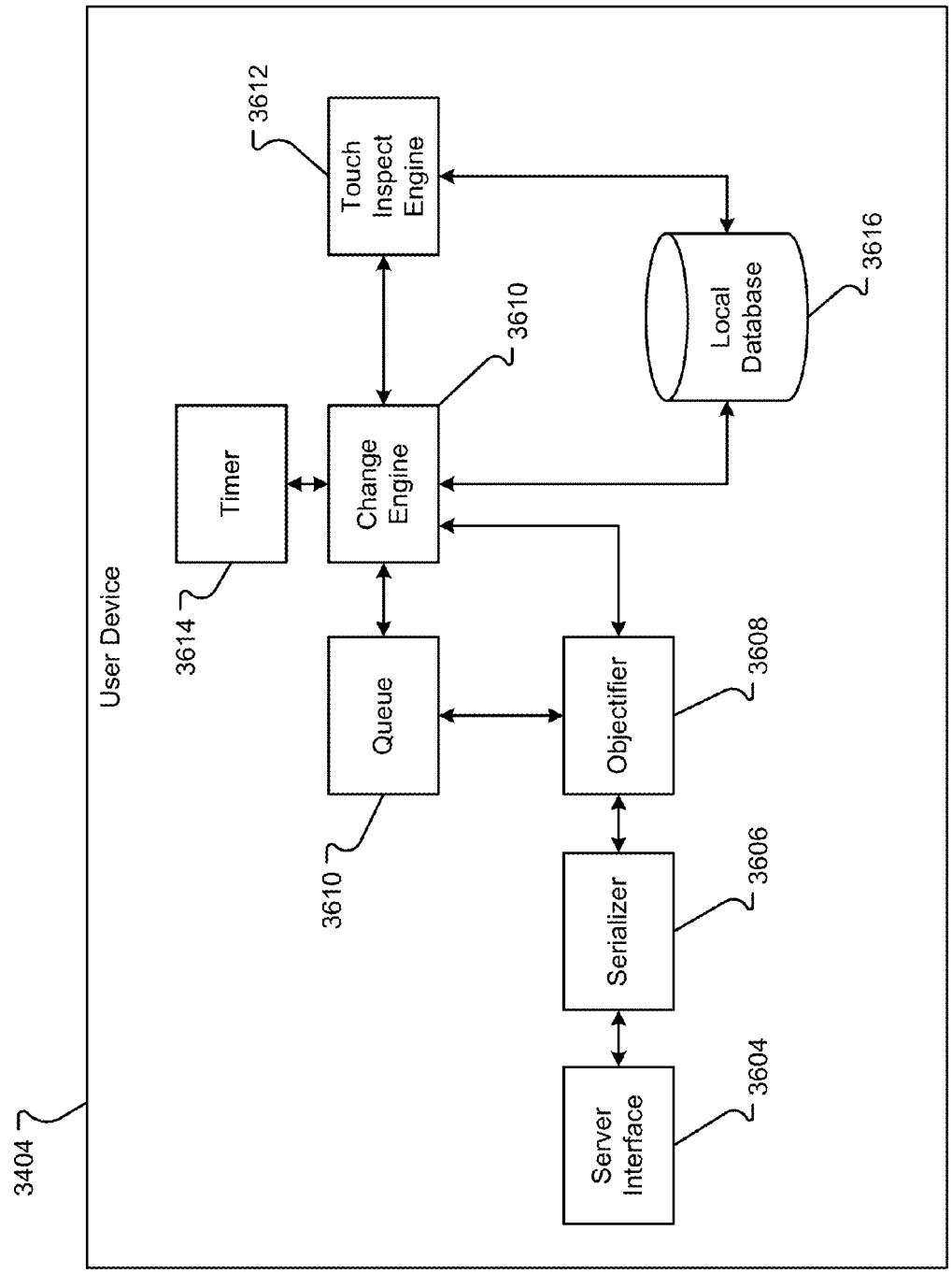
FIG. 36 is a block diagram of an embodiment of a user device(s) that may execute components of or functions associated with the touch inspect system.

An embodiment of a user device 3434 is shown in FIG. 36. The components of the user device 3404 can include hardware and/or software components. The user device 3404 can include a server interface 3604. The server interface 3604 is any hardware/software operable to send or receive communications between the server 3402 and the user device 3404. In embodiments, the server interface 3604 can be software for creating or receiving web messages in one or more formats or protocols, such as hypertext transfer protocol (HTTP), session initiation protocol (SIP), etc. These messages can be received by the server interface 3604, parsed, and read for the other components of the user device 3404. The information needed by the other components can then be sent to those components. Further, the server interface 3604 can receive information from the other components and package the information into messages for the server 3402.

A serializer 3606 can be the same or similar to serializer 3406. Thus, the serializer serializes or de-serializes objects that form data transfer messages in the system. In embodiments, data for the application executed by the Touch Inspect Engine 3612, and described herein, is transmitted in an encrypted message that is composed of serialized objects. Each object in the message represents a discrete change to the local database. The serializer 3606 places the objects in a serial format where each object data follows another object data, without overlap. The objects can form a single string of objects that may be serialized based on the date stamps of the changes, the order in which the objects were received by the serializer 3606, or by other information. Further, the serializer 3606 can de-serialize a message received from the server 3402. Thus, the serializer 3606 packs and unpacks the messages. In embodiments, each object within the message is also encrypted, thus, providing an additional level of security for the information in the message.

An objectifier 3608 can be the same or similar to objectifier 3508 and can also create objects from information received from the local database 3616. Thus, the objectifier 3608 creates an object for each discrete change made to the user's data. The object can include the change data, change metadata, and any other information needed to form the object. Thereinafter, the objectifier 3608 may encrypt the object and send it to the serializer 3606. Further, the objectifier 3608 can receive de-serialized objects from the serializer 3606. The data within the received objects may be extracted and provided to the change engine 3610 for inclusion in the local database 3616.

The change engine 3610 can be the same or similar to change engine 3510 and can be operable to manage changes to the local database 3616. The change engine 3610 can receive database changes from the objectifier 3608 and send those changes to the local database 3616 or to the touch inspect engine 3612. The database interface 3612 is operable to communication with the database server 3414 to have data stored in the local database 3616 or to retrieve data from the database 3418. Thus, the database interface 3612 automatically creates or receives the appropriate messages for and from the database server 3414 to affect changes to the local database 3616. The change engine 3610 can also manage change to the user device 3404. Thus, the change engine 3610 determines when updates are needed for the user device 3404. Thus, based on timer 3614, the change engine 3610 determines when to pull changes from the server 3402. In embodiments, the change engine 3610 determines to pull changes on a periodic schedule (e.g., every ten minutes, every hour, etc.). This schedule may be affected by communication issues—that is whether the user device 3404 can establish a communication path to the server 3402. If there are communication difficulties, the change engine 3610 may postpone the update until communications can be achieved. In other embodiments, the change engine 3610 pulls changes based on a request from the user received by the Touch Inspect Engine 3612. Regardless, the change engine 3610 can compose a message to the server 3402 to receive any changes. The message may include a timestamp and other information, such as, the timestamp of the last request for changes.

The change engine 3610 can also manage changes to the local database 3616. Thus, the change engine 3610 can determine changes made to the local database 3616 based on information from the local database 3616 or the Touch Inspect Engine 3612. The changes are sent to a queue 3610 to be sent at a next update to the server 3402. In embodiments, the change engine 3610 queues the changes and the sends a group of changes periodically to the server 3402. In other embodiments, each discrete change is sent separately to the server 3402 and the queue 3610 stores the change until a communication path is established with the server 3402.

The Touch Inspect Engine 3612 is operable to execute the configured application. As such, the Touch Inspect Engine 3612 provides a standard framework for the application as shown in FIGS. 21-30. This framework is modified by linking the configuration provided by the user to account for the data changes made by the user and stored in the local database 3616. Thus, the Touch Inspect Engine 3612 can present processes, assets, or other information to the user to conduct actions with the application. Further, the user interfaces shown in FIGS. 21-30 may be changed in appearance and presented differently by the Touch Inspect Engine 3612. In this way, the Touch Inspect Engine 3612 can customize the look and feel of the application.

Figure 37:
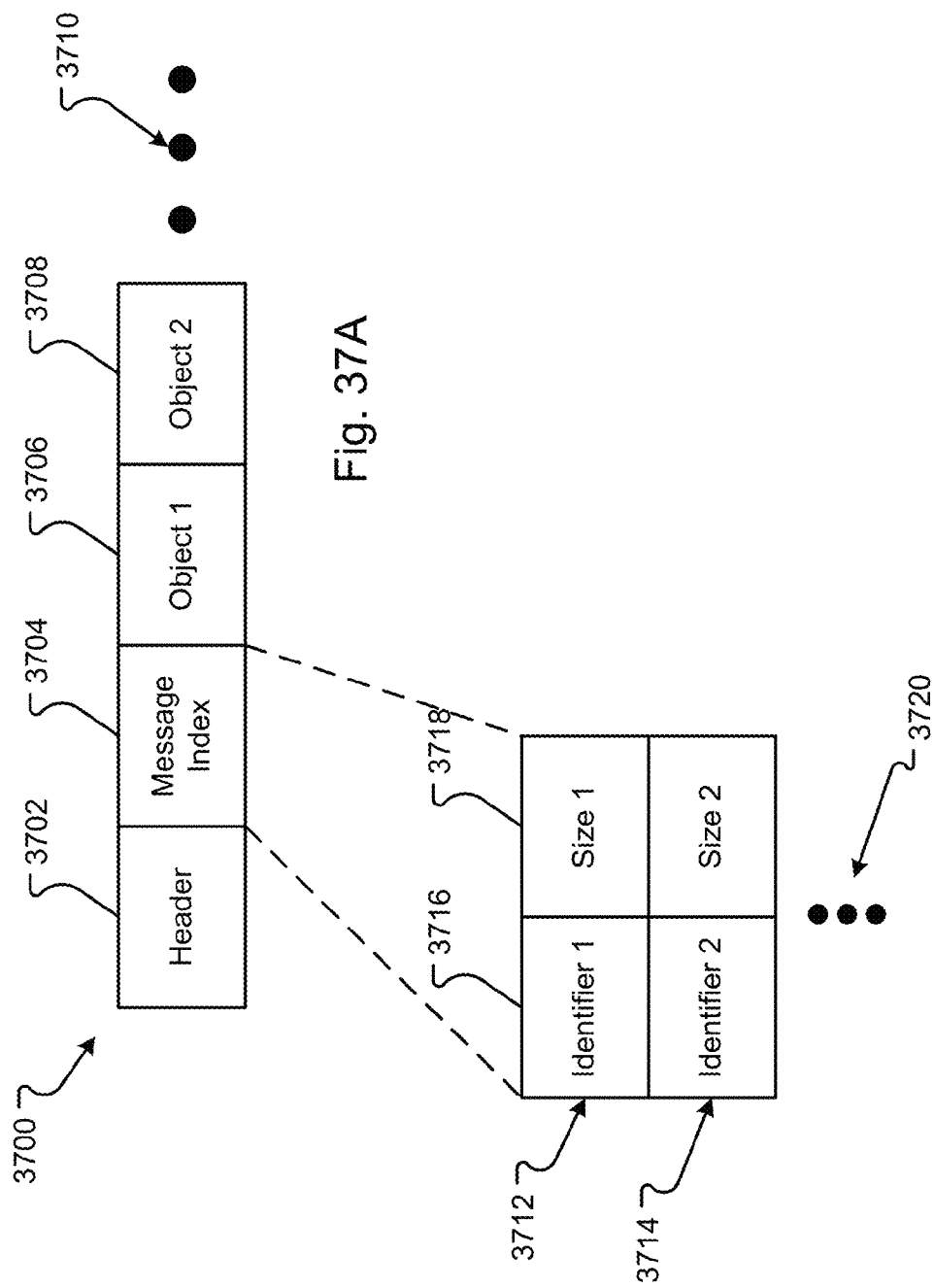
FIGS. 37A and 37B are a block diagrams of one or more data structures, databases, or data stores that can store data for the touch inspect system.

An embodiment of a data structure 3700 is shown in FIG. 37. The data structure 3700 may represent a message as sent between the server 3402 and a user device 3404. The message 3700 can include one or more portions which may be a field in the message 3700. The message can include more or fewer fields than those shown in FIG. 37, as represented by ellipses 3710. In embodiments, the message 3700 includes a header 3702, a message index 3704, and one or more serialized objects 3706 and/or 3708. The header 3702 includes information about the message and any information needed to send the message.

The message index 3704 includes information about how the objects 3706 and/or 3708 are organized in the message 3700. An example of the message index 3704 is shown in FIG. 37B. Here, each object in the message 3700 has a row entry 3712 and/or 3714 in a table. Each row entry includes an identifier 3716 for the object and a size 3718. The identifier 3716 provides information about the object 3706 and/or 3708 and may provide a unique identifier (e.g., a globally unique identifier (GUID)). The size field 3718 provides information for how large the object is in bytes, bits, blocks, or some other information. The information in the message index 3704 can include more or fewer fields that those shown, as represented by ellipses 3720. Further, the information in the message index 3704 can be used by the serializer 3506/3606 to determine the beginning and end point for an object within the message 3700. This information allows the serializer to de-serialize the message 3700. Further, the serializer 3506/3606 creates this information when creating a message 3700.

The message 3700 further includes one or more objects 3706/3708. The one or more objects 3706/3708 each include a discrete change to the data. The one or more objects 3706/3708 may each be encrypted and may include various object metadata. In embodiments, the one or more objects 3706/3708 are shown serialized in that object 1 3706 is placed first into the message 3700 followed by the second object 3708.

Figure 38:
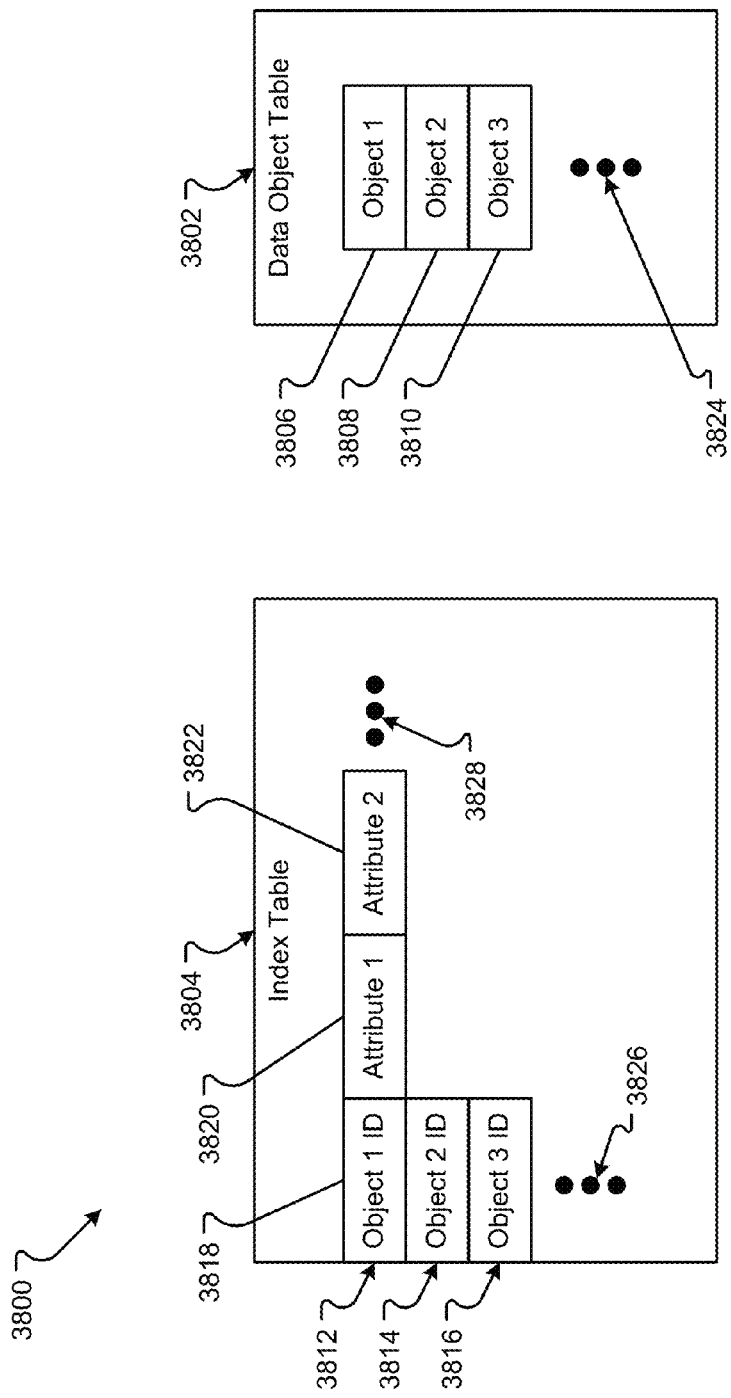
FIG. 38 is a block diagram of one or more data structures, databases, or data stores that can store data for the touch inspect system.

An embodiment of a database 3800, which may represent local database 3616 or database 3416, is shown in FIG. 38.

The database 3800 can include one or more portions which may be a field in the database 3800. The database 3800 can include a data object table 3802 and an index table 3804. In embodiments, the data object table 3802 stores the one or more objects 3806, 3808, and/or 3810 required for the database 3800. The data object table 3802 can include more or fewer objects than those shown in FIG. 38, as represented by ellipses 3824. The object represent parts of the database 3800 can include data and metadata describing the data.

The index table 3804 can include metadata and other attributes about the objects 3806, 3808, and/or 3810 in the data object table 3802. Thus, the index table 3804 can include a row 3812, 3814, and/or 3816 in the table or index 3804 for each object in the data object table 3802. The index table 3804 can include more or fewer rows than those shown in FIG. 38, as represented by ellipses 3826. Each row 3812, 3814, and/or 3816 can include an identifier for the object 3818 and one or more attributes 3820 and/or 3822 that describe the object 3806, 3808, and/or 3810. The index rows 3812, 3814, and/or 3816 can include more or fewer attributes than those shown in FIG. 38, as represented by ellipses 3828. The attributes 3820 and/or 3822 can include information or metadata associated with the objects 3806, 3808, and/or 3810. For example, the attributes 3820 and/or 3822 can include the information associated with assets, process, etc. as established by the user and described in conjunction with FIGS. 3-20. The attributes 3820 and/or 3822 can also include other information, such as timestamps, location, etc.

Figure 39:
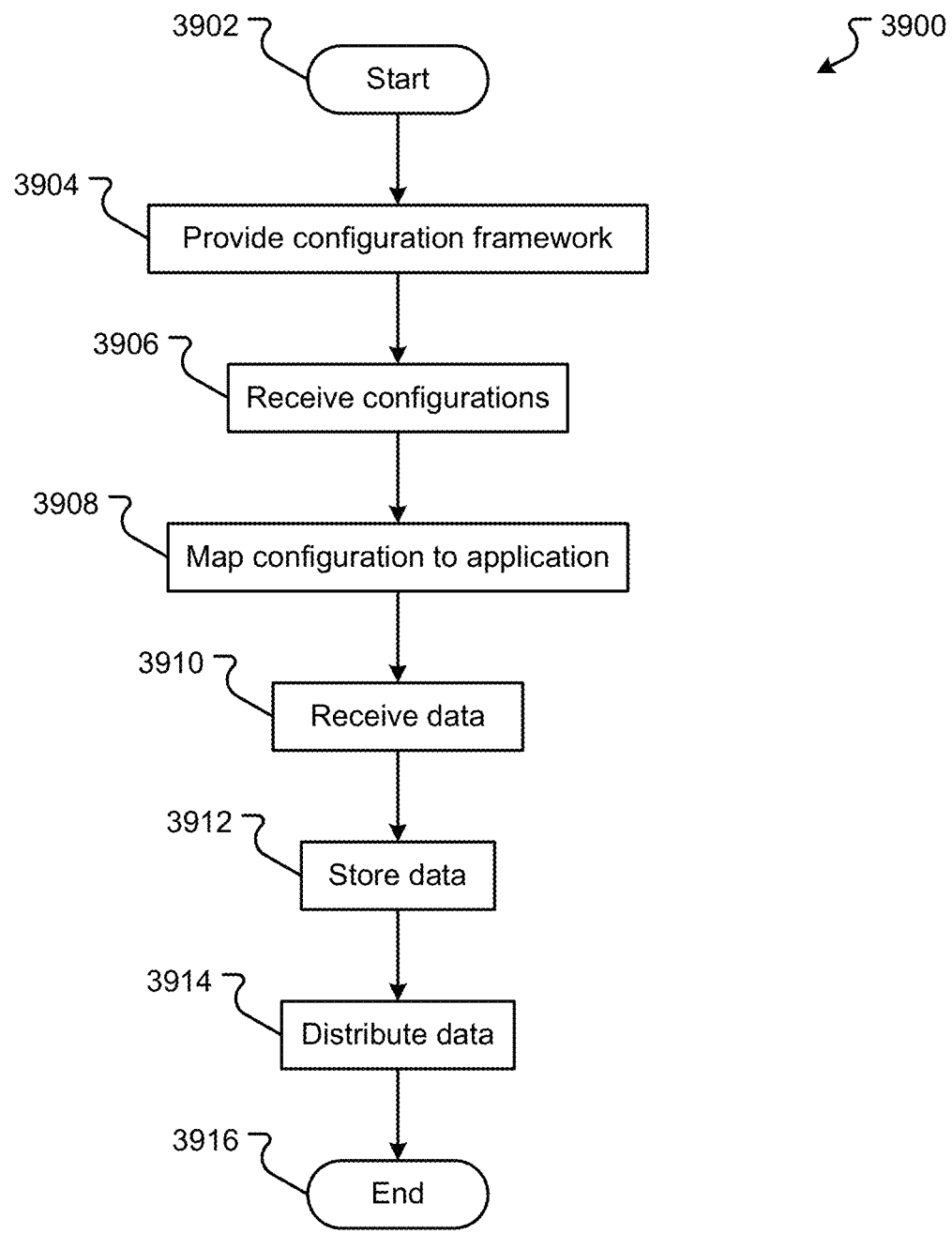
FIG. 39 illustrates an exemplary method for managing data with the touch inspect system.

An embodiment of a method 3900 for configuring an application is shown in FIG. 39. The method 3900 can begin with a start operation 3902 and end with an end operation 3916. The order and number of steps can be changed in the method 3900 without departing from the scope of the method 3900. The steps or operations can be executed by one or more computer systems as computer executable instructions. The method 3700 will be described hereinafter with reference to FIGS. 1-38.

In embodiments, the web server 3412 provides the configuration framework 100 to allow a user to configure the application, in step 3904. As described herein, the framework is based on a data paradigm where an enterprise is described as having assets, which have processes, which have steps, which may include progression logic. This framework establishes the basis for user interfaces in FIGS. 2-20.

The web server 3412 thereinafter receives configuration changes, in step 3906. As described in conjunction with FIGS. 2-20, the user can establish or define the enterprise, classes or categories of assets, define processes associated with the assets, provide the steps for the processes, and determine the progression logic and outcomes for the processes. This information may be stored by the web server 3412 into the database 3416.

Thereinafter, the configurations can be mapped to the application, in step 3908. In embodiments, the web server 3412 and/or the touch inspect engine 3612 may the configurations to the application entitled "touch inspect." The mapping associated certain classes of objects with devices, user interfaces, data, etc. used by the application. The application includes a standard format and structure. The data or configurations are mapped to the standard formats and structures to configure the application. For example, the assets and asset categories shown in FIG. 22 are mapped to the configurations created in FIGS. 5-8. Thus, the application framework provides a device to present the configurations to the user. Further, the look of the application can change by mapping different "skins" or overlays onto user interface devices, application backgrounds, etc. Thus, the look and wording of the user interface and the buttons or other user interface devices can also change.

The configured application can be executed by the touch inspect engine 3612. Therein, the user device 3404 and then the server 3402 can receive data, in step 3910. The data may be the creation of actual assets or data from executed processes. This data may be communicated to the server 3402 and then stored in the database 3416, in step 3912. Sometime thereinafter, the web server 3412 may distribute the received data to other users as updates, in step 3914.

Figure 40:
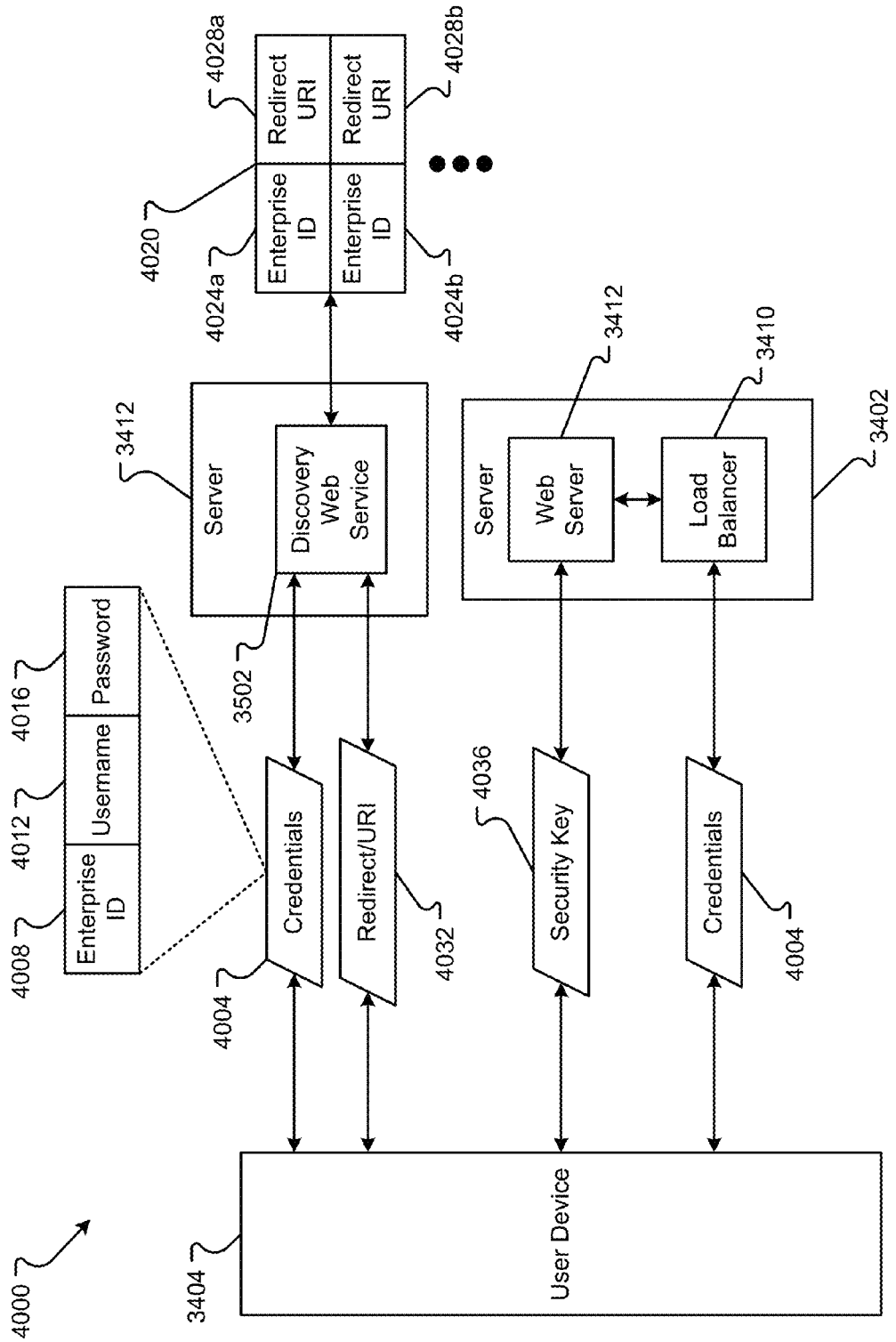
FIG. 40 illustrates an exemplary method for managing the keyboard on the SP.
Figure 41:
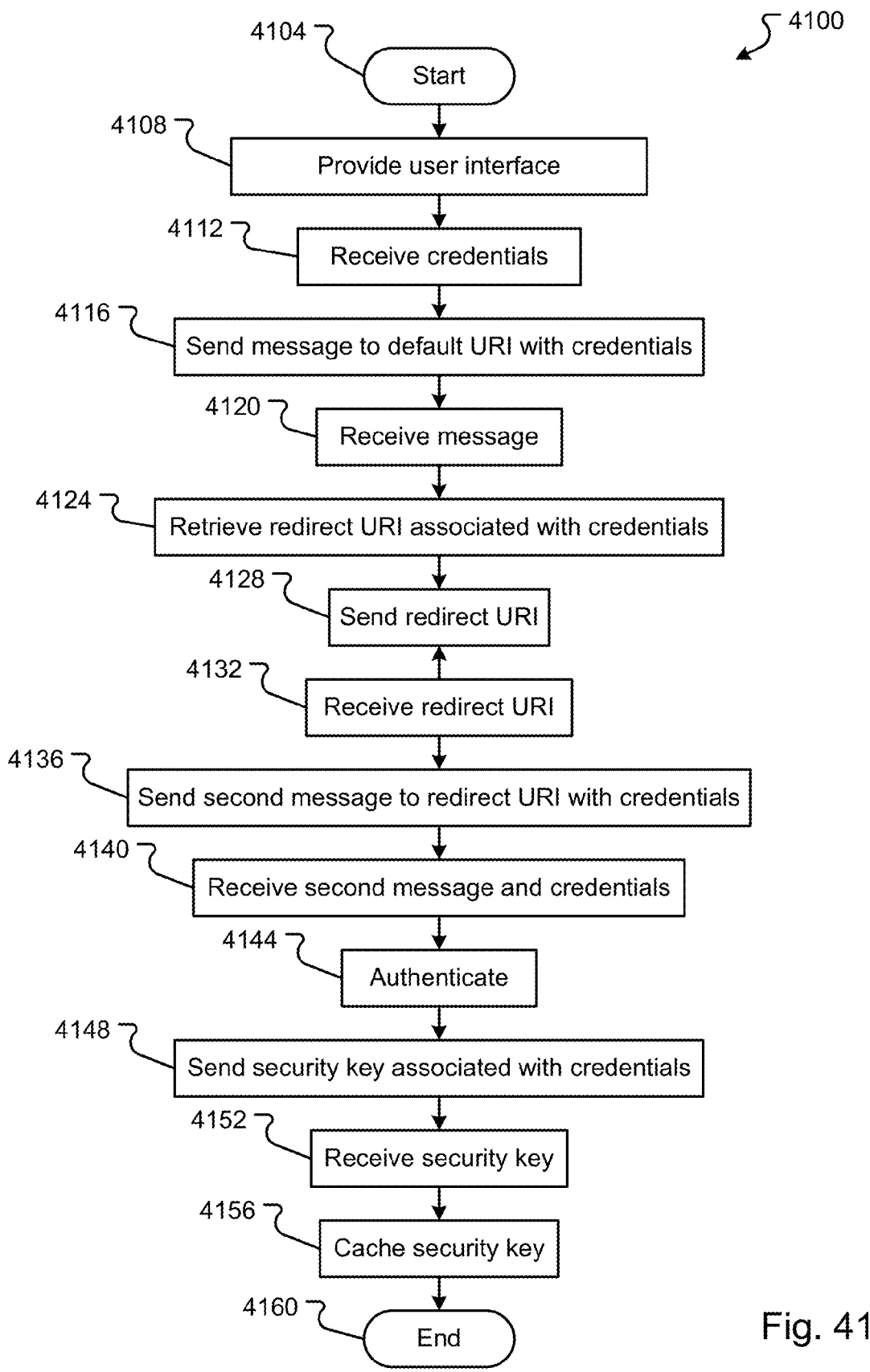
FIG. 41 illustrates an exemplary method for window manipulation based on one or more gestures.

System Communications:

An embodiment of the system 4000, described initially with FIG. 34, which be operable to send and/or receive one or more messages, is shown in FIG. 40. A method 4100 for sending an initial communication from the user device 3404 to the server 3412 is shown in FIG. 41. Generally, the method 4100 starts with a start operation 4104 and ends with an end operation 4160. The method 4100 can include more or fewer steps or can arrange the order of the steps differently than those shown in FIG. 41. The method 4100 can be executed as a set of computer-executable instructions executed by a computer system and encoded or stored on a computer readable medium. Hereinafter, the method 4100 shall be explained with reference to the systems, components, modules, software, data structures, user interfaces, etc. described in conjunction with FIGS. 1-40.

A user may execute the touch inspection engine 3612 on the user device 3404. The first time the user device executes the touch inspection engine 3612, the touch inspection engine 3612 retrieves a default Uniform Resource Identifier (URI) stored within the program and provides the URI to the server interface 3604. The server interface 3604 sends a message to the discovery web service 3502 of the web server 3412 using the URI.

Before the message is sent, the touch inspection engine 3612 provides a user interface for the user to provide credentials, 4108. These credentials can include a username, a password, and/or an enterprise or company name. The enterprise or company name is a designation of what group with which the user is associated; the enterprise or company name the can also identify which database information the user should be provided. The user credentials are received by the touch inspection engine 3612 through the user interface, in step 4112. Once the credentials are received, the server interface 3604 uses the URI provided by the touch inspection engine 3612 to send a message with the credentials to the default URI, in step 4116. Thus, the server interface 3604 sends the credentials message 4004 to the discovery web service 3502. The discovery web service 3502 receives this message, in step 4120.

In response to receiving the message 4004, the discovery web service 3502 may access a database 4020 to determine the redirect URI associated with the enterprise or company listed in the credentials. Thus, the discovery web service 3502 may scan one or more entries of the enterprise 4024A, 4024B, etc., in the data table 4020. Upon determining or locating the enterprise identifier that is similar to or the same as that provided in the credentials, the discovery web service 3502 can retrieve the associated URI 4028A, 4028B, etc, in step 4124. The retrieved URI 4028 is the redirect URI. This redirect URI may be sent in a message 4032 back to the user device 3404, in step 4128.

The server interface 3604 can receive the redirect URI, in step 4132. A second message may be created by the server interface 3604 and directed to the redirect URI, in step 4136. The second message can also include the credentials for the user. The second message may be a message directed either to a load balancer 3410 or directly to a web server 3412. If the second message is received by a load balancer 3410, the load balancer 3410 may select a web server 3412A or 3412B to receive the second message. The web server 3412 can receive the second message with the credentials, in step 4140.

The device interface 3504 can authenticate the user using the information provided in the credentials, in 4140. The authentication can be done by any known method and may be more robust than just simply using the user name and password. Thus, the device interface 3504 may require more information from the user before being authenticated. Once authenticated, the device interface 3504 may establish a security key associated with the credentials provided by the user. The security key may be sent to the user device 3404, in step 4144. The security key may be sent in a message 4036 to the user device 3404, where the user device 3404 may then cache the security key in a local database 3616. The security key may be received, in step 4148, while the security key may be cached in step 4152.

In subsequent communications between the user device 3404 and the web server 3412, the security key may be used to unlock data sent from the web server 3412 or may be used to provide further encrypted or secure packets between the user device 3404 and the web server 3412. However, if communication is lost and a future security key is unobtainable, the user device 3404 may access the cached security key 4036 to unlock the database stored locally 3616. Thus, the cached security key provides for continued access to the data even when the system or communication malfunctions prohibit the user device 3404 from contacting the web server 3412.

The process of contacting the discovery web service 3502 to obtain a redirect URI provides several advantages. If the server 3412 needs to be replaced or upgraded, the table 4020 can simply be changed to a new URI 4028 and the new URI can be provided to the user device 3404. Thus, any back-end upgrades to the system are invisible to the user device 3404. This allows for easy maintenance of the system 4000 without creating database or software changes for the numerous user devices 3404.

Figure 42:
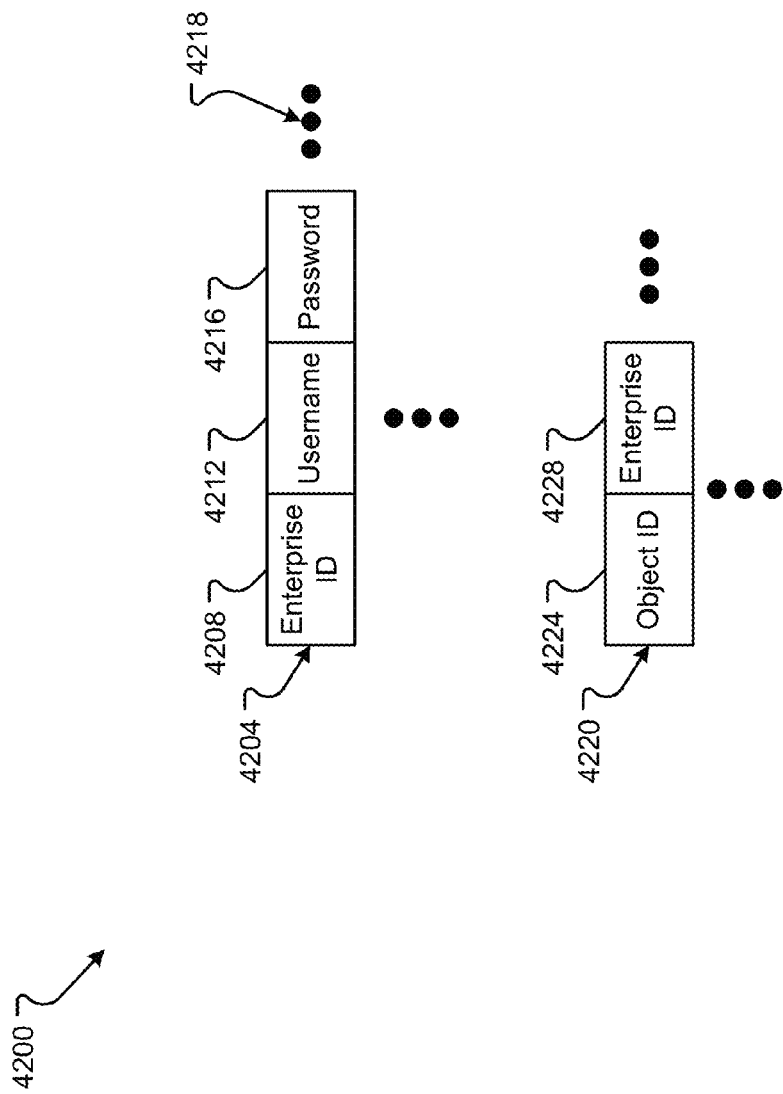
FIG. 42 illustrates an exemplary method for application highlighting when an application is in focus in multi application mode.
Figure 43:
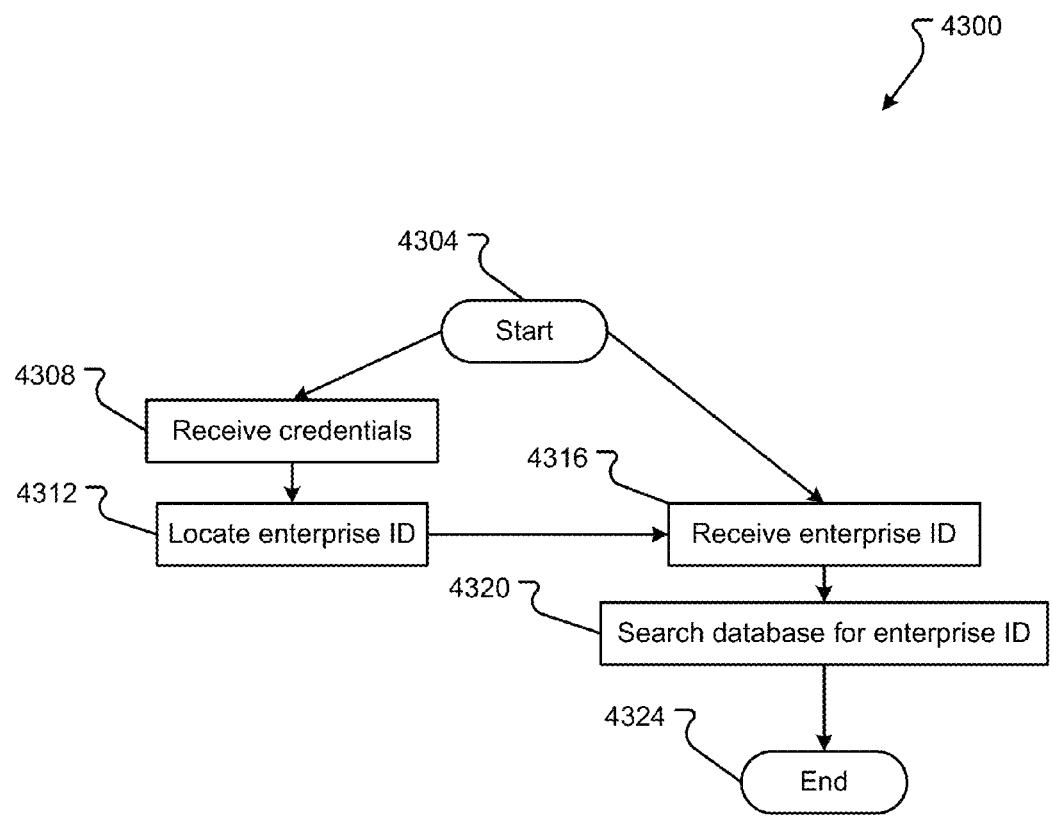
FIG. 43 illustrates an exemplary method for application maximization.

Asset to Enterprise Rules:

A process 4300 for determining which database information is associated with the user is shown in FIG. 43. Generally, the method 4300 starts with a start operation 4304 and ends with an end operation 4340. The method 4300 can include more or fewer steps or can arrange the order of the steps differently than those shown in FIG. 43. The method 4300 can be executed as a set of computer-executable instructions executed by a computer system and encoded or stored on a computer readable medium. Hereinafter, the method 4300 shall be explained with reference to the systems, components, modules, software, data structures, user interfaces, etc. described in conjunction with FIGS. 1-42.

An example of an association of a user with an enterprise and data with the enterprise is shown in FIG. 42. This association between entities and data may be created in a data structure 4200 that can associate different attributes amongst users, enterprises, and data objects. In embodiments, the device interface 3504 can receive credentials, in step 4308. The credentials may be received as explained in conjunction with FIGS. 41 and 42. The credentials can include an enterprise identifier, such as, a company name or some other type of identifier. In other embodiments, the credentials can include a user name. In embodiment, the credentials are sent to the change engine 3510.

The change engine 3510 may then look up an enterprise identifier (ID), if necessary, using the received credentials, in step 4312. For example, the change engine 3510 may access the data structure 4204 that associates a user identifier 4208 with one or more enterprise identifiers 4212 and 4216. In embodiments, users may be associated with more or fewer enterprises than that shown in FIG. 42, as represented by the ellipses 4218. The credentials received from the user may be associated with or be similar or the same as the user identifier 4208, contained in the data structure 4204. The change engine 3510 can scan the data structures 4204 for the user identifier 4208. Upon determining the user identifier 4208, the change engine 3510 can retrieve one or more enterprise IDs associated with the user.

The change engine 3510 may then receive the enterprise identifier, in step 4316. In other embodiments, the credentials may include the enterprise ID. For example, the user may provide a company name or organization name that is used as the enterprise ID. Thus, there may be no requirement for the change engine 3510 to look up the enterprise ID that may be associated with the user.

The change engine 3510 may then provide the enterprise ID to the database interface 3512. The database interface 3512 may then search the database for the enterprise ID to determine which data may be associated with the user. In embodiments, the database interface 3512 may search a data table or data structure 4220 for an enterprise ID that may be the same as enterprise ID 4208. The data objects 4224 may have an attribute that associates the data with enterprises. Thus, the enterprise ID 4228 may be an attribute of the object 4224. Upon crawling through the database 4220 and finding the objects 4224 associated with the enterprise ID 4228, the database interface 3512 can return the data as being associated with the user.

The advantages of associating the data with assets or enterprises allows for multiple users to access similar data. Thus, a user may be associated with an enterprise or enterprises and the data may be associated with those enterprises. A user or multiple users may access the same data associated with the enterprise without needing to associate every user with every data object they may need.

Figure 44:
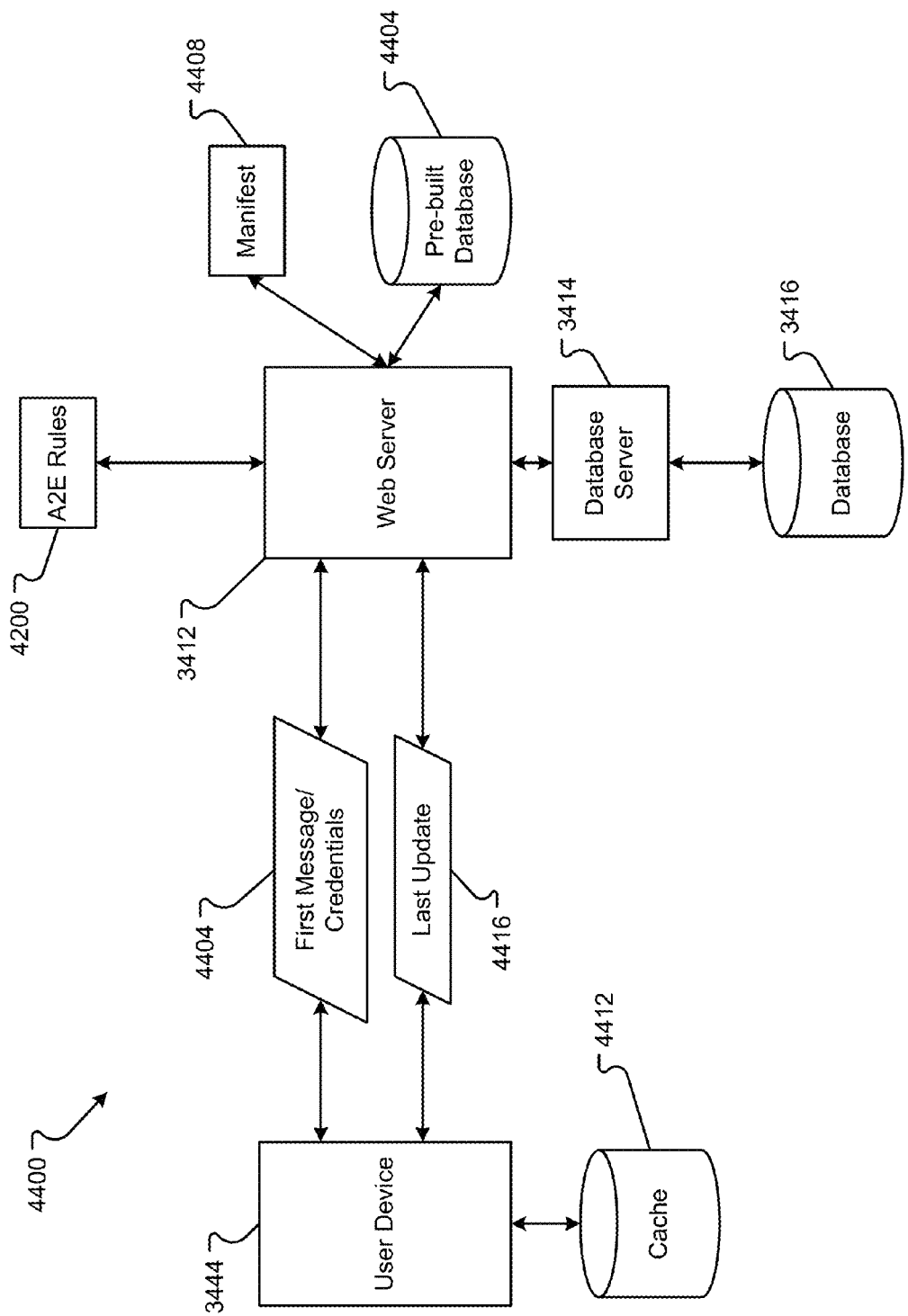
FIG. 44 illustrates an exemplary method for transitioning from an application window to the desktop.
Figure 45:
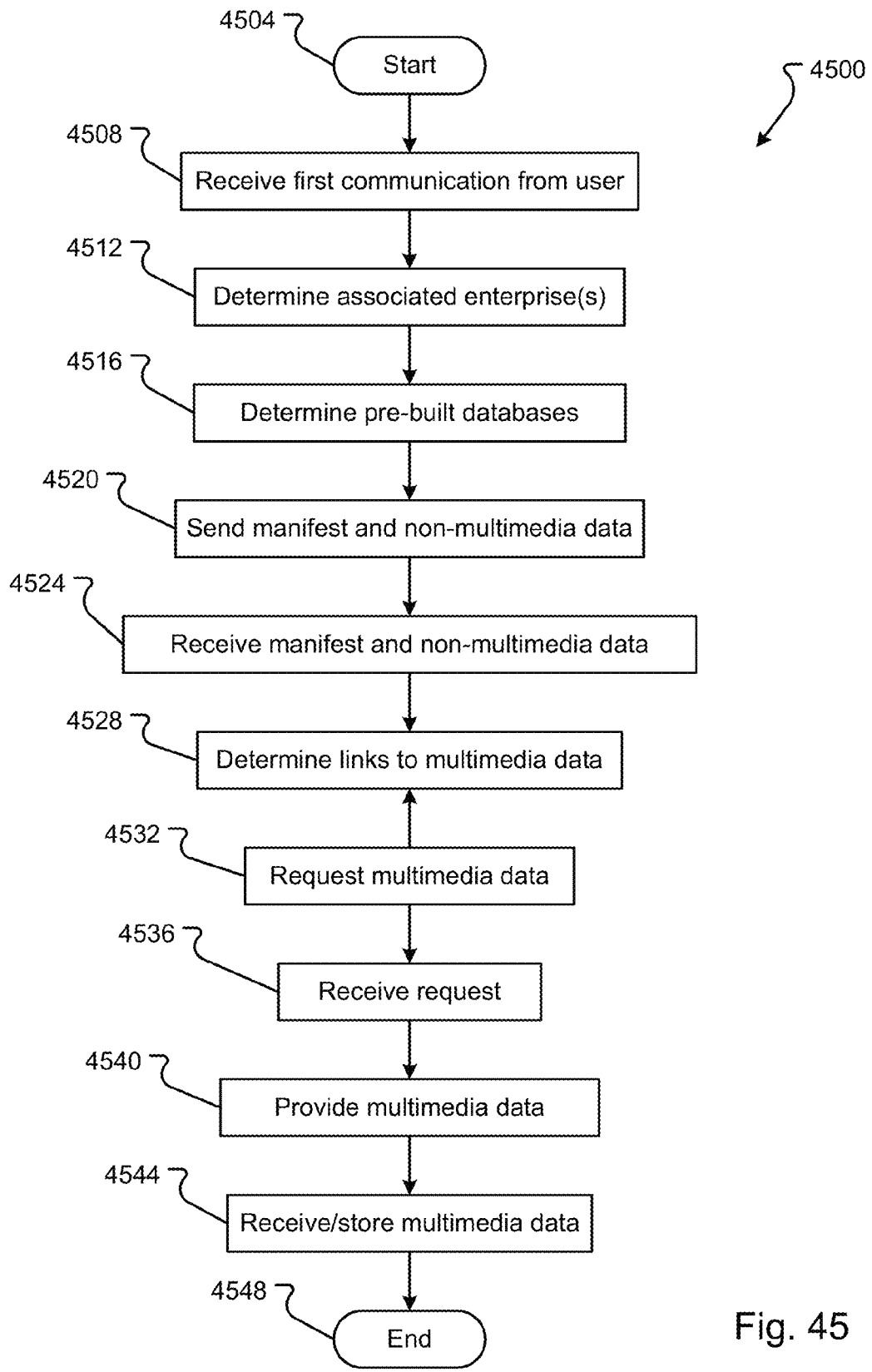
FIG. 45 illustrates an exemplary method for managing the display of the desktop and/or one or more panels on the SP.
Figure 46:
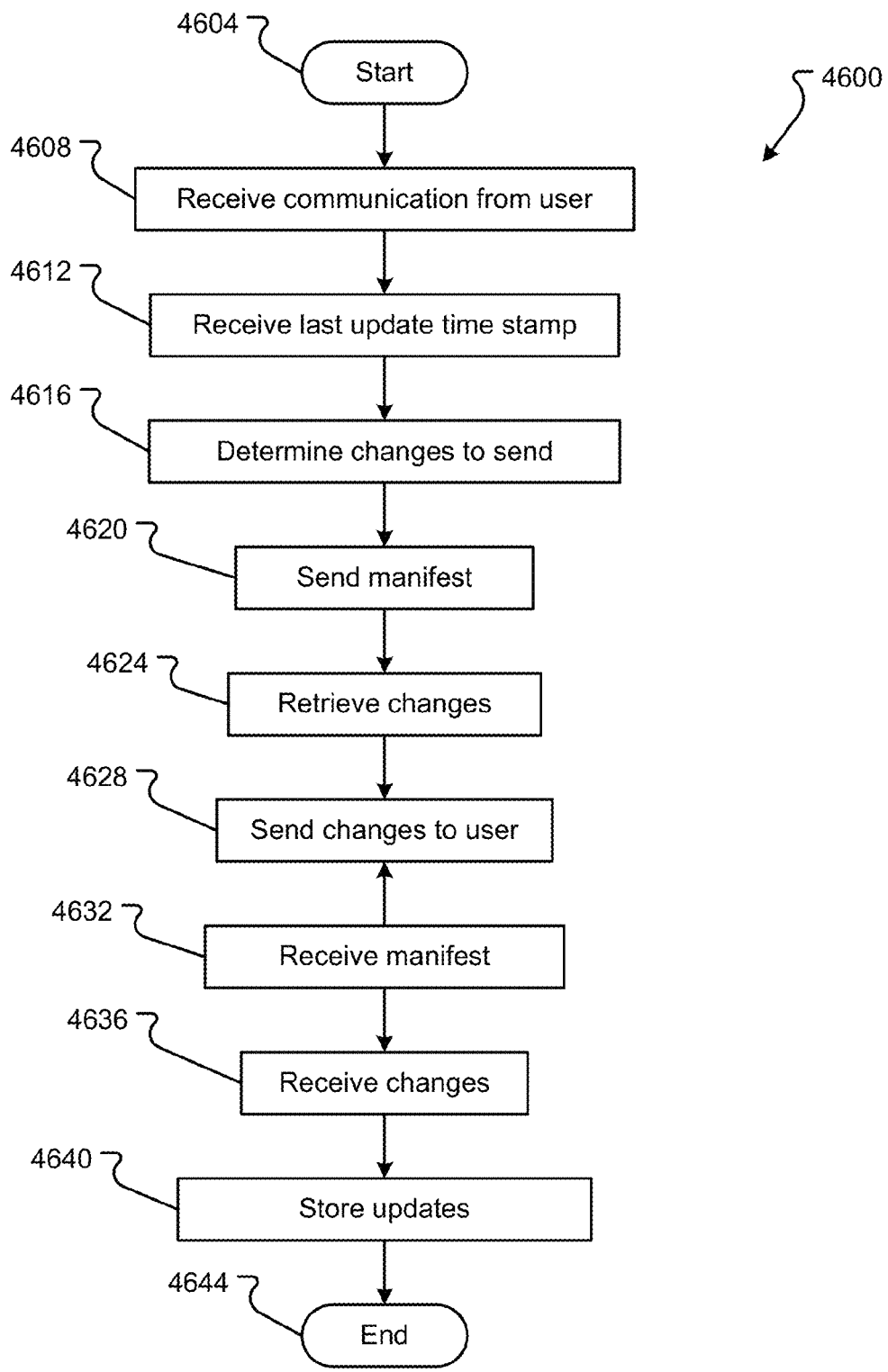
FIG. 46 illustrates an exemplary method for merging panels for display on the SP.

Data Management:

A functional system 4400 for providing data to a user device 3404 is shown in FIG. 44. The user may be provided data both as an initial pre-built database, which process 4500 is shown in FIG. 45, or as an incremental change to an already provided database, which process 4600 is shown in FIG. 46. While a general order for the steps of the method 4500/4600 is shown in FIG. 56. Generally, the method 4500/4600 starts with a start operation 4504/4604 and ends with an end operation 45484644. The method 4500/4600 can include more or fewer steps or can arrange the order of the steps differently than those shown in FIGS. 45/46. The method 4500/4600 can be executed as a set of computer-executable instructions executed by a computer system and encoded or stored on a computer readable medium. Hereinafter, the method 4500/4600 shall be explained with reference to the systems, components, modules, software, data structures, user interfaces, etc. described in conjunction with FIGS. 1-44.

The web server 3412 may receive a first communication from a user device 3404, in step 4508. A first communication is a first time that a device 3404 sends a request for database information to web server 3412. Thus, the device 3404 does not have database information currently cached on the device 3404 and requires at least a portion of the database. The first communication can include credential information to determine the user and/or enterprise associated with the device 3404.

The web server 3412 can receive the credentials in the first communication and access the assets to enterprise rules 4200, as explained in conjunction with FIGS. 42 and 43. From the assets to enterprise rules 4200, the web server 3412 can determine the enterprises associated with the user or the device 3404, in step 4512. From the determination of the associated enterprise or enterprises, the web server 3412 may determine which pre-built database is associated with the enterprise that is associated with the user, in step 4516.

In embodiments, the web server 3412 can instruct the database server 3414 to access one or more items of information in the database 3416 that is associated with each of one or more enterprises. The database 3416 can be condensed and coalesced into a pre-built database 4404 that is associated with a single enterprise. Thus, the pre-built databases may be quickly downloaded to devices 3404 that are associated with the specific enterprise. In addition to building the pre-built database 4404 that includes the data associated with particular enterprises, the web server 3412 may also generate a manifest 4408, which can include metadata that describes the information in the pre-built database 4404. The pre-built database 4404 and the manifest 4408 can be quickly accessed, retrieved, and sent by the web server 3412 to a device 3404 that requires an initial database build.

The web server 3412 can then send the manifest 4408 and pre-built database 4404 to the user device 3404, in step 4520. The pre-built database 4404 and manifest 4408 may be sent in accordance with the communications as described in conjunction with FIGS. 35 and 36 and received by the device 3404, in step 4524. The pre-built database 4404, or at least the portions sent to the device 3404, may not include multimedia data as the multimedia data is bandwidth-intensive and may require longer periods to download. Thus, the manifest 4408 may include links (e.g., accessible URIs) within the manifest 4408 to download the multimedia data, associated with the pre-built database 4404, at a later time. Therefore, the important database information in pre-built database 4404 is transmitted first, but allows the user to download multimedia data subsequent to the initial download of the pre-built database 4404 and manifest 4408.

The device 3404 can store the received pre-built database 4404, according to the manifest 4408, into a cache 4412. The device 3404 may then request the multimedia data, which is also stored in the cache 4412. In order to download the multimedia data, the device 3404, specifically the touch inspection engine 3612, can determine the links to the multimedia data within the manifest, in step 4528. Thus, the touch inspection engine 3612 may crawl through the manifest 4408 to retrieve and access the URIs in the manifest to direct it to the multimedia data stored by the web server 3412. The device 3404 can request the multimedia data from the web server 3412, in step 4532. This multimedia data may be received subsequent to the request, in step 4536. Thus, the web server 3412 may send multimedia data to the device 3404 to be stored in the cache 4412, in step 4540. The device 3404 can store the multimedia data and other data into a data structure, in step 4544. Upon receiving the multimedia data and completing the cache 4412, the device 3404 may then only receive subsequent updates to the cached database 4412.

A process 4600 for updating the database 4412 for the device 3404 is shown in FIG. 46. Web server 3412 can receive a communication from device 3404 for a database update, in step 4608. With the communication, or after requesting information, the web server 3412 may also receive a timestamp of the last update of any data within the cache 4412. Thus, the device 3404 may store within the cache an indication of the last update received by the device 3404. This timestamp may be associated with a single data object or may be associated with the last time the cache 4412 was updated. This time-stamped information may be provided to the web server 3412 in the communication sent in step 4608 and received in step 4612.

The web server 3412 can determine what changes were made to the associated database, in step 4616. Changes to the database 3516 are determined by the change engine 3510, which can create the incremental cache and manifest 4408. Thus, the web server 3412 can determine, by the manifest 4408, all changes made since the last update determined by the time stamp received from the device 3404. Manifest 4408 documents what changes have been made since the last timestamp may be sent to the device 3404, in step 4620. All changes that are associated with the incremental changes in the manifest 4408 may be retrieved by the database server 3414 upon instruction by the web server 3412, in step 4624. These incremental changes may be retrieved from the database 3416 and then sent to the device 3404, in step 4628. The device may receive the manifest 4632 to determine the changes that are being sent by the web server 3412, in step 4632. The manifest can document what changes and in what order the changes are being sent. The device 3404 can receive the incremental changes, in step 4636. These changes may then be used or stored to the cache 4412, in step 4640.

The changes made by each device 3404 may be communicated to the web server 3412. These changes may then be used to update the database 3416. Each incremental change may then create changes in the manifest 4408 and be available to other devices thereinafter. The change updating can be as described in conjunction with FIG. 35. This updating of the cache database 4412 has advantages in making the communication of changes smaller as only updates are provided after a certain timestamp. Thus, the device 3404 may continue to operate on its existing database until able to communicate with the web server 3412. At that time, the device 3404 may then communicate with the web server 3412 what changes are needed by sending a timestamp of the last update. This process reduces the amount of network traffic needed to continue to update the databases within the device 3404 because the database 3416 or the entire pre-built database 4404 is not re-sent to the device every time the device 3404 communicates with or needs updates from the web server 3412.

Figure 47:
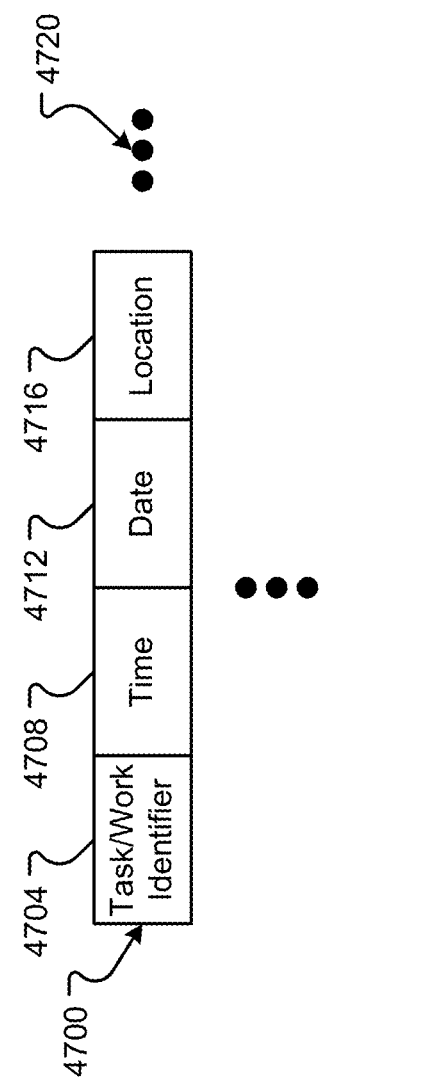
FIG. 47 illustrates an exemplary method for previewing one or more panels on the SP.
Figure 48:
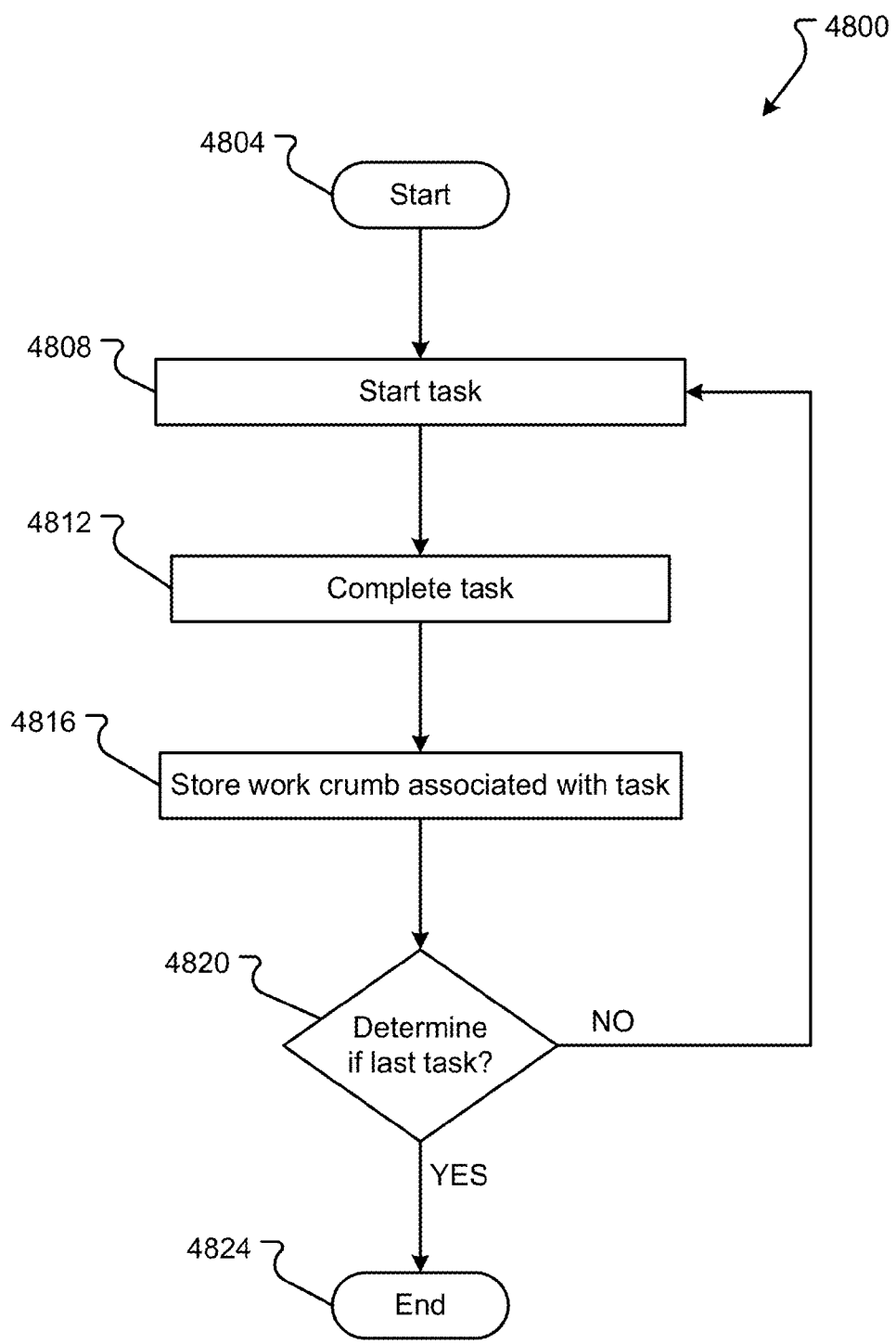
FIG. 48 illustrates an exemplary method for managing the display of an email client application based on application mode and device configuration.

Work Crumbing:

An embodiment of a method 4800 for creating and storing a work crumb is shown in FIG. 48. An embodiment of a data structure 4700 storing a work crumb is shown in FIG. 47. While a general order for the steps of the method 4800 is shown in FIG. 48. Generally, the method 4800 starts with a start operation 4804 and ends with an end operation 4824. The method 4800 can include more or fewer steps or can arrange the order of the steps differently than those shown in FIG. 48. The method 4800 can be executed as a set of computer-executable instructions executed by a computer system and encoded or stored on a computer readable medium. Hereinafter, the method 4800 shall be explained with reference to the systems, components, modules, software, data structures, user interfaces, etc. described in conjunction with FIGS. 1-47.

Figure 29:
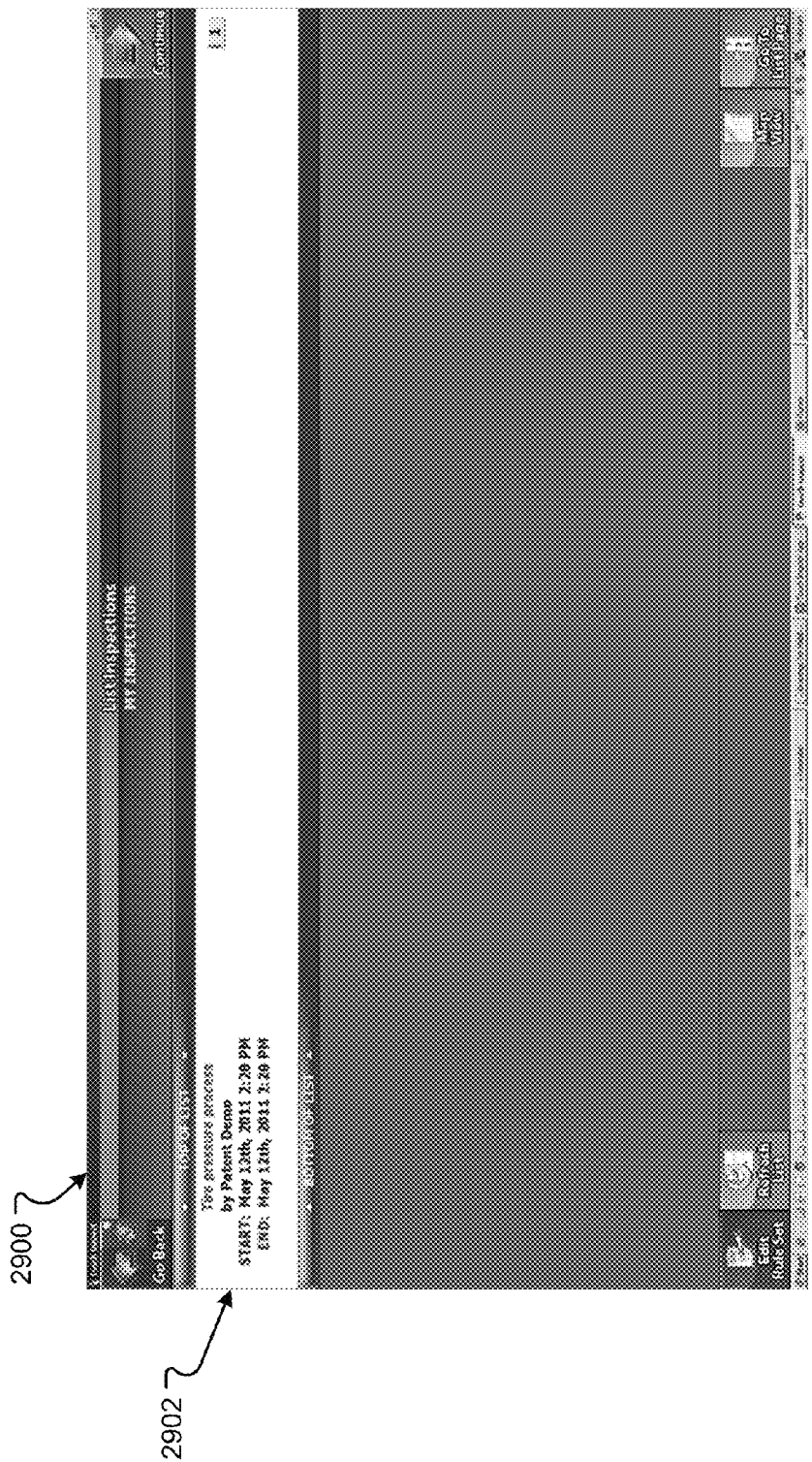
FIG. 29 includes a another view of an embodiment of a touch inspect user interface.

In embodiments, a user begins a task 110 associated with an asset or other process, in step 4808. For example, a process might be as shown in FIG. 29 to check the tire pressure of a tire. A task may be a smaller portion of the process (e.g., unscrew the cap on the stem of the tire) and may include a question or data entry of some type. For example, the task may be as shown in FIG. 30. The user can complete the task, in step 4812. Thus, the task may be within the process may be completed by a user.

Upon completing the task, a work crumb 4700 may be stored by the user device 3404, in step 4816. The touch inspection engine 3612 can store the work crumb 4700 in a local database 3616. An example of a work crumb 4700 that may be stored in the database 3616 is as shown in FIG. 47. The work crumb 4700 can have different fields. In embodiments, the work crumb 4700 includes a work or task identifier 4704, which identifies the task to which the user started and/or completed, a time 4708 at which the user started and/or completed the task, a date 4712 at which the user started and/or completed the task, and a location 4716 at which the user started and/or completed the task. The location 4716 can be GPS coordinates, a latitude and longitude, an address, or some other identifier of the location at which the user started and/or completed task.

Once the work crumb is stored, the touch inspection engine 3612 can determine if that is the last task in the process 4800, in step 4820. If it is not the last task in the process 4800, the process 4800 proceeds "NO" to step 4808 where another task may be begun. If it is the last task in the process 4800, the process 4800 can proceed "YES" to end operation 4824.

The storing and creation of work crumbs 4700 enables the later identification of where the user was when a task was started and/or completed. Thus, the user may not only show what time a task was started or completed, but also where they were when this occurred. The user will not be able to claim to have completed a task and not actually be on a site where the task may need to be completed. For example, if the user is to check a fire hydrant at a certain location and completes the task at a different location, the inspection can be determined to be suspect because the user was not at the location of the asset being inspected. The work crumbs 4700 can be provided to the web server 3412 by the user device 3404 when changes are sent to the database. The work crumb 4700 is metadata that may be associated with data compiled during the execution of a process.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for executing a configured application, the system comprising:
 a first server comprising:
  a first memory;
  a first processor in communication with the first memory, wherein the first processor:
  receives credentials for a first user device;
  determines a redirect URI based on a first enterprise identifier contained in the credentials;
  sends the redirect URI to the first user device;
 a second server associated with the redirect URI, the second server comprising:
  a second memory;
  a second processor in communication with the second memory, wherein the second processor:
  provides a configuration framework for configuring a software application associated with a first enterprise identified by the first enterprise identifier, which software application is pre-existing;
  receives configuration changes associated with the configuration framework;
  provides the configuration changes to two or more user devices;
  receives data from at least one of the two or more user devices;
  stores the data in a database;
  distributes the data to the two or more user devices;
  receives a first message from the first user device, wherein the first message is directed to the redirect URI, and wherein the first message includes credentials that include at least the first enterprise identifier;
  authenticates the first user device based at least in part on the credentials sent with the first message; and
  in response to authenticating the first user device, sends a security key to the first user device;
  receives the first enterprise identifier in the credentials;
  from the first enterprise identifier, searches the database associated with the software application for data associated with the first enterprise identified by the first enterprise identifier;
  based on the first enterprise identifier, sends the database that was pre-built and associated with the first enterprise to the first user device;
  receives a second communication from the first user device at a second time, wherein the second communication includes a timestamp indicating the last time the database was updated;
  based on the timestamp, determines at least one change to the database since the last timestamp;
  creates a manifest describing the at least one change; and
  sends the manifest and the at least one change to the first user device.

2. The system as defined in claim 1, wherein the configuration framework includes at least four tiers, wherein the configuration framework includes at least two of:
 a first enterprise node that defines a first enterprise;
  an asset node, wherein the asset node is a child node of the first enterprise node, and wherein the asset node defines an asset of the first enterprise;
  a process node, wherein the process node is a child node of the asset node, and wherein the process defines a process associated with the asset;
  a step node, wherein the step node is a child node of the property node, and wherein the step defines a step included in the process and conducted as an action in the software application; and a progression logic node, wherein the progression logic node is a child node of the step node, and wherein the progression logic defines a result for the step.

3. The system as defined in claim 2, wherein at least one data object is associated with at least one of the first enterprise node, the asset node, the process node, the step node, and the progression logic node.

4. The system as defined in claim 3, wherein the at least one data object is accessed by two or more users on the two or more user devices.

5. The system as defined in claim 4, wherein at least one change to the at least one data object is shared by the two or more users.

6. The system as defined in claim 5, further comprising a third server associated with a second redirect URI provided by the first server, the third server comprising:
a third memory;
a third processor in communication with the third memory, wherein the third processor:
provides a second configuration framework for configuring the software application associated with a second enterprise identified by a second enterprise identifier, which software application is pre-existing;
receives second configuration changes associated with the second configuration framework;
provides the second configuration changes to two or more other user devices;
receives data from at least one of the two or more other user devices;
stores the data in a second database;
distributes the data to the two or more other devices.

7. The system as defined in claim 6, wherein the first and second configuration frameworks are different, and wherein the first and second configuration frameworks configure a first and second software application from the pre-existing software application.

8. The system as defined in claim 7, wherein the first and second applications are different.

9. The system as defined in claim 8, wherein the first applications is associated with the first enterprise and the second application is associated with a second enterprise.

10. A system comprising:
a first user device comprising:
a first memory;
a first processor in communication with the first memory, wherein the first processor:
executes a pre-existing application;
in response to executing the pre-existing application, sends a first message to a first server;
receives a redirect URI from the first server;
sends a second message to a second server associated with the redirect URI, wherein the second message includes credentials that include at least a first enterprise identifier, wherein the second server provides a configuration framework for configuring the pre-existing software application associated with a first enterprise identified by the first enterprise identifier, which software application is pre-existing;
receives a security key from the second server;
receives configuration changes for of the configuration framework to the pre-existing software application;
maps the configuration changes of the configuration framework to the pre-existing software application to generate a configured application;
executes the configured application based on the mapping;
receives a database that was pre-built and associated with the first enterprise;
maps the database with the configured application;
executes the configured application with the database;
receives input into the configured application, wherein the input creates data;
at a second time, sends a third message to the second server, wherein the third message includes a timestamp indicating a last time the database was updated on the first user device;
receives a manifest describing the at least one change to the database since the last timestamp;
receives the at least one change to the database; and
changes the database to include the at least one change to the database.

11. The system according to claim 10, wherein the configuration framework includes at least four tiers, wherein the configuration framework includes at least two of:
a first enterprise node that defines a first enterprise;
an asset node, wherein the asset node is a child node of the first enterprise node, and wherein the asset node defines an asset of the first enterprise;
a process node, wherein the process node is a child node of the asset node, and wherein the process defines a process associated with the asset;
a step node, wherein the step node is a child node of the property node, and wherein the step defines a step included in the process and conducted as an action in the software application; and
a progression logic node, wherein the progression logic node is a child node of the step node, and wherein the progression logic defines a result for the step.

12. The system according to claim 11, wherein at least one data object is associated with at least one of the first enterprise node, the asset node, the process node, the step node, and the progression logic node, wherein the at least one data object is accessed by the first user device and at least one other user on at least a second device, and wherein at least one change to the at least one data object is shared by the first user device and at least one other user on at least a second device.

13. The system according to claim 12, further comprising:
a second user device comprising:
a second memory;
a second processor in communication with the second memory, wherein the second processor:
executes the pre-existing application;
in response to executing the pre-existing application, sends a fourth message to the first server;
receives a second redirect URI from the first server;
sends a fifth message to a third server associated with the second redirect URI, wherein the fifth message includes second credentials that include at least a second enterprise identifier, wherein the third server provides a second configuration framework for configuring the pre-existing software application associated with a second enterprise identified by the second enterprise identifier, which software application is pre-existing;
receives a second security key from the third server;
receives second configuration changes for of the second configuration framework to the pre-existing software application;
maps the second configuration changes of the second configuration framework to the pre-existing software application to generate a second configured application;

executes the second configured application based on the mapping;

receives a second database that was pre-built and associated with the second enterprise;

maps the second database with the second configured application;

executes the second configured application with the second database;

receives input into the second configured application, wherein the input creates data;

at a third time, sends a sixth message to the third server, wherein the sixth message includes a second timestamp indicating a last time the second database was updated on the second user device;

receives a second manifest describing the at least one second change to the second database;

receives the at least one second change to the second database; and changes the second database to include the at least one second change to the database.

14. The system according to claim 13, wherein the first and second configuration frameworks are different, and wherein the first and second configuration frameworks configure a first and second software application from the pre-existing software application.

15. The system according to claim 14, wherein the first and second applications are different.

16. The system according to claim 15, wherein the first applications is associated with the first enterprise and the second application is associated with a second enterprise.

17. A system for executing a configured application, the system comprising:

a processor; and a memory electrically coupled to the processor and comprising computer readable program code that when executed by the processor causes the processor to perform operations comprising:

receiving credentials for a first user device;

determines a redirect URI based on a first enterprise identifier contained in the credentials;

sending the redirect URI to the first user device;

providing a configuration framework for configuring a software application associated with a first enterprise identified by the first enterprise identifier, which software application is pre-existing;

receiving configuration changes associated with the configuration framework;

providing the configuration changes to two or more user devices;

receiving data from at least one of the two or more user devices;

storing the data in a database;

distributing the data to the two or more devices;

receiving a first message from the first user device, wherein the first message is directed to the redirect URI, and wherein the first message includes credentials that include at least the first enterprise identifier;

authenticating the first user device based at least in part on the credentials sent with the first message;

in response to authenticating the user device, sending a security key to the first user device;

receiving the first enterprise identifier in the credentials;

from the first enterprise identifier, searching for the database associated with the software application for data associated with the first enterprise identified by the first enterprise identifier;

based on the first enterprise identifier, sending the database that was pre-built and associated with the first enterprise to the first user device;

receiving a second communication from the first user device at a second time, wherein the second communication includes a timestamp indicating the last time the database was updated;

based on the timestamp, determining at least one change to the database since the last timestamp;

creating a manifest describing the at least one change; and sending the manifest and the at least one change to the first user device.

18. The system as defined in claim 17, wherein the configuration framework includes at least four tiers, wherein the configuration framework includes at least two of:

a first enterprise node that defines a first enterprise;

an asset node, wherein the asset node is a child node of the first enterprise node, and wherein the asset node defines an asset of the first enterprise;

a process node, wherein the process node is a child node of the asset node, and wherein the process defines a process associated with the asset;

a step node, wherein the step node is a child node of the property node, and wherein the step defines a step included in the process and conducted as an action in the software application; and a progression logic node, wherein the progression logic node is a child node of the step node, and wherein the progression logic defines a result for the step.

19. The system as defined in claim 18, wherein at least one data object is associated with at least one of the first enterprise node, the asset node, the process node, the step node, and the progression logic node.

20. The system as defined in claim 19, wherein the at least one data object is accessed by two or more users on the two or more user devices, and wherein at least one change to the at least one data object is shared by the two or more users.

* * * * *